United States Patent
Aiba et al.

(10) Patent No.: US 9,967,878 B2
(45) Date of Patent: May 8, 2018

(54) TERMINAL DEVICE, BASE STATION APPARATUS, INTEGRATED CIRCUIT, AND COMMUNICATION METHOD

(71) Applicant: Sharp Kabushiki Kaisha, Sakai-shi, Osaka (JP)

(72) Inventors: Tatsushi Aiba, Sakai (JP); Shoichi Suzuki, Sakai (JP); Kazunari Yokomakura, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 175 days.

(21) Appl. No.: 15/109,848

(22) PCT Filed: Dec. 25, 2014

(86) PCT No.: PCT/JP2014/084284
§ 371 (c)(1),
(2) Date: Jul. 6, 2016

(87) PCT Pub. No.: WO2015/107851
PCT Pub. Date: Jul. 23, 2015

(65) Prior Publication Data
US 2016/0338048 A1    Nov. 17, 2016

(30) Foreign Application Priority Data
Jan. 15, 2014    (JP) .................................. 2014-004857

(51) Int. Cl.
*H04W 4/00*     (2018.01)
*H04J 3/00*     (2006.01)
(Continued)

(52) U.S. Cl.
CPC ....... *H04W 72/0446* (2013.01); *H04L 1/1812* (2013.01); *H04L 1/1854* (2013.01);
(Continued)

(58) Field of Classification Search
CPC . H04W 72/0446; H04W 24/08; H04W 72/00; H04W 72/0453; H04L 1/1854;
(Continued)

(56) References Cited

U.S. PATENT DOCUMENTS

| | | | |
|---|---|---|---|
| 2014/0086112 A1* | 3/2014 | Stern-Berkowitz | ........ H04W 72/1289 370/280 |
| 2015/0223241 A1* | 8/2015 | Cattoni | ................. H04L 5/0044 370/329 |

OTHER PUBLICATIONS

Ericsson et al., "On standardization impact of TDD UL-DL adaptation", R1-122016, 3GPP TSG-RAN WG1, May 21-25, 2012, 3 pages.

(Continued)

*Primary Examiner* — Kiet Tang
(74) *Attorney, Agent, or Firm* — Keating & Bennett, LLP

(57) ABSTRACT

Provided are a terminal device that communicates with a base station apparatus, in which, in a case where second information is not received, whether or not to perform transmission on a physical downlink shared channel in a DwPTS of a special subframe that is based on a UL-DL configuration that is indicated by first information is stipulated based on a special subframe configuration that is based on fourth information and on a cyclic prefix in downlink, and in a case where second information is received, whether or not to perform the transmission on the physical downlink shared channel in the DwPTS of the special subframe that is based on the UL-DL configuration which is indicated by third information is stipulated based on the special subframe configuration that is based on the fourth information and on the cyclic prefix in downlink.

8 Claims, 22 Drawing Sheets

(51) Int. Cl.
*H04W 72/04* (2009.01)
*H04W 72/00* (2009.01)
*H04L 1/18* (2006.01)
*H04W 24/08* (2009.01)
*H04L 5/00* (2006.01)

(52) U.S. Cl.
CPC .......... *H04L 1/1861* (2013.01); *H04L 1/1887* (2013.01); *H04L 1/1893* (2013.01); *H04W 24/08* (2013.01); *H04W 72/00* (2013.01); *H04L 5/0044* (2013.01); *H04L 5/0055* (2013.01); *H04W 72/0453* (2013.01)

(58) Field of Classification Search
CPC ... H04L 1/1893; H04L 1/1887; H04L 1/1861; H04L 1/1812; H04L 5/0044; H04L 5/0055
See application file for complete search history.

(56) References Cited

OTHER PUBLICATIONS

Ericsson et al.,"Signalling support for dynamic TDD", R1-130558, Ericsson, ST-Ericsson, 3GPP TSG-RAN WG1, Jan. 28-Feb. 1, 2013, 3 pages.

\* cited by examiner

FIG. 7

| UL-DL CONFIGURATION | DOWNLINK-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 10

| SET # | (UL-DL CONFIGURATION FOR PRIMARY CELL, UL-DL CONFIGURATION FOR SECONDARY CELL) | SECOND UL REFERENCE UL-DL CONFIGURATION FOR SECONDARY CELL |
|---|---|---|
| SET 1 | (1,1),(1,2),(1,4),(1,5) | 1 |
| | (2,2),(2,5) | 2 |
| | (3,3),(3,4),(3,5) | 3 |
| | (4,4),(4,5) | 4 |
| | (5,5) | 5 |
| SET 2 | (1,0),(2,0),(3,0),(4,0),(5,0),(6,0) | 0 |
| | (2,1),(4,1),(5,1) | 1 |
| | (5,2) | 2 |
| | (4,3),(5,3) | 3 |
| | (5,4) | 4 |
| | (1,6),(2,6),(3,6),(4,6),(5,6) | 6 |
| SET 3 | (3,1) | 1 |
| | (3,2),(4,2) | 2 |
| | (1,3),(2,3) | 3 |
| | (2,4) | 4 |
| SET 4 | (0,0),(6,0) | 0 |
| | (0,1),(0,2),(0,4),(0,5),(6,1),(6,2),(6,5) | 1 |
| | (0,3),(0,6) | 3 |
| | (6,4) | 4 |
| | (0,6),(6,6) | 6 |

FIG. 12

| SET # | (UL-DL CONFIGURATION FOR PRIMARY CELL, UL-DL CONFIGURATION FOR SECONDARY CELL) | SECOND DOWNLINK REFERENCE UL-DL CONFIGURATION FOR SECONDARY CELL |
|---|---|---|
| SET 1 | (0,0) | 0 |
| | (1,0),(1,1),(1,6) | 1 |
| | (2,0),(2,2),(2,1),(2,6) | 2 |
| | (3,0),(3,3),(3,6) | 3 |
| | (4,0),(4,1),(4,3),(4,4),(4,6) | 4 |
| | (5,0),(5,1),(5,2),(5,3),(5,4),(5,5),(5,6) | 5 |
| | (6,0),(6,6) | 6 |
| SET 2 | (0,1),(6,1) | 1 |
| | (0,2),(1,2),(6,2) | 2 |
| | (0,3),(6,3) | 3 |
| | (0,4),(1,4),(3,4),(6,4) | 4 |
| | (0,5),(1,5),(2,5),(3,5),(4,5),(6,5) | 5 |
| | (0,6) | 6 |
| SET 3 | (3,1),(1,3) | 4 |
| | (3,2),(4,2),(2,3),(2,4) | 5 |
| SET 4 | (0,1),(02),(0,3),(0,4),(0,5),(0,6) | 0 |
| | (1,2),(1,4),(1,5) | 1 |
| | (2,5) | 2 |
| | (3,4),(3,5) | 3 |
| | (4,5) | 4 |
| | (6,1),(6,2),(6,3),(6,4),(6,5) | 6 |
| SET 5 | (1,3) | 1 |
| | (2,3),(2,4) | 2 |
| | (3,1),(3,2) | 3 |
| | (4,2) | 4 |

FIG. 13

| UL-DL CONFIGURATION | \multicolumn{10}{c}{SUBFRAME NUMBER} |
|---|---|---|---|---|---|---|---|---|---|---|

| UL-DL CONFIGURATION | 0 | 1 | 2 | 3 | 4 | 5 | 6 | 7 | 8 | 9 |
|---|---|---|---|---|---|---|---|---|---|---|
| 0 | 4 | 6 |   |   |   | 4 | 6 |   |   |   |
| 1 |   | 6 |   |   | 4 |   | 6 |   |   | 4 |
| 2 |   |   |   | 4 |   |   |   |   | 4 |   |
| 3 | 4 |   |   |   |   |   |   |   | 4 | 4 |
| 4 |   |   |   |   |   |   |   |   | 4 | 4 |
| 5 |   |   |   |   |   |   |   |   | 4 |   |
| 6 | 7 | 7 |   |   |   | 7 | 7 |   |   | 5 |

FIG. 14

| UL-DL CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

FIG. 15

| UL-DL CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | 6 | | 4 |
| 1 | | | 7, 6 | 4 | | | | 7, 6 | 4 | |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |

FIG. 16

| SPECIAL SUBFRAME CONFIGURATION | NORMAL CYCLIC PREFIX IN DOWNLINK | | | EXTENDED CYCLIC PREFIX IN DOWNLINK | | |
|---|---|---|---|---|---|---|
| | DwPTS | UpPTS | | DwPTS | UpPTS | |
| | | NORMAL CYCLIC PREFIX IN UPLINK | EXTENDED CYCLIC PREFIX IN UPLINK | | NORMAL CYCLIC PREFIX IN UPLINK | EXTENDED CYCLIC PREFIX IN UPLINK |
| 0 | 6592·Ts | 2192·Ts | 2560·Ts | 7680·Ts | 2192·Ts | 2560·Ts |
| 1 | 19760·Ts | | | 20480·Ts | | |
| 2 | 21952·Ts | | | 23040·Ts | | |
| 3 | 24144·Ts | | | 25600·Ts | | |
| 4 | 26336·Ts | | | 7680·Ts | 4384·Ts | 5120·Ts |
| 5 | 6592·Ts | 4384·Ts | 5120·Ts | 20480·Ts | | |
| 6 | 19760·Ts | | | 23040·Ts | | |
| 7 | 21952·Ts | | | 12800·Ts | | |
| 8 | 24144·Ts | | | — | — | — |
| 9 | 13168·Ts | | | — | — | — |

FIG. 17

| SUBFRAME NUMBER | | | | | | | | | | |
|---|---|---|---|---|---|---|---|---|---|---|
| 0 | 1 | 2 | 3 | 4 | 5 | 6 | 7 | 8 | 9 | |
| D | S | U | U | U | D | S | U | U | U | UL REFERENCE UL-DL CONFIGURATION 0 |
| D | S | U | D | D | D | S | U | D | D | DL REFERENCE UL-DL CONFIGURATION 2 |
| D | S | U | U | D | D | D | D | D | D | THIRD UL-DL CONFIGURATION 4 |

FIG. 18

| SUBFRAME NUMBER | | | | | | | | | | |
|---|---|---|---|---|---|---|---|---|---|---|
| 0 | 1 | 2 | 3 | 4 | 5 | 6 | 7 | 8 | 9 | |
| D | S | U | U | U | D | S | U | U | U | UL REFERENCE CONFIGURATION 0 |
| D | S | U | U | U | D | D | D | D | D | DL REFERENCE CONFIGURATION 3 |
| D | S | U | U | D | D | D | D | D | D | THIRD UL-DL CONFIGURATION 4 |

FIG. 19

| SUBFRAME NUMBER | | | | | | | | | | |
|---|---|---|---|---|---|---|---|---|---|---|
| 0 | 1 | 2 | 3 | 4 | 5 | 6 | 7 | 8 | 9 | |
| D | S | U | U | U | D | S | U | U | U | UL REFERENCE UL-DL CONFIGURATION 0 |
| D | S | U | U | D | D | D | D | D | D | DL REFERENCE UL-DL CONFIGURATION 4 |
| D | S | U | D | D | D | S | U | D | D | THIRD UL-DL CONFIGURATION 2 |

FIG. 20

| SUBFRAME NUMBER | | | | | | | | | | |
|---|---|---|---|---|---|---|---|---|---|---|
| 0 | 1 | 2 | 3 | 4 | 5 | 6 | 7 | 8 | 9 | |
| D | S | U | U | U | D | S | U | U | U | UL REFERENCE UL-DL CONFIGURATION 0 |
| D | S | U | U | D | D | D | D | D | D | DL REFERENCE UL-DL CONFIGURATION 4 |
| D | S | U | U | U | D | D | D | D | D | THIRD UL-DL CONFIGURATION 3 |

TERMINAL DEVICE, BASE STATION APPARATUS, INTEGRATED CIRCUIT, AND COMMUNICATION METHOD

TECHNICAL FIELD

The present invention relates to a terminal device, a base station apparatus, an integrated circuit, and a communication method.

This application claims the benefit of Japanese Priority Patent Application 2014-004857 filed on Jan. 15, 2014, the entire contents of which are incorporated herein by reference.

BACKGROUND ART

In the 3rd Generation Partnership Project (3GPP), a wireless access method and a wireless network for cellular mobile communication (hereinafter referred to as "Long Term Evolution (LTE)" or "Evolved Universal Terrestrial Radio Access (EUTRA)") have been considered. In LTE, a base station apparatus is also referred to as an evolved NodeB (eNodeB) and a terminal device is also referred to as User Equipment (UE). LTE is a cellular communication system in which an area is divided in a cellular pattern into multiple cells, each being served by a base station apparatus. A single base station apparatus may manage multiple cells.

LTE supports Time Division Duplex (TDD). LTE that employs a TDD scheme is also referred to as TD-LTE or LTE TDD. At this point, in TDD, an uplink signal and a downlink signal are time-multiplexed.

In the 3GPP, application of a traffic adaptation technology and an interference reduction technology (DL-UL Interference Management and Traffic Adaptation) to TD-LTE has been studied. The traffic adaptation technology is a technology that changes a ratio between an uplink resource and a downlink resource according to the uplink traffic and the downlink traffic. At this point, the traffic adaptation technology is also referred to as dynamic TDD.

In NPL 1, a method of using a flexible subframe is disclosed as a method of realizing traffic adaptation. The base station apparatus can perform reception of the uplink signal or transmission of the downlink signal in the flexible subframe. In NPL 1, as long as the base station apparatus does not instruct the terminal device to transmit the uplink signal in the flexible subframe, the terminal device regards the flexible subframe as a downlink subframe.

NPL 1 discloses that a Hybrid Automatic Repeat reQuest (HARQ) timing for a Physical Downlink Shared Channel (PDSCH) is determined based on an uplink-downlink configuration (UL-DL configuration) that is newly introduced and that an HARQ timing for a Physical Uplink Shared Channel (PUSCH) is determined based on a UL-DL configuration in the related art.

Furthermore, NPL 2 discloses that (a) a UL/DL reference configuration is introduced and (b) several subframes can be scheduled for any one of uplink and downlink by a dynamic grant/assignment from scheduling.

CITATION LIST

Non-Patent Document

[Non-Patent Document 1] NPL 1: "On standardization impact of TDD UL-DL adaptation", R1-122016, Ericsson, ST-Ericsson, 3GPP TSG-RAN WG1 Meeting #69, Prague, Czech Republic, 21-25 May 2012

[Non-Patent Document 2] NPL 2: "Signalling support for dynamic TDD", R1-130558, Ericsson, ST-Ericsson, 3GPP TSG-RAN WG1 Meeting #72, St Julian's, Malta, 28 Jan.-1 Feb. 2013

DISCLOSURE OF THE INVENTION

Problems to be Solved by the Invention

However, a specific procedure is not disclosed that is executed when in the wireless communication system described above, the base station apparatus and the terminal device perform communication using a downlink physical channel or an uplink physical channel.

For example, a specific procedure is not disclosed that is executed when the communication is performed using a Physical Downlink Shared Channel (PDSCH). Furthermore, for example, a specific procedure is not disclosed that is executed when the communication is performed using an Enhanced Physical Downlink Control Channel (EPDCCH). Furthermore, for example, a specific procedure is not disclosed that is executed when the communication is performed using a Physical Uplink Control Channel (PUCCH).

An object of the present invention, which is made in view of the problems described above, is to provide a terminal device, a base station apparatus, an integrated circuit, and a communication method, in all of which communication that efficiently uses a radio resource can be available.

Means for Solving the Problems (1) In order to accomplish the object described, the following means are contrived according to the present invention. That is, according to an aspect of the present invention, there is provided a terminal device that communicates with a base station apparatus, the device including: a reception unit that receives first information indicating a UL-DL configuration, second information indicating a UL-DL configuration, third information indicating a UL-DL configuration, and fourth information indicating a special subframe configuration; and a transmission unit that performs transmission on a physical uplink shared channel which corresponds to detection of a physical downlink control channel, at least based on the UL-DL configuration that is indicated by the first information, and that performs transmission of an HARQ-ACK which corresponds to detection of transmission on a physical downlink shared channel, using a physical uplink control channel, at least based on the UL-DL configuration that is indicated by the second information, in which, in a case where the second information is not received, whether or not to perform the transmission on the physical downlink shared channel in a DwPTS of a special subframe that is based on the UL-DL configuration that is indicated by the first information is stipulated based on the special subframe configuration that is based on the fourth information and on a cyclic prefix in downlink, and in which, in a case where the second information is received, whether or not to perform the transmission on the physical downlink shared channel in the DwPTS of the special subframe that is based on the UL-DL configuration which is indicated by the third information is stipulated based on the special subframe configuration that is based on the fourth information and on the cyclic prefix in downlink.

(2) Furthermore, according to another aspect of the present invention, there is provided a base station apparatus that communicates with a terminal device, the apparatus including: a transmission unit that transmits first information indicating a UL-DL configuration, second information indicating a UL-DL configuration, third information indicating a UL-DL configuration, and fourth information indicating a special subframe configuration; and a reception unit that performs reception on a physical uplink shared channel which corresponds to detection of a physical downlink control channel, at least based on the UL-DL configuration that is indicated by the first information, and that performs reception of an HARQ-ACK which corresponds to detection of transmission on a physical downlink shared channel, using a physical uplink control channel, at least based on the UL-DL configuration that is indicated by the second information, in which, in a case where the second information is not transmitted, whether or not to perform the transmission on the physical downlink shared channel in a DwPTS of a special subframe that is based on the UL-DL configuration that is indicated by the first information is stipulated based on the special subframe configuration that is based on the fourth information and on a cyclic prefix in downlink, and in which, in a case where the second information is transmitted, whether or not to perform the transmission on the physical downlink shared channel in the DwPTS of the special subframe that is based on the UL-DL configuration which is indicated by the third information is stipulated based on the special subframe configuration that is based on the fourth information and on the cyclic prefix in downlink.

(3) Furthermore, according to a further aspect of the present invention, there is provided a communication method for use in a terminal device that communicates with a base station apparatus, the method including: receiving first information indicating a UL-DL configuration, second information indicating a UL-DL configuration, third information indicating a UL-DL configuration, and fourth information indicating a special subframe configuration; and performing transmission on a physical uplink shared channel which corresponds to detection of a physical downlink control channel, at least based on the UL-DL configuration that is indicated by the first information, and performing transmission of an HARQ-ACK which corresponds to detection of transmission on a physical downlink shared channel, using a physical uplink control channel, at least based on the UL-DL configuration that is indicated by the second information, in which, in a case where the second information is not received, whether or not to perform the transmission on the physical downlink shared channel in a DwPTS of a special subframe that is based on the UL-DL configuration that is indicated by the first information is stipulated based on the special subframe configuration that is based on the fourth information and on a cyclic prefix in downlink, and in which, in a case where the second information is received, whether or not to perform the transmission on the physical downlink shared channel in the DwPTS of the special subframe that is based on the UL-DL configuration which is indicated by the third information is stipulated based on the special subframe configuration that is based on the fourth information and on the cyclic prefix in downlink.

(4) Furthermore, according to a still further aspect of the present invention, there is provided a communication method for use in a base station apparatus that communicates with a terminal device, the method including: transmitting first information indicating a UL-DL configuration, second information indicating a UL-DL configuration, third information indicating a UL-DL configuration, and fourth information indicating a special subframe configuration; and performing reception on a physical uplink shared channel which corresponds to detection of a physical downlink control channel, at least based on the UL-DL configuration that is indicated by the first information, and performing reception of an HARQ-ACK which corresponds to detection of transmission on a physical downlink shared channel, using a physical uplink control channel, at least based on the UL-DL configuration that is indicated by the second information, in which, in a case where the second information is not transmitted, whether or not to perform the transmission on the physical downlink shared channel in a DwPTS of a special subframe that is based on the UL-DL configuration that is indicated by the first information is stipulated based on the special subframe configuration that is based on the fourth information and on a cyclic prefix in downlink, and in which, in a case where the second information is transmitted, whether or not to perform the transmission on the physical downlink shared channel in the DwPTS of the special subframe that is based on the UL-DL configuration which is indicated by the third information is stipulated based on the special subframe configuration that is based on the fourth information and on the cyclic prefix in downlink.

(5) Furthermore, according to a still further aspect of the present invention, there is provided an integrated circuit that is built into a terminal device that communicates with a base station apparatus, the circuit causing the terminal device to perform: a function of receiving first information indicating a UL-DL configuration, second information indicating a UL-DL configuration, third information indicating a UL-DL configuration, and fourth information indicating a special subframe configuration; and a function of performing transmission on a physical uplink shared channel which corresponds to detection of a physical downlink control channel, at least based on the UL-DL configuration that is indicated by the first information, and of performing transmission of an HARQ-ACK which corresponds to detection of transmission on a physical downlink shared channel, using a physical uplink control channel, at least based on the UL-DL configuration that is indicated by the second information, in which, in a case where the second information is not received, whether or not to perform the transmission on the physical downlink shared channel in a DwPTS of a special subframe that is based on the UL-DL configuration that is indicated by the first information is stipulated based on the special subframe configuration that is based on the fourth information and on a cyclic prefix in downlink, and in which, in a case where the second information is received, whether or not to perform the transmission on the physical downlink shared channel in the DwPTS of the special subframe that is based on the UL-DL configuration which is indicated by the third information is stipulated based on the special subframe configuration that is based on the fourth information and on the cyclic prefix in downlink.

(6) Furthermore, according to a still further aspect of the present invention, there is provided an integrated circuit that is built into a base station apparatus that communicates with a terminal device, the circuit causing the base station apparatus to perform: a function of transmitting first information indicating a UL-DL configuration, second information indicating a UL-DL configuration, third information indicating a UL-DL configuration, and fourth information indicating a special subframe configuration; and a function of performing reception on a physical uplink shared channel which corresponds to detection of a physical downlink control channel, at least based on the UL-DL configuration that is indicated by the first information, and of performing reception of an HARQ-ACK which corresponds to detection of transmission on a physical downlink shared channel, using a physical uplink control channel, at least based on the UL-DL configuration that is indicated by the second information, in which, in a case where the second information is not transmitted, whether or not to perform the transmission on the physical downlink shared channel in a DwPTS of a special subframe that is based on the UL-DL configuration that is indicated by the first information is stipulated based on the special subframe configuration that is based on the fourth information and on a cyclic prefix in downlink, and in which, in a case where the second information is transmitted, whether or not to perform the transmission on the physical downlink shared channel in the DwPTS of the special subframe that is based on the UL-DL configuration which is indicated by the third information is stipulated based on the special subframe configuration that is based on the fourth information and on the cyclic prefix in downlink.

Effects of the Invention

According to aspects of the invention, communication that efficiently uses a radio resource can be available.

BRIEF DESCRIPTION OF THE DRAWINGS

FIG. 7 is a table illustrating an example of an uplink-downlink configuration.

FIG. 10 is a diagram illustrating a correspondence between a pair that is formed by the first UL reference UL-DL configuration for a different serving cell (a primary cell) and the first UL reference UL-DL configuration for a serving cell (a secondary cell), and the second UL reference UL-DL configuration for the secondary cell.

FIG. 12 is a diagram illustrating a correspondence between a pair that is formed by the first DL reference UL-DL configuration for the primary cell and the first DL reference UL-DL configuration for the secondary cell, and the second DL reference UL-DL configuration for the secondary cell.

FIG. 13 is a diagram illustrating a correspondence between subframe n to which a PDCCH/EPDCCH/PHICH is allocated and subframe n+k to which a PUSCH to which the PDCCH/EPDCCH/PHICH described above corresponds is allocated.

FIG. 14 is a diagram illustrating a correspondence between subframe n to which the PUSCH is allocated, and subframe n+k to which the PHICH to which the PUSCH described above corresponds is allocated.

FIG. 15 is a diagram illustrating a correspondence between subframe n−k to which a PDSCH is allocated and subframe n in which an HARQ-ACK to which the PDSCH described above corresponds is transmitted.

FIG. 16 is a diagram illustrating a constitution of the special subframe.

FIG. 17 is a diagram for describing a communication method according to the present embodiment.

FIG. 18 is a diagram for describing the communication method according to the present embodiment.

FIG. 19 is a diagram for describing the communication method according to the present embodiment.

FIG. 20 is a diagram for describing the communication method according to the present embodiment.

MODE FOR CARRYING OUT THE INVENTION

An embodiment of the present invention will be described below.

According to the present embodiment, multiple cells may be configured for a terminal device. A technology in which the terminal device performs communication through multiple cells is referred to as cell aggregation or carrier aggregation. At this point, the present embodiment may be applied to each of the multiple cells that are configured for the terminal device. Furthermore, the present invention may be applied to some of the multiple cells that are configured for the terminal device. At this point, a cell that is configured for the terminal device is also referred to as a serving cell.

Furthermore, multiple serving cells that are configured include one primary cell, or one or multiple secondary cells. The primary cell may be a serving cell in which an initial connection establishment procedure is executed, a serving cell in which a connection re-establishment procedure is started, or a cell that is indicated as a primary cell during a handover procedure. At this point, at a point in time at which an RRC connection is established, or later, the secondary cell may be configured.

Furthermore, at least a Time Division Duplex (TDD) scheme is applied to a wireless communication system according to the present embodiment. For example, in the case of the cell aggregation, the TDD scheme may be applied to all multiple cells. Furthermore, in the case of the cell aggregation, a cell to which the TDD scheme is applied and a cell to which a Frequency Division Duplex (FDD) scheme is applied may be aggregated. That is, in the case of the cell aggregation, the present embodiment may be applied to some of the cells.

Figure 1:
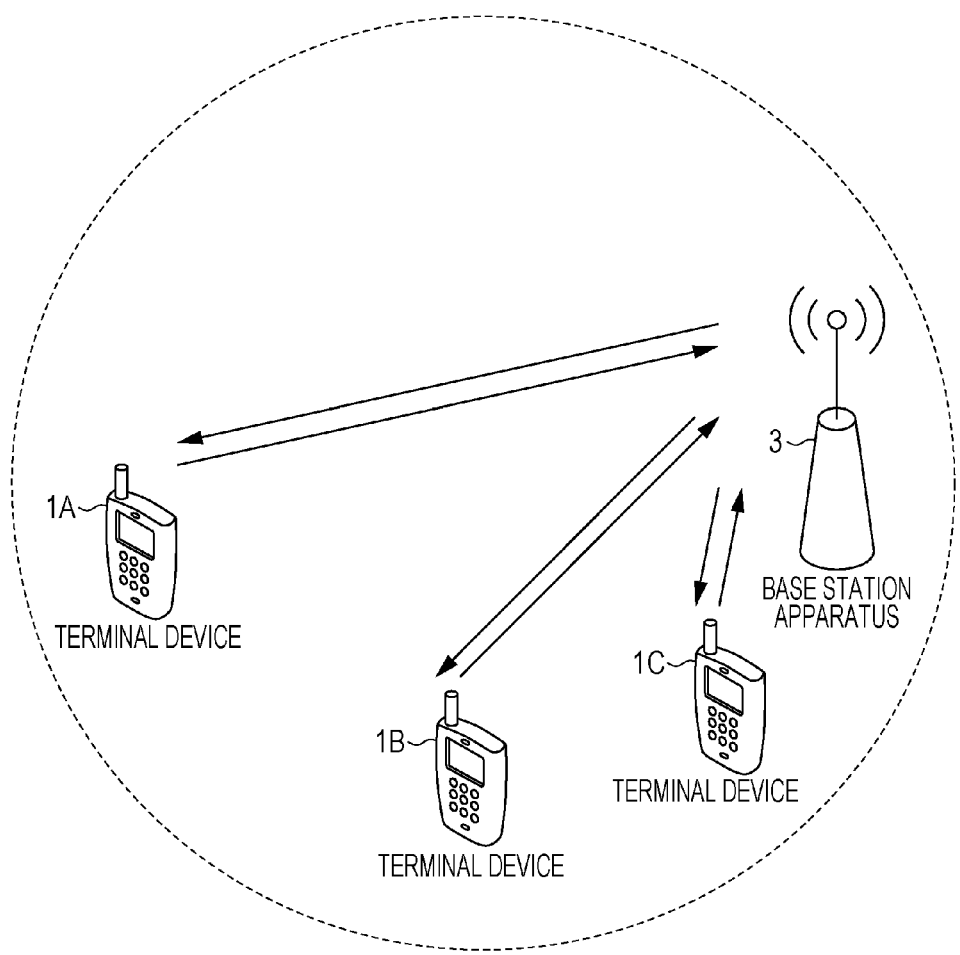
FIG. 1 is a conceptual diagram illustrating a wireless communication system according to the present embodiment.

FIG. 1 is a conceptual diagram of the wireless communication system according to the present embodiment. As illustrated in FIG. 1, the wireless communication system according to the present embodiment includes terminal devices 1A to 1C and a base station apparatus 3. The terminal devices 1A to 1C are hereinafter also referred to as a terminal device 1.

A physical channel and a physical signal according to the present embodiment are described.

In FIG. 1, the following uplink physical channels are used for uplink wireless communication from the terminal device 1 to the base station apparatus 3. The uplink physical channels are used for transmitting information that is output from a higher layer.

Physical Uplink Control Channel (PUCCH)
Physical Uplink Shared Channel (PUSCH)
Physical Random Access Channel (PRACH)

The PUCCH is used for transmitting Uplink Control Information (UCI). The uplink control information includes Channel State Information (CSI) for downlink and a Scheduling Request (SR) indication a request for a PUSCH resource. Furthermore, the uplink control information includes an acknowledgement (ACK)/negative-acknowledgement (NACK) of downlink data (Downlink Transport Block or Downlink-Shared Channel (DL-SCH)). At this point, the ACK/NACK is also referred to as an HARQ-ACK, HARQ feedback, or response information.

The PUSCH is used for transmitting uplink data (Uplink Transport Block or Uplink-Shared Channel (UL-SCH)). That is, transmission of the uplink data on the UL-SCH is performed through the PUSCH. That is, the UL-SCH that is a transport channel is mapped to the PUSCH that is a physical channel. Furthermore, the PUSCH may be used for transmitting the HARQ-ACK and/or the channel state information along with the uplink data. Furthermore, the PUSCH may be used only for transmitting the channel state information or only for transmitting the HARQ-ACK and the channel state information.

Furthermore, the PUSCH may be used to transmit an RRC message. The RRC message is a piece of information/signal that is processed in a Radio Resource Control (RRC) layer. Furthermore, the PUSCH is used for transmitting a MAC control element (CE). At this point, the MAC CE is a piece of information/signal that is processed (transmitted) in a Medium Access Control (MAC) layer.

The PRACH is used for transmitting a random access preamble. The PRACH is used for indicating the initial connection establishment procedure, the handover procedure, the connection re-establishment procedure, synchronization (timing adjustment) for uplink transmission, and the request for the PUSCH resource.

In FIG. 1, the following uplink physical signals are used for the uplink wireless communication. The uplink physical signal is not used for transmitting the information that is output from the higher layer, but is used by a physical layer.

Uplink Reference Signal (UL RS)

According to the present embodiment, the following two types of uplink reference signal are used.

Demodulation Reference Signal (DMRS)

Sounding Reference Signal (SRS)

The DMRS is associated with transmission of the PUSCH or the PUCCH. The DMRS is time-multiplexed along with the PUSCH or the PUCCH. For example, the base station apparatus 3 uses the DMRS to perform channel reconfiguration of the PUSCH or the PUCCH.

The SRS is not associated with the transmission of the PUSCH or the PUCCH. The base station apparatus 3 uses the SRS in order to measure an uplink channel state. The terminal device 1 transmits a first SRS in a first resource that is configured by the higher layer. Additionally, in a case where information indicating a request for transmission of the SRS is received through the PDCCH, the terminal device 1 transmits a second SRS only one time on a second resource that is configured by the higher layer. At this point, the first SRS is also referred to as a periodic SRS or a type 0 trigger SRS. Furthermore, the second SRS is also referred to as an aperiodic SRS or a type 1 trigger SRS.

In FIG. 1, the following downlink physical channels are used for downlink wireless communication from the base station apparatus 3 to the terminal device 1. The downlink physical channels are used for transmitting the information that is output from the higher layer.

Physical Broadcast Channel (PBCH)

Physical Control Format Indicator Channel (PCFICH)

Physical Hybrid Automatic Repeat Request Indicator Channel (PHICH)

Physical Downlink Control Channel (PDCCH)

Enhanced Physical Downlink Control Channel (EPDCCH)

Physical Downlink Shared Channel (PDSCH)

Physical Multicast Channel (PMCH)

The PBCH is used for broadcasting a Master Information Block (MIB) (broadcast channel (BCH)) that is in a shared manner in the terminal device 1. For example, the MIB is transmitted at intervals of 40 ms. Furthermore, the MIB is repeatedly transmitted with a periodicity of 10 ms. Furthermore, information indicating a system frame number (SFN) is included in the MIB. At this point, the SFN indicates a number of a radio frame. Furthermore, the MIB is system information.

The PCFICH is used for transmitting information that indicates a region (an OFDM symbol) which is used for transmission of the PDCCH.

The PHICH is used for transmitting a HARQ indicator (HARQ feedback or response information) indicating an acknowledgement (ACK)/negative-acknowledgement (NACK) of the uplink data that is received by the base station apparatus 3.

The PDCCH and the EPDCCH are used for transmitting Downlink Control Information (DCI). At this point, multiple DCI formats are defined for transmission of the downlink control information. That is, a field for the downlink control information is defined in a DCI format and is mapped to an information bit. The downlink control information is also referred to as the DCI format.

For example, DCI format 1A that is used for scheduling of one PDSCH (transmission of one downlink transport block) in one cell is defined as a DCI format for downlink. For example, as the DCI format for downlink, DCI format 1A, DCI format 1B, DCI format 1D, DCI format 1, DCI format 2A, DCI format 2B, DCI format 2C, and DCI format 2D are defined.

For example, information relating to PDSCH scheduling is included in the DCI format for downlink. For example, pieces of downlink control information, such as information relating to resource block allocation, information relating to Modulation and Coding Scheme (MCS), information relating to a TPC command for the PUCCH, and Downlink Assignment Index (DAI), are included in the DCI format for downlink. At this point, the DCI format for downlink is also referred to as a downlink grant (or a downlink assignment).

Furthermore, for example, DCI format 0 that is used for scheduling of one PUSCH (transmission of one uplink transport block) in one cell is defined as a DCI format for uplink.

For example, information relating to PUSCH scheduling is included in the DCI format for uplink. For example, downlink control information, such as the information relating to the resource block allocation, the information relating to the MCS, and information relating to a TPC for the PUSCH, are included in the DCI formation for uplink. At this point, the DCI format for the uplink is also referred to as an uplink grant (or an uplink assignment).

In a case where a PDSCH resource is scheduled using the downlink assignment, the terminal device 1 receives the downlink data, on the scheduled PDSCH. Further, in a case where a PUSCH resource is scheduled using the uplink grant, the terminal device 1 transmits the uplink data and/or the uplink control information, on the scheduled PUSCH.

Furthermore, the terminal device 1 monitors a set of PDCCH candidates and/or a set of EPDCCH candidates. As will be described below, the PDCCH may indicate the PDCCH and/or EPDCCH. The PDCCH candidate refers to a candidate for the PDCCH that has the likelihood of being mapped and transmitted by the base station apparatus 3. Furthermore, the monitoring may have the meaning that the terminal device 1 makes an attempt to perform decoding on each of the PDCCHs within the set of PDCCH candidates, according to all DCI formats that are monitored.

At this point, the set of PDCCH candidates that are monitored by the terminal device 1 is also referred to as a search space. In a PDCCH region, a Common Search Space (CSS) and a UE-specific Search Space (USS) are included in the search space. The CSS is a region in which multiple terminal devices 1 jointly monitors the PDCCH/EPDCCH. The USS is a region that is defined based on at least a C-RNTI. In the CSS and/or the USS, the terminal device 1 monitors the PDCCH and detects the PDCCH that is destined to the terminal device 1 itself.

The base station apparatus 3 may configure a subframe (also possibly a subframe, the EPDCCH in which has to be monitored), the EPDCCH in which is monitored by the terminal device 1, for the terminal device 1. At this point, the subframe, the EPDCCH in which is monitored by the terminal device 1, may include a subframe (also possibly a subframe, the USS of the EPDCCH in which has to be monitored), the USS of the EPDCCH in which is monitored by the terminal device 1. Furthermore, the subframe, the EPDCCH in which is monitored by the terminal device 1, may include a subframe, the USS of the EPDCCH in which is monitored by the terminal device 1, excluding a subframe that is based on a rule which is stipulated in advance.

For example, the base station apparatus may transmit information (also possibly a parameter, subframePattern-Config), indicating a subframe, the EPDCCH in which is monitored by the terminal device 1, with the information being included in the RRC message. Furthermore, the subframe, the EPDCCH in which is monitored by the terminal device 1, may be configured for each cell.

Furthermore, an RNTI that the base station apparatus 3 allocates to the terminal device 1 is used for the transmission (transmission on the PDCCH) of the downlink control information. Specifically, a Cyclic Redundancy Check (CRC) parity bit is attached to the DCI format (also possibly to the downlink control information) and after being attached, the CRC parity bit is scrambled by the RNTI. At this point, the CRC parity bit that is attached to the DCI format may be obtained from a payload of the DCI format.

The terminal device 1 make an attempt to perform the decoding on the DCI format to which the CRC parity bit scrambled by the RNTI is attached, and detects the DCI format that succeeds in CRC, as the DCI format that is destined for the terminal device 1 itself (which is also referred to as blind decoding). That is, the terminal device 1 detects the PDCCH that is accompanied by the CRC that is scrambled by the RNTI. Furthermore, the terminal device 1 detects the PDCCH that is accompanied by the DCI format to which the CRC parity bit scrambled by the RNTI is attached.

At this point, a Cell-Radio Network Temporary Identifier (C-RNTI) is included in the RNTI. The C-RNTI is an identifier that is used for RRC connection and scheduling identification, and the is unique to the terminal device 1. The C-RNTI is used for unicast transmission that is dynamically scheduled.

Furthermore, a semi-persistent Scheduling C-RNTI (SPS C-RNTI) is included in the RNTI. The SPS C-RNTI is an identifier that is used for semi-persistent scheduling, and that is unique to the terminal device 1. The SPS C-RNTI is used for the unicast transmission that is semi-persistently scheduled.

At this point, the transmission that is semi-persistently scheduled has the meaning of transmission that is periodically scheduled. For example, the SPS C-RNTI is used for activation and/or reactivation of the transmission that is semi-persistently scheduled, and/or retransmission. Furthermore, the SPS C-RNTI is used for release and/or deactivation of the transmission that is semi-persistently scheduled. At this point, the semi-persistent scheduling may be performed only in the primary cell.

For example, using the DCI format (for example, DCI format 1 or DCI format 1A) for downlink, the base station apparatus 3 can allocate a resource (a physical resource block) for the semi-persistent PDSCH and may instruct the terminal device 1 to activate the transmission on the semi-persistent PDSCH. Furthermore, using the DCI format for downlink, the base station apparatus 3 may instruct the terminal device 1 to release (deactivate) the resource for the semi-persistent PDSCH.

At this point, release of the resource for the semi-persistent PDSCH may be indicated by setting a field for the downlink control information that is included in the DCI format to which the CRC parity bit scrambled by the SPS C-RNTI is attached, to a specific value. For example, in a case where a field for an HARQ process, a field for the MCS, a field for a redundancy version, and a field for the resource allocation are included in the DCI format 1A, the release of the resource for the semi-persistent PDSCH has to be released may be indicated by setting the field for the HARQ process number to "0000", setting the field for the MCS to "11111", setting the field for the redundancy version to "00", and setting the field for the resource allocation is set to "all 1s".

At this point, the DCI format indicating the release of the resource for the semi-persistent PDSCH is also referred to as a PDCCH indicating downlink SPS release or a EPDCCH indicating the downlink SPS release. As will be described below, the PDCCH indicating the downlink SPS release and the EPDCCH indicating the downlink SPS release are also collectively referred to as the PDCCH/EPDCCH indicating the downlink SPS release.

The PDSCH is used for transmitting the downlink data. Transmission of the downlink data on the PDSCH will also be described below as transmission on the PDSCH. Reception of the downlink data on the PDSCH will also be described below as reception on the PDSCH.

Furthermore, the PDSCH is used for transmitting a system information block type-1 message. Furthermore, the system information block type-1 message is cell-specific (cell-peculiar) information. Furthermore, the system information block type 1 message is an RRC message.

Furthermore, the PDSCH is used for transmitting a system information message. The system information message may include a system information block X other than a system information block type 1. Furthermore, the system information message is cell-specific (cell-peculiar) information. Furthermore, the system information message is an RRC message.

Furthermore, the PDSCH is used for transmitting the RRC message. At this point, the RRC message that is transmitted from the base station apparatus 3 may be common to multiple terminal devices 1 within the cell. Furthermore, the RRC message that is transmitted from the base station apparatus 3 may be a message (which is also referred to as dedicated signaling) dedicated to a certain terminal device 1. That is, user equipment-specific (user equipment-peculiar) information is transmitted using a message dedicated to a certain terminal device 1. Furthermore, the PDSCH is used for transmitting the MAC CE.

At this point, the RRC message and/or the MAC CE are also referred to as higher-layer signaling.

The PMCH is used for transmitting multicast data (a Multicast Channel (MCH)).

In FIG. 1, the following downlink physical signals are used for downlink wireless communication. The downlink physical signal is not used for transmitting the information that is output from the higher layer, but is used by the physical layer.

The synchronization signal is used in order for the terminal device 1 to be synchronized to a frequency domain and a time domain for downlink. For example, in the TDD scheme, the synchronization signal is mapped to subframes 0, 1, 5, and 6 within a radio frame. Furthermore, in the FDD scheme, the synchronization signal is mapped to subframes 0 and 5 within the radio frame.

The downlink reference signal is used in order for the terminal device 1 to perform the channel reconfiguration of the downlink physical channel. The downlink reference signal may be used in order for the terminal device 1 to calculate the channel state information for downlink.

According to the present embodiment, the following five types of downlink reference signals are used.

Cell-specific Reference Signal (CRS)

UE-specific Reference Signal (URS) associated with the PDSCH

Demodulation Reference Signal (DMRS) associated with the EPDCCH

Non-Zero Power Channel State Information—Reference Signal (NZP CSI-RS)

Zero Power Channel State Information—Reference Signal (ZP CSI-RS)

Multimedia Broadcast and Multicast Service over Single Frequency Network Reference signal (MBSFN RS)

Positioning Reference Signal (PRS)

The CRS is transmitted in an entire band for a subframe. The CRS is used for performing demodulation of the PBCH/PDCCH/PHICH/PCFICH/PDSCH. The CRS may be used in order for the terminal device 1 to calculate the channel state information for downlink. The PBCH/PDCCH/PHICH/PCFICH is transmitted on an antenna port that is used for transmission of the CRS.

The URS associated with the PDSCH is transmitted in a subframe and in a band. The subframe and the band are used for transmission of the PDSCH with which the URS is associated. The URS is used for performing the demodulation of the PDSCH with which the URS is associated.

The PDSCH is transmitted on an antenna port that is used for transmission of the CRS or the URS. DCI format 1A is used for the scheduling of the PDSCH that is transmitted on the antenna port which is used for the transmission of the CRS. For example, the CRS is transmitted on one or several of antenna ports i (i=0 to 3).

The DMRS associated with the EPDCCH is transmitted in a subframe and a band that are used for transmission of the EPDCCH with which the DMRS is associated. The DMRS is used for performing demodulation of the EPDCCH with which the DMRS is associated. The EPDCCH is transmitted on an antenna port that is used for transmission of the DMRS.

The NZP CSI-RS is transmitted in a subframe that is configured. A resource on which the NZP CSI-RS is transmitted is configured by the base station apparatus. The NZP CSI-RS is used in order for the terminal device 1 to calculate the channel state information for downlink. The terminal device 1 performs signal measurement (channel measurement) using the NZP CSI-RS.

A resource for the ZP CSI-RS is configured by the base station apparatus 3. With a zero output, the base station apparatus 3 transmits the ZP CSI-RS. More precisely, the base station apparatus 3 does not transmit the ZP CSI-RS. The base station apparatus 3 does not transmit the PDSCH and the EPDCCH on a resource on which the ZP CSI-RS is configured. For example, the terminal device 1 can measure interference in a resource to which the NZP CSI-RS corresponds in a certain cell.

The MBSFN RS is transmitted in an entire band for a subframe that is used for transmission of the PMCH. The MBSFN RS is used for performing demodulation of the PMCH. The PMCH is transmitted on an antenna port that is used for transmission of the MBSFN RS.

The PRS is used in order for the terminal device to measure a geographical location of the terminal device itself.

At this point, the downlink physical channel and the downlink physical signal are also collectively referred to as a downlink signal. Furthermore, the uplink physical channel and the uplink physical signal are also collectively referred to as an uplink signal. Furthermore, the downlink physical channel and the uplink physical channel are also collectively referred to as a physical channel. Furthermore, the downlink physical signal and the uplink physical signal are also collectively referred to as a physical signal.

Furthermore, the BCH, the MCH, the UL-SCH, and the DL-SCH are transport channels. A channel that is used in a Medium Access Control (MAC) layer is referred to as a transport channel. A unit of the transport channel that is used in the MAC layer is also referred to as a transport block (TB) or a MAC Protocol Data Unit (PDU). Control of a hybrid automatic repeat request (HARQ) is performed for every transport block in the MAC layer. The transport block is a unit of data that the MAC layer delivers to the physical layer. In the physical layer, the transport block is mapped to a codeword, and coding processing is performed on every codeword.

A constitution of the radio frame will be described below.

Figure 2:
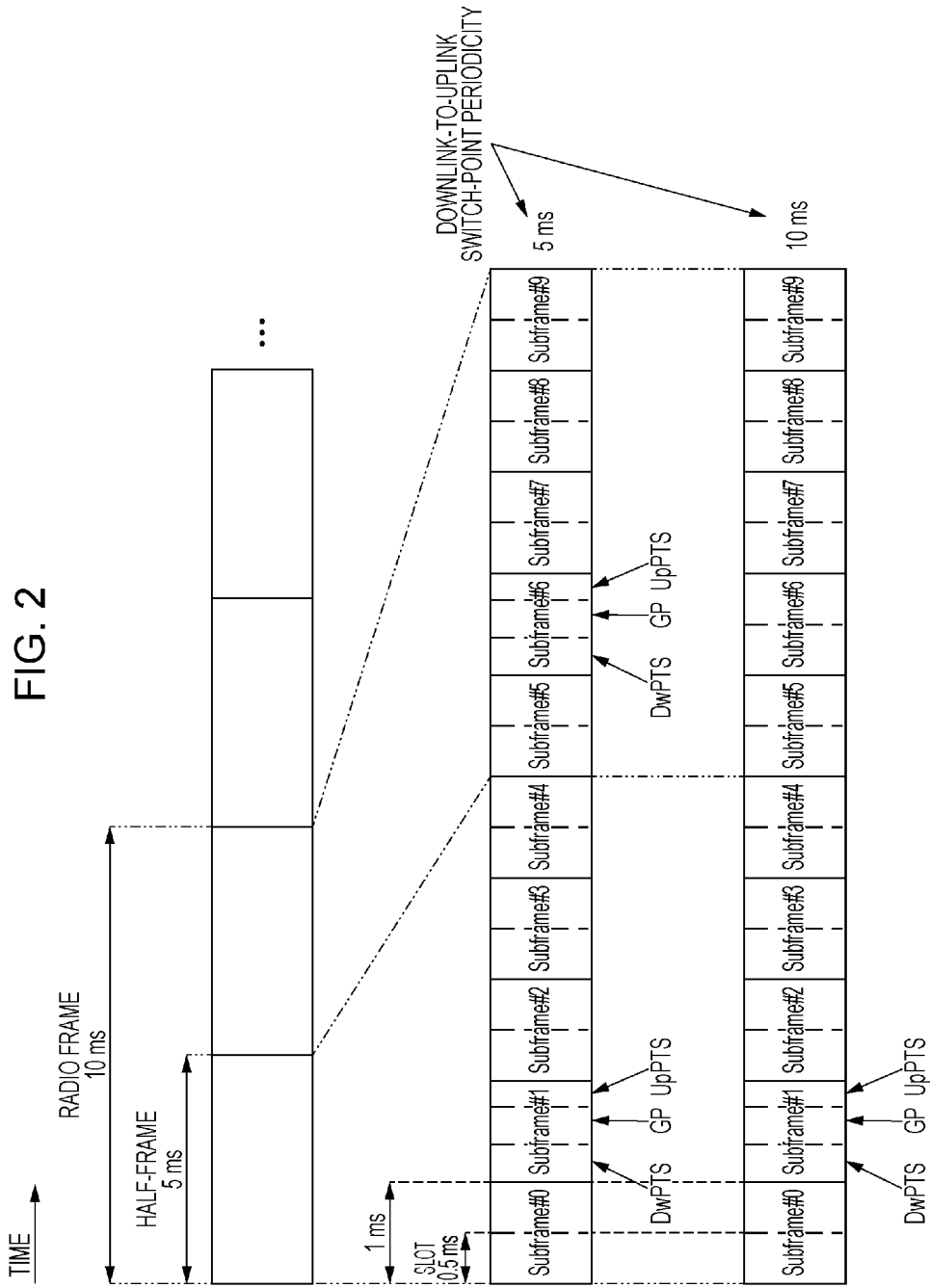
FIG. 2 is a diagram illustrating a constitution of a radio frame.

FIG. 2 is a diagram illustrating a schematic constitution of the radio frame according to the present embodiment. In FIG. 2, the horizontal axis is a time axis. For example, each radio frame is Tf=307200·Ts=10 ms long. At this point, Tf is referred to as a radio frame duration. Furthermore, Ts is referred to as a basic time unit. Furthermore, each radio frame is constituted from two half frames, and each half frame is 153600·Ts=5 ms long. Furthermore, each half frame is constituted from five subframes, and each subframe is 30720·Ts=1 ms long.

Furthermore, each subframe is defined by two consecutive slots, and each slot is Tslot=15360·Ts=0.5 ms long. Furthermore, an i-th subframe within the radio frame is constituted from a (2×i)-th slot and a (2×i+1)-th slot. That is, ten subframes can be used at intervals of 10 ms. At this point, the subframe is also referred to a Transmission Time Interval (TTI).

According to the present embodiment, the following three types of subframes are defined.

Downlink Subframe (first subframe)

Uplink Subframe (second subframe)

Special Subframe (third subframe)

The downlink subframe is a subframe that is reserved for downlink transmission. Furthermore, the uplink subframe is a subframe that is reserved for uplink transmission. Furthermore, the special subframe is constituted from three fields. The three fields are a downlink pilot time slot (DwPTS), a guard period (GP), and an uplink pilot time slot (UpPTS).

For example, subframe 0, subframe 5, and the DwPTS may be reserved at all times for the downlink transmission. Furthermore, the UpPTS, and the subframe after the special subframe may be reserved at all times for the uplink transmission. At this point, a single radio frame is constituted at least from the downlink subframe, the uplink subframe, and the special subframe.

Furthermore, in the radio frame, downlink-to-uplink switch-point periodicities of 5 ms and 10 ms are supported. In a case where the downlink-to-uplink switch-point periodicity is 5 ms, the special subframe is included in both of the half frames within the radio frame. In a case where the downlink-to-uplink switch-point periodicity is 10 ms, the special subframe is included in an initial half frame within the radio frame.

A constitution of a slot will be described below.

Figure 3:
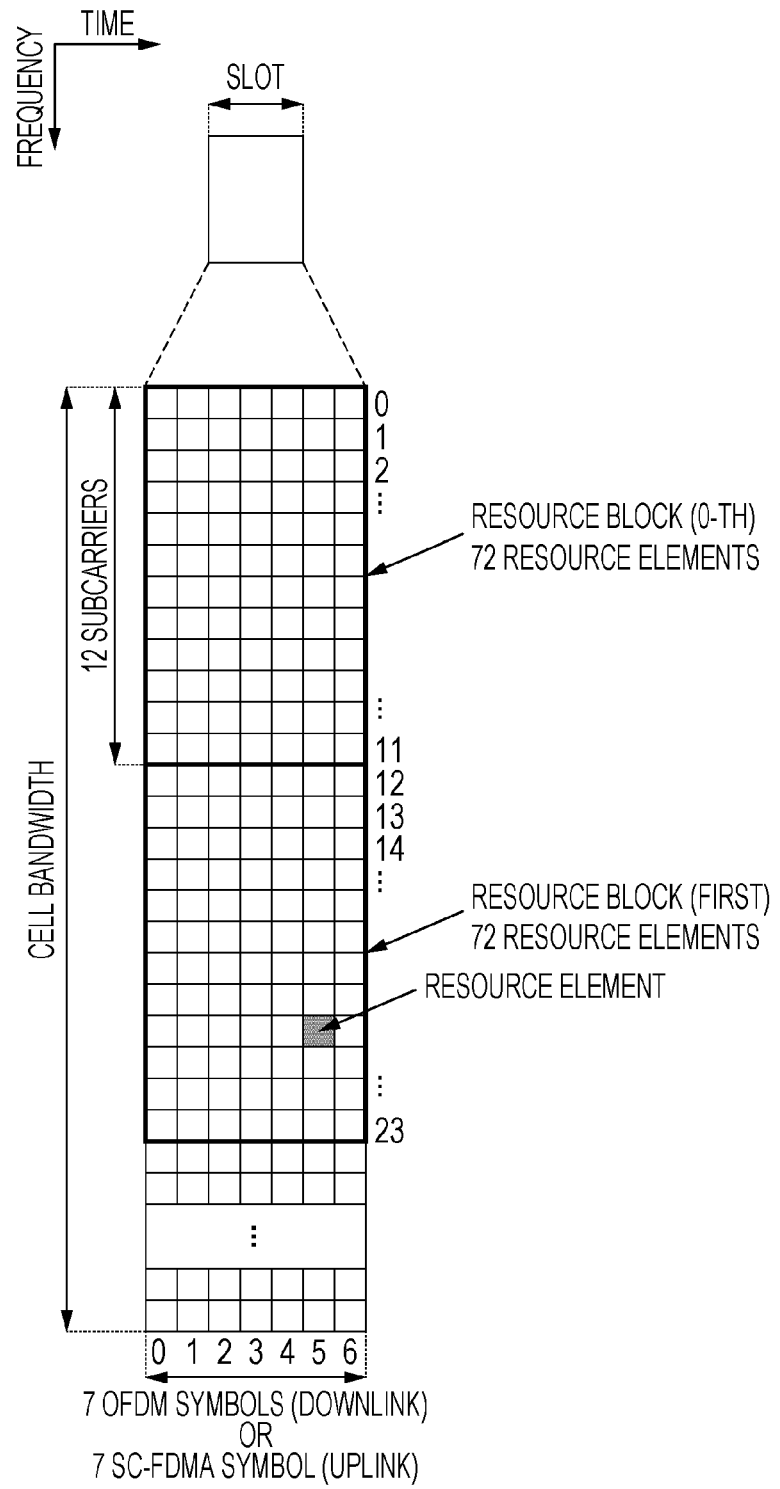
FIG. 3 is a diagram illustrating a constitution of a slot.

FIG. 3 is a diagram illustrating a constitution of the slot according to the present embodiment. In FIG. 3, the horizontal axis indicates a time axis and the vertical axis indicates a frequency axis. Furthermore, the physical signal or the physical channel that is transmitted on each of the slots is expressed by a resource grid. In the downlink, the resource grid is defined by multiple subcarriers and multiple OFDM symbols. In the uplink, the resource grid is defined by multiple subcarriers and multiple SC-FDMA symbols.

Furthermore, the number of subcarriers that constitute one slot depends on a cell bandwidth. For example, the number of OFDM symbols or SCFDMA symbols that constitute one slot is 7. At this point, each of the elements within the resource grid is referred to as a resource element. Furthermore, the resource element is identified using a subcarrier number and an OFDM symbol or SC-FDMA symbol number.

A resource block is used for expressing mapping of a certain physical channel (the PDSCH, the PUSCH, or the like) to resource elements. The resource block is defined by a virtual resource block and a physical resource block. A certain physical channel is first mapped to the virtual resource block. Thereafter, the virtual resource block is mapped to the physical resource block.

For example, one physical resource block is defined by seven consecutive OFDM symbols or SC-FDMA symbols in the time domain and 12 consecutive subcarriers in the frequency domain. That is, one physical resource block is constituted from (7×12) resource elements. Furthermore, one physical resource block corresponds to one slot in the time domain, and corresponds to 180 kHz in the frequency domain. The physical resource blocks are numbered from 0 in the frequency domain.

The physical channel and the physical signal that are transmitted in each of the subframes will be described below.

Figure 4:
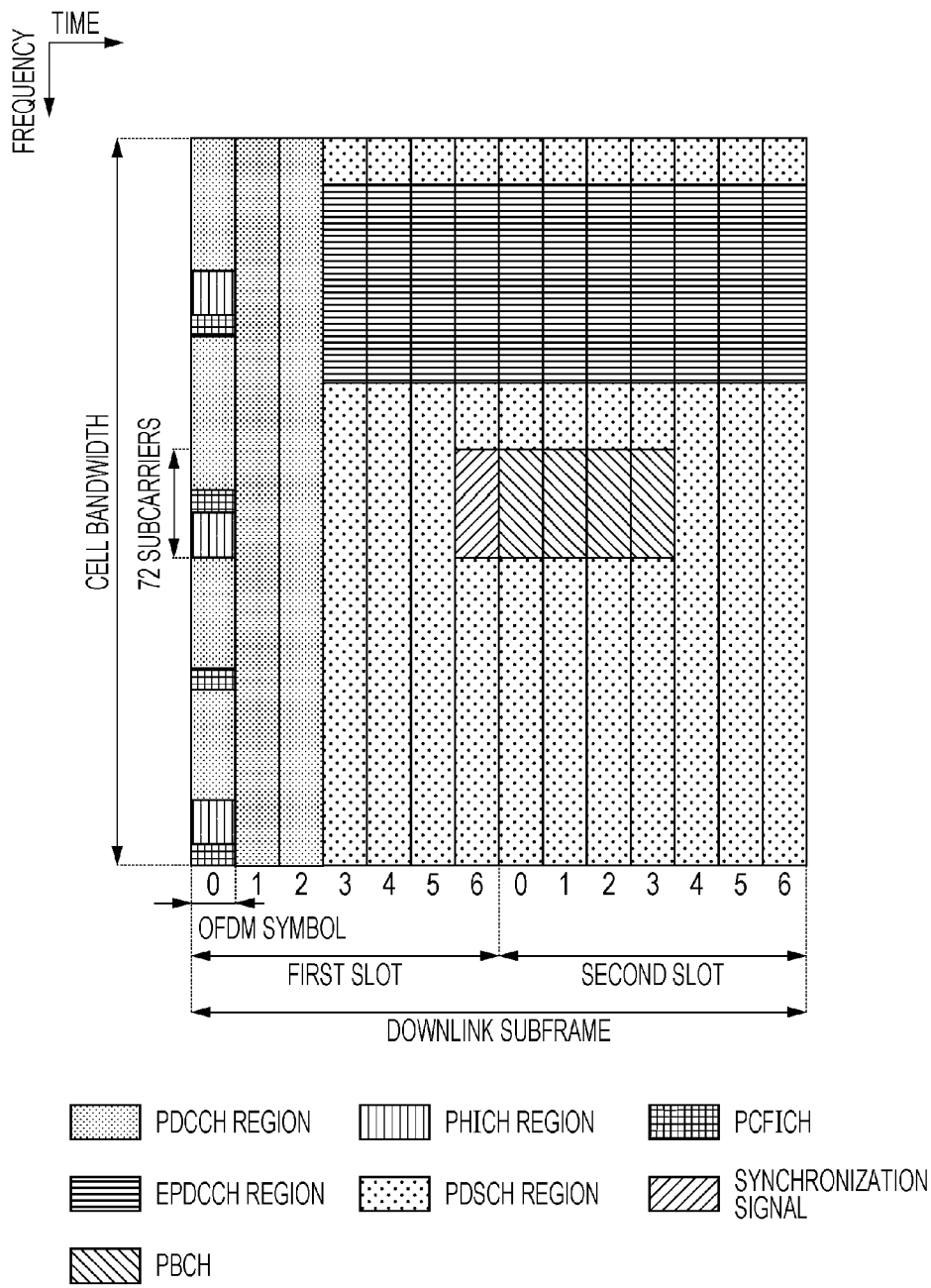
FIG. 4 is a diagram illustrating an example of mapping of a signal in a downlink subframe.

FIG. 4 is a diagram illustrating one example of allocation of the physical channel and mapping of the physical signal in the downlink subframe according to the present embodiment. In FIG. 4, the horizontal axis indicates a time axis and the vertical axis indicates a frequency axis. As illustrated in FIG. 4, the base station apparatus 3 may transmit the downlink physical channel (the PBCH, the PCFICH, the PHICH, the PDCCH, the EPDCCH, or the PDSCH), and the downlink physical signal (the synchronization signal or the downlink reference signal) in the downlink subframe. At this point, the downlink reference signal is not illustrated in FIG. 4 for brief description.

At this point, multiple PDCCHs may be frequency- and time-multiplexed in a PDCCH region. Multiple EPDCCHs may be frequency-, time-, and space-multiplexed in an EPDCCH region. Multiple PDSCHs may be frequency- and time-multiplexed in a PDSCH region. The PDCCH and, the PDSCH or the EPDCCH may be time-multiplexed. The PDSCH and the EPDCCH may be frequency-multiplexed.

Figure 5:
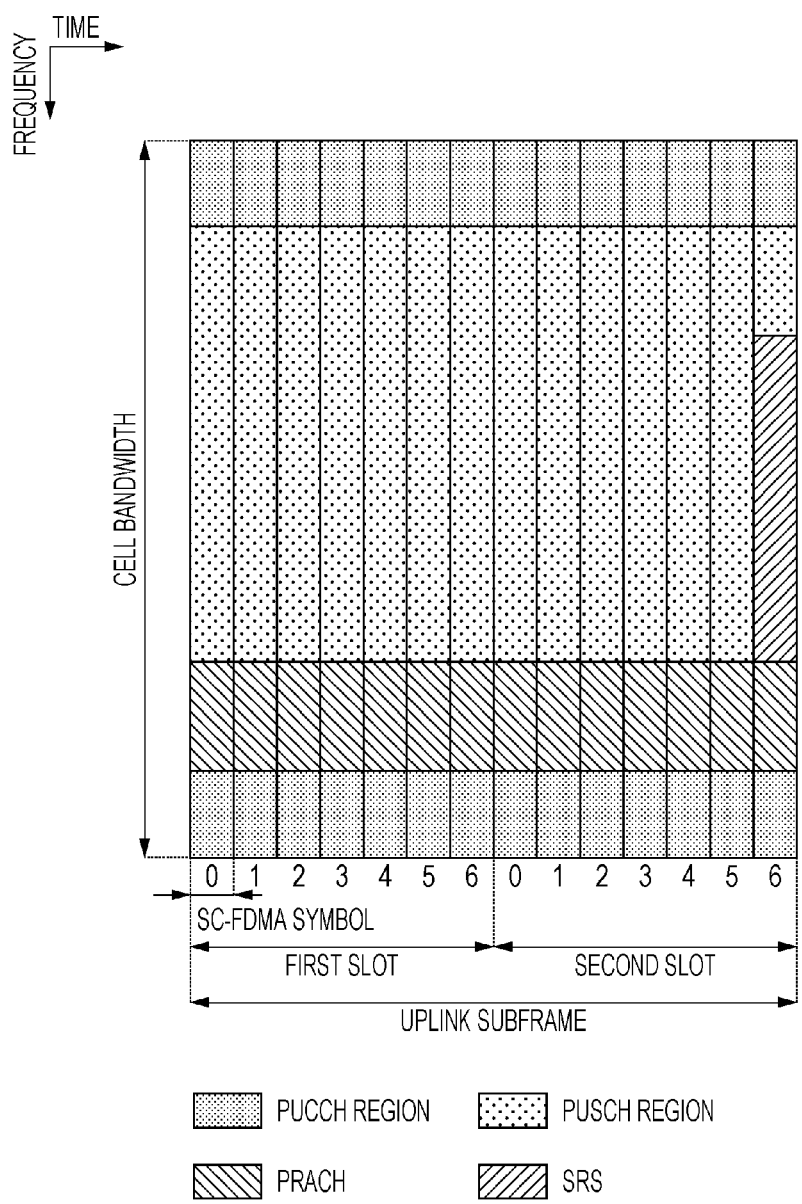
FIG. 5 is a diagram illustrating an example of mapping of a signal in an uplink subframe.

FIG. 5 is a diagram illustrating one example of allocation of the physical channel and mapping of the physical signal in the uplink subframe according to the present embodiment. In FIG. 5, the horizontal axis indicates a time axis and the vertical axis indicates a frequency axis. The terminal device 1 may transmit the uplink physical channel (the PUCCH, the PUSCH or the PRACH) and the uplink physical signal (the DMRS or the SRS) in the uplink subframe.

At this point, in a PUCCH region, multiple PUCCHs may be frequency-, time-, and code-multiplexed. In a PUSCH region, multiple PUSCHs are frequency- and space-multiplexed. The PUCCH and the PUSCH may be frequency-multiplexed. The PRACH may be allocated over a single subframe or two subframes. Furthermore, multiple PRACHs may be code-multiplexed.

Furthermore, the SRS may be transmitted using the last SC-FDMA symbol within the uplink subframe. It is difficult for the terminal device 1 to perform the transmission of the SRS and transmission on the PUCCH/PUSCH/PRACH at the same time, on a single SC FDMA symbol in a single cell. In a single uplink subframe in the single cell, the terminal device 1 can perform the transmission on the PUSCH and/or the PUCCH using the SC-FDMA symbol with the last SC-FDMA symbol within the uplink subframe being excluded, and can perform the transmission of the SRS using the last SC-FDMA symbol within the uplink subframe.

That is, in the single uplink subframe in the single cell, the terminal device 1 can perform both of the transmission of the SRS and the transmission on the PUSCH/PUCCH. At this point, the DMRS may be time-multiplexed along with the PUCCH or the PUSCH. At this point, the DMRS is not illustrated in FIG. 5 for brief description.

Figure 6:
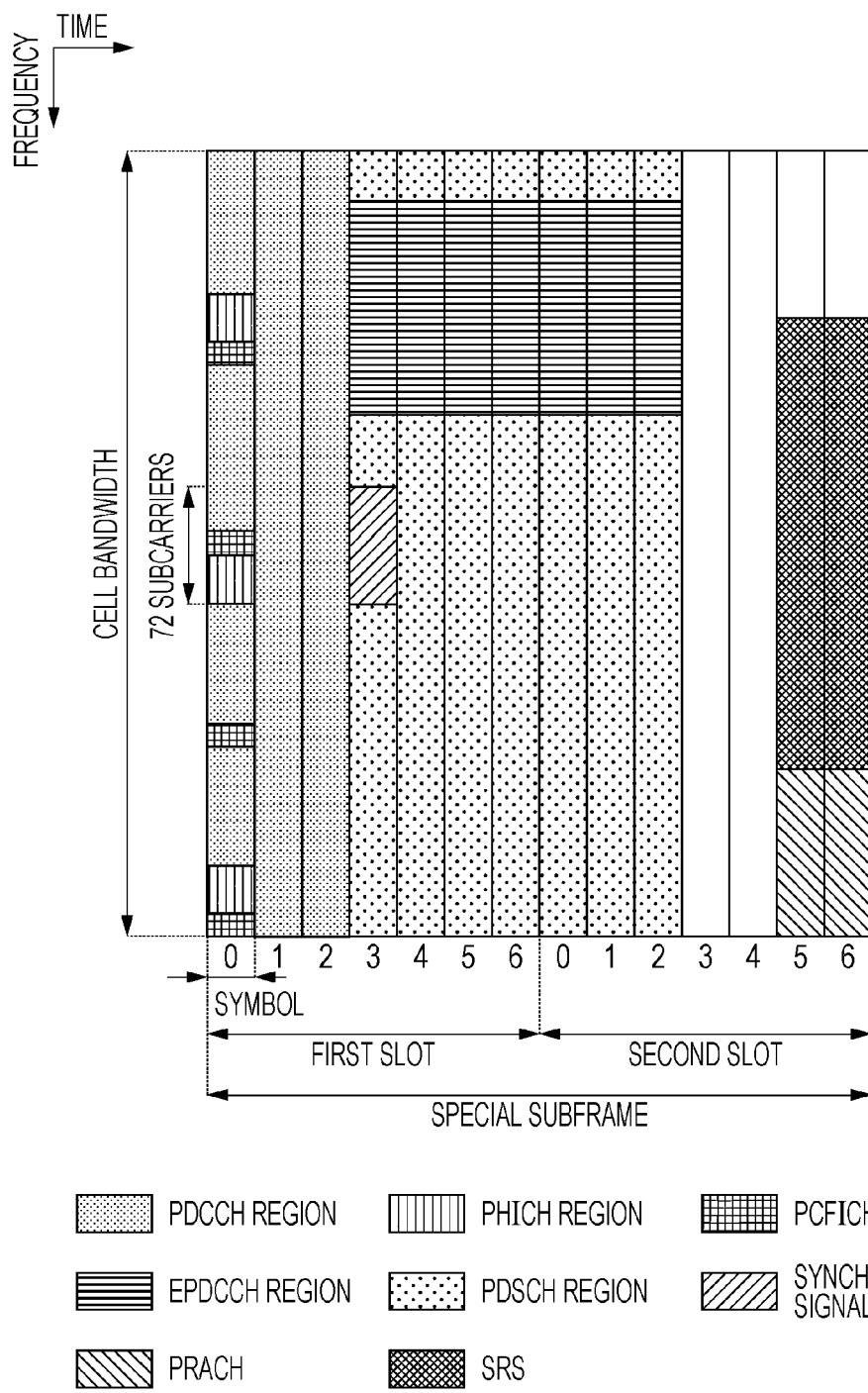
FIG. 6 is a diagram illustrating an example of mapping of a signal in a special subframe.

FIG. 6 is a diagram illustrating one example of the allocation of the physical channel and the mapping of the physical signal in the special subframe according to the present embodiment. In FIG. 6, the horizontal axis indicates a time axis and the vertical axis indicates a frequency axis.

For example, as illustrated in FIG. 6, the DwPTS is constituted from first to tenth OFDMA symbols (OFDMA symbols 0 to 6 in a first slot and OFDMA symbols 0 to 2 in a second slot) within the special subframe. Furthermore, the GP is constituted from durations that correspond to eleventh and twelfth symbols (symbol 3 and symbol 4 in the second slot) within the special subframe. Furthermore, the UpPTS is constituted from thirteenth and fourteenth SC-FDMA symbols (SC-FDMA symbol 5 and SC-FDMA symbol 6 in the second slot) within the special subframe.

The base station apparatus 3 may transmit the PCFICH, the PHICH, the PDCCH, the EPDCCH, the PDSCH, the synchronization signal, and the Downlink Reference Signal, in the DwPTS of the special subframe. Furthermore, the base station apparatus 3 may not transmit the PBCH in the DwPTS of the special subframe. Furthermore, the terminal device 1 may transmit the PRACH and the SRS in the UpPTS of the special subframe. That is, the terminal device 1 may not transmit the PUCCH, the PUSCH, and the DMRS in the UpPTS of the special subframe. At this point, the downlink reference signal is not illustrated in FIG. 6 for brief description.

A first uplink reference uplink-downlink configuration (UL reference UL-DL configuration), a first downlink reference uplink-downlink configuration (DL reference UL-DL configuration), a second UL reference UL-DL configuration, a second DL reference UL-DL configuration, and a third uplink-downlink configuration (UL-DL configuration) will be described below.

At this point, the third UL-DL configuration is also referred to as an explicit L1 signaling. Furthermore, the third UL-DL configuration is also referred to as an explicit L1 configuration. Furthermore, the third UL-DL configuration is also referred to as a transmission direction uplink-downlink configuration (transmission direction UL-DL configuration).

For example, the first UL reference UL-DL configuration, the first DL reference UL-DL configuration, the second UL reference UL-DL configuration, the second DL reference UL-DL configuration, and the third UL-DL configuration are defined by an uplink-downlink configuration (UL-DL configuration).

At this point, the UL-DL configuration is a configuration relating to a pattern of a subframe within the radio frame. That is, the UL-DL configuration indicates which of the downlink subframe, the uplink subframe, and the special subframe each of the subframes within the radio frame is.

That is, the first UL reference UL-DL configuration, the second UL reference UL-DL configuration, the first DL reference UL-DL configuration, the second DL reference UL-DL configuration, and the third UL-DL configuration are defined by patterns of the downlink subframe, the uplink subframe and the special subframe within the radio frame.

For example, the patterns of the downlink subframe, the uplink subframe, and the special subframe indicate which of the downlink subframe, the uplink subframe, and the special subframe each of subframes #0 to #9 is, and are preferably expressed by arbitrary combinations of D, U, and S (which indicate the downlink subframe, the uplink subframe, and the special subframe, respectively), in each of which a sum of lengths of D, U, and S is 10. More preferably, the head subframe (more precisely, subframe #0) is D, and the second subframe is S (more precisely, subframe #1).

FIG. 7 is a table illustrating one example of the UL-DL configuration according to the present embodiment. In FIG. 7, D indicates a downlink subframe, U indicates an uplink subframe, and S indicates a special subframe.

At this point, setting of UL-DL configuration i as the first or second UL reference UL-DL configuration is referred to as setting of first or second UL reference UL-DL configuration i. Furthermore, setting of UL-DL configuration i as the first or second DL reference UL-DL configuration is referred to as setting of first or second DL reference UL-DL configuration i. Furthermore, setting of UL-DL configuration i as the third UL-DL configuration is referred to as setting of third UL-DL configuration i.

Furthermore, setting of UL-DL configuration i as the UL reference UL-DL configuration is referred to as setting of UL reference UL-DL configuration i. Furthermore, setting of UL-DL configuration i as the DL reference UL-DL configuration is referred to as DL reference UL-DL configuration i.

A method will be described below in which the setting as each of the first UL reference UL-DL configuration, the first DL reference UL-DL configuration, and the third UL-DL configuration is provided.

The base station apparatus 3 sets the first UL reference UL-DL configuration, the first DL reference UL-DL configuration, and the third UL-DL configuration.

Furthermore, the base station apparatus 3 may transmit first information (TDD-Config) indicating the first UL reference UL-DL configuration to the terminal device 1, with the first information being included in at least one of the MIB, the system information block type 1 message, the system information message, the RRC message, the MAC Control Element (CE) and physical layer control information (for example, the DCI format).

Furthermore, the base station apparatus 3 may transmit second information indicating the first DL reference UL-DL configuration to the terminal device 1, with the second information being included in at least one of the MIB, the system information block type 1 message, the system information message, the RRC message, the MAC control element (CE) and the physical layer control information (for example, the DCI format).

Furthermore, the base station apparatus 3 may transmit third information indicating the third UL-DL configuration to the terminal device 1, with the third information being included in at least one of the MIB, the system information block type 1 message, the system information message, the RRC message, the MAC Control Element (CE) and the physical layer control information (for example, the DCI format).

At this point, for each of the multiple cells, the first UL reference UL-DL configuration, the second UL reference UL-DL configuration, the first DL reference UL-DL configuration, the second DL reference UL-DL configuration, and the third UL-DL configuration may be defined.

That is, for each of the cells, the base station apparatus 3 may transmit the first information, the second information, and the third information to the terminal device 1 for which multiple cells are configured. That is, for each of the cells, the first information, the second information, and the third information may be configured.

That is, the terminal device 1 for which the multiple cells are configured may set the first UL reference UL-DL configuration, the first DL reference UL-DL configuration, and the third UL-DL configuration, for each of the cells, based on the first information, the second information, and the third information.

For example, it is preferable that the first information for the primary cell is included in the system information block type 1 message or the RRC message. Furthermore, it is preferable that the first information for the secondary cell is included in the RRC message.

Furthermore, it is preferable that the second information for the primary cell is included in the system information block type 1 message, the system information message, or the RRC message. Furthermore, it is preferable that the second information for the secondary cell is included in the RRC message. Furthermore, it is preferable that the third information is included in the physical layer control information (for example, the DCI format).

At this point, initial transmission of the system information block type 1 message on the PDSCH is performed in subframe 5 of a radio frame that satisfies SFN mod 8=0, and re-transmission (repetition) thereof on the PDSCH is performed in subframe 5 of a different radio frame that satisfies SFN mod 2=0. For example, the system information block type 1 message may include information indicating a constitution (lengths of the DwPTS, the GP, and the UpPTS) of the special subframe. Furthermore, the system information block type 1 message is cell-specific information.

Furthermore, the system information message is transmitted on the PDSCH. Furthermore, the system information message is cell-specific information. The system information message includes the system information block X other than the system information block type-1.

Furthermore, the RRC message is transmitted on the PDSCH. At this point, the RRC message is a pieces of information/signal that is processed in the RRC layer. The RRC message may be common to multiple terminal devices 1 within the cell, and may be dedicated to a specific terminal device 1.

Furthermore, the MAC CE is transmitted on the PDSCH. At this point, the MAC CE is a piece of information/signal that is processed in the MAC layer.

Figure 8:
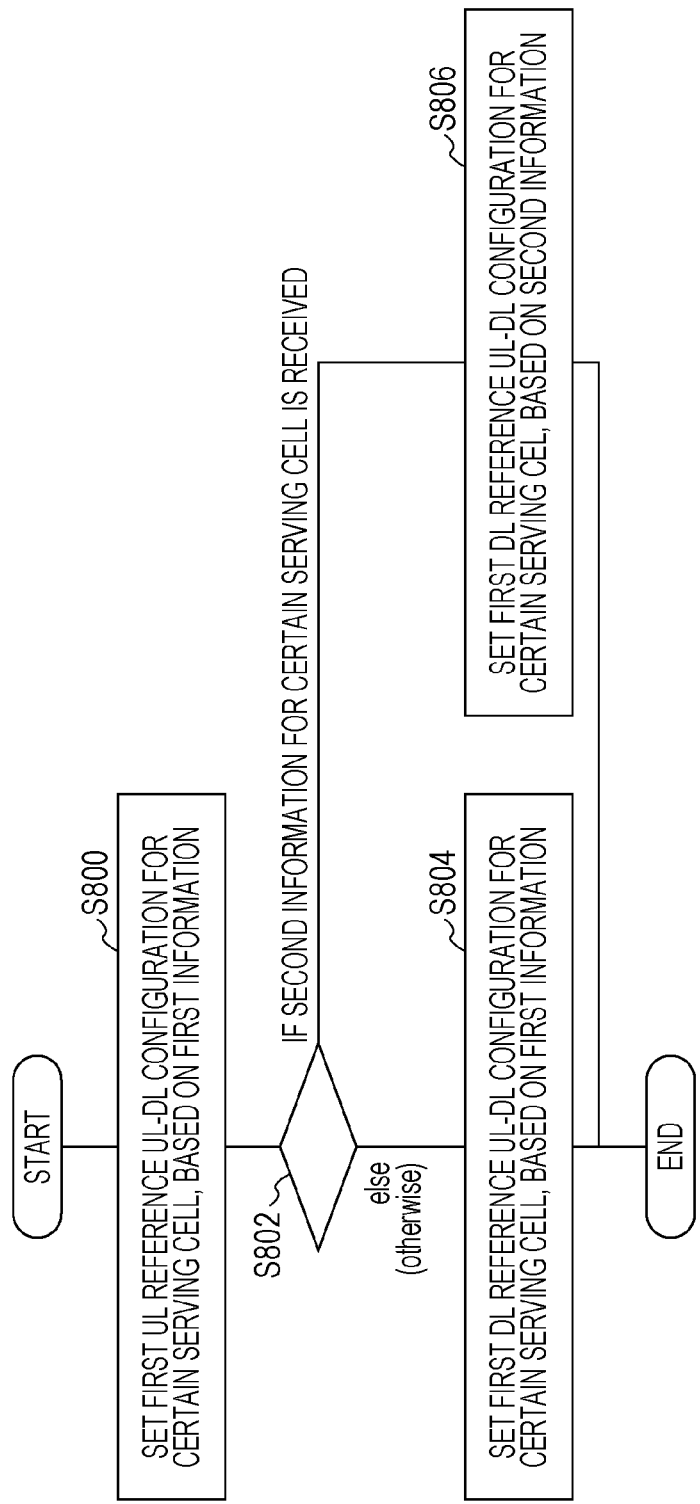
FIG. 8 is a flowchart illustrating a method of setting a first UL reference UL-DL configuration and a first DL reference UL-DL configuration.

FIG. 8 is a flowchart illustrating a method of setting the first UL reference UL-DL configuration and the first DL reference UL-DL configuration according to the present embodiment. The terminal device 1 may execute the setting method in FIG. 8 on each of the multiple cells.

The terminal device 1 sets the first UL reference UL-DL configuration for a certain cell based on the first information (S800). Furthermore, the terminal device 1 determines whether the second information for the certain cell is received (S802). At this point, in a case where the second information for the serving cell is received, the terminal device 1 sets the first DL reference UL-DL configuration for the serving cell, based on the second information for the certain cell (S806). Furthermore, in a case where the second information for the certain cell is not received (else/otherwise), the terminal device 1 sets the first DL reference UL-DL configuration for the certain cell, based on the first information for the certain cell (S804).

At this point, the cell for which the first DL reference UL-DL configuration is set based on the second information is also referred to as a cell for which timing TDD (also possibly eIMTA) is configured.

The base station apparatus 3 transmits information (information associated with the eIMTA) associated with the timing TDD, and thus can set a configuration in which operation is performed using the timing TDD (also possibly the eIMTA), for the terminal device 1.

Furthermore, in a case where the second information for a certain cell is not received, the first UL reference UL-DL configuration and the first DL reference UL-DL configuration may not be defined. That is, in the case where the second information for a certain cell is not received, the terminal device 1 may set one UL-DL configuration for the certain cell, based on the first information for the certain cell.

Furthermore, the terminal device 1 receives the second information and, based on the second information, determines the subframe that is available for uplink transmission. Next, the terminal device 1 monitors the third information. In a case where the third information is received, the terminal device 1 determines the subframe that is available for the uplink transmission, based on the third information.

For example, the base station apparatus 3 may transmit the third information to the terminal device 1 using the PDCCH/EPDCCH. That is, the third information may be used for the base station apparatus 3 (a cell) to control the operation of the timing TDD within a coverage area. At this point, the third information may be transmitted and received in the CSS and/or the USS.

The terminal device 1 makes an attempt to perform the decoding on the received signal, and determines whether or not the PDCCH/EPDCCH (also possibly the DCI format) on which the third information is transmitted is detected. In a case where the PDCCH/EPDCCH on which the third information is transmitted is detected, the terminal device 1 determines the subframe that is available for the uplink transmission, based on the detected third information. Furthermore, in a case where the PDCCH/EPDCCH on which the third information is transmitted is not detected, the terminal device 1 may maintain the determination so far made as to the subframe that is available for the uplink transmission.

A method of setting the second UL reference UL-DL configuration will be described below.

In a case where multiple cells are configured for the terminal device 1 and the first UL reference UL-DL configurations for at least two cells are different from each other, the terminal device 1 and the base station apparatus 3 may set the second UL reference UL-DL configuration.

Furthermore, in cases other than the case where multiple cells are configured for the terminal device 1 and the first UL reference UL-DL configurations for at least two cells are different from each other, the terminal device 1 and the base station apparatus 3 may not set the second UL reference UL-DL configuration. At this point, the cases other than the case where the first UL reference UL-DL configurations for at least two serving cells are different from each other may include a case where the first UL reference UL-DL configurations for all the serving cells (for example, two serving cells) are the same.

Furthermore, in a case where (only) one cell is configured for the terminal device 1, the base station apparatus 3 and the terminal device 1 may not set the second UL reference UL-DL configuration.

Figure 9:
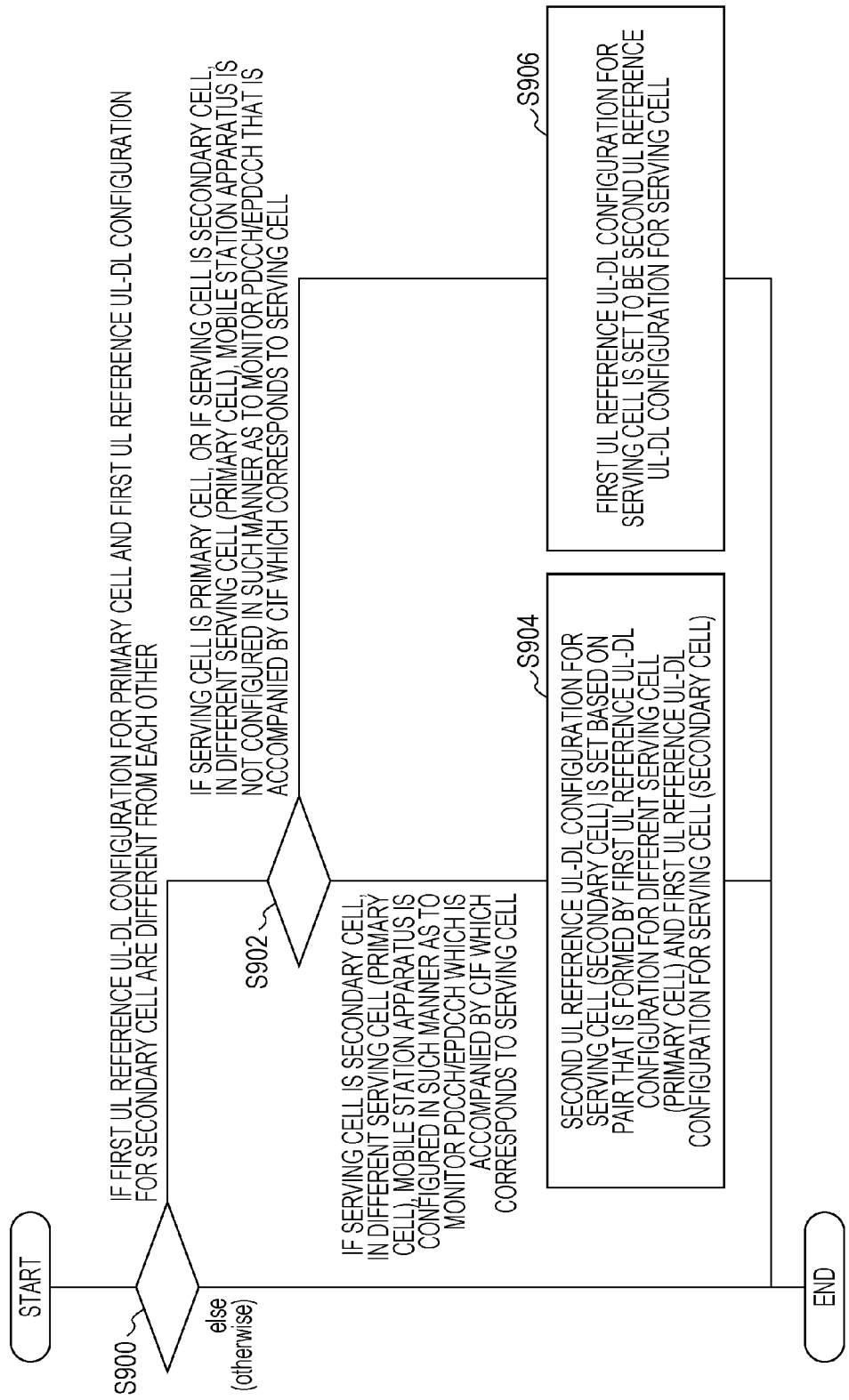
FIG. 9 is a flowchart illustrating a method of setting a second UL reference UL-DL configuration.

FIG. 9 is a flowchart illustrating a method of setting the second UL reference UL-DL configuration according to the present embodiment. FIG. 9 illustrates that one primary cell and one secondary cell are configured for the terminal device 1. At this point, the terminal device 1 may execute the setting method in FIG. 9 on each of the primary cell and the secondary cell.

The terminal device 1 determines whether or not the first UL reference UL-DL configuration for the primary cell and the first UL reference UL-DL configuration for the secondary cell are different from each other (S900). At this point, in a case where the first UL reference UL-DL configuration for the primary cell and the first UL reference UL-DL configuration for the secondary cell are the same, the terminal device 1 ends setting processing on the second UL reference UL-DL configuration, without setting the second UL reference UL-DL configuration.

Furthermore, in a case where the first UL reference UL-DL configuration for the primary cell and the first UL reference UL-DL configuration for the secondary cell are different from each other, the terminal device 1 determines whether the serving cell is a primary cell or a secondary cell, and/or whether, in a different serving cell, the terminal device 1 is configured in such as manner as to monitor the PDCCH/EPDCCH that is accompanied by a Carrier Indicator Field (CIF) which corresponds to the serving cell (S902).

At this point, in a case where the serving cell is a secondary cell, and where, in a different serving cell (that is, the primary cell), the terminal device 1 is configured in such a manner as to monitor the PDCCH/EPDCCH that is accompanied by the CIF which corresponds to the serving cell (the secondary cell), the second UL reference UL-DL configuration for the serving cell (the secondary cell) is set based on a pair that is formed by the first UL reference UL-DL configuration for the different serving cell (the primary cell) and the first UL reference UL-DL configuration for the serving cell (the secondary cell) (S904).

For example, in S904, the terminal device 1 sets the second UL reference UL-DL configuration for the serving cell (the secondary cell) based on a table in FIG. 10. FIG. 10 is a diagram illustrating a correspondence between the pair that is formed by the first UL reference UL-DL configuration for the different serving cell (the primary cell) and the first UL reference UL-DL configuration for the serving cell (the secondary cell), and the second UL reference UL-DL configuration for the secondary cell.

In FIG. 10, a UL-DL configuration for the primary cell refers to the first UL reference UL-DL configuration for the different serving cell (the primary cell). Furthermore, a UL-DL configuration for the secondary cell refers to the first UL reference UL-DL configuration for the serving cell (the secondary cell).

For example, in a case where first UL reference UL-DL configuration 0 is set for the different serving cell (the primary cell) and where first UL reference UL-DL configuration 2 is set for the serving cell (the secondary cell), second UL reference UL-DL configuration 1 is set for the secondary cell.

Furthermore, in a case where the serving cell is a primary cell, or in a case where the serving cell is a secondary cell and where, in a different serving cell (that is, the primary cell), the terminal device 1 is not configured in such a manner as to monitor the PDCCH/EPDCCH that is accompanied by the CIF which corresponds to the serving cell (the secondary cell), the first UL reference UL-DL configuration for the serving cell is set to the second UL reference UL-DL configuration for the serving cell (S906).

In the same manner, the base station apparatus 3 sets the second UL reference UL-DL configuration based on the setting method that is illustrated in FIG. 9.

At this point, the monitoring of the PDCCH/EPDCCH that is accompanied by the CIF includes the meaning that an attempt is made to decode the PDCCH or the EPDCCH according to the DCI format that includes the CIF. Furthermore, the CIF indicates a field to which a carrier indicator is mapped. Furthermore, a value of the carrier indicator indicates a serving cell to which the DCI format with which the carrier indicator is associated corresponds.

That is, the terminal device 1 that, in a different serving cell, is configured in such a manner as to monitor the PDCCH/EPDCCH that is accompanied by the CIF which corresponds to the serving cell, monitors the PDCCH/EPDCCH that is accompanied by the CIF in the different serving cell.

Furthermore, it is preferable that the terminal device 1 that, in a different serving cell, is configured in such a manner as to monitor the PDCCH/EPDCCH that is accompanied by the CIF which corresponds to a serving cell receives the third information for the serving cell through the PDCCH/EPDCCH in the different serving cell.

Furthermore, the terminal device 1 that, in a different serving cell, is not configured in such a manner as to monitor the PDCCH/EPDCCH that is accompanied by the CIF which corresponds to the serving cell may monitor the PDCCH/EPDCCH that is accompanied by the CIF or is not accompanied by the CIF in the different serving cell.

Furthermore, it is preferable that the terminal device 1 that, in a different serving cell, is not configured in such a manner as to monitor the PDCCH/EPDCCH that is accompanied by the CIF which corresponds to a serving cell receives the third information for the serving cell through the PDCCH/EPDCCH in the different serving cell.

At this point, the PDCCH/EPDCCH for the primary cell (also possibly the DCI format) is transmitted in the primary cell. That is, it is preferable that the third information for the primary cell is transmitted through the PDCCH/EPDCCH in the primary cell.

The base station apparatus 3 may transmit to the terminal device 1 a parameter (cif-Presence-r10) indicating whether or not the CIF is included in the DCI format that is transmitted in the primary cell. Furthermore, for each of the secondary cells, the base station apparatus 3 may transmit to the terminal device 1 a parameter (CrossCarrierScheduling-Config-r10) associated with cross carrier scheduling.

At this point, the parameter (CrossCarrierSchedulingConfig-r10) may include a parameter (schedulingCellInfo-r10) indicating whether or not the PDCCH/EPDCCH that corresponds to an associated secondary cell is transmitted in the secondary cell or is transmitted in a different cell.

Furthermore, in a case where the parameter (schedulingCellInfo-r10) indicates that the PDCCH/EPDCCH which corresponds to the associated secondary cell is transmitted in the secondary cell, the parameter (schedulingCellInfo-r10) may include a parameter (cif-Presence-r10) indicating whether or not the CIF is included in the DCI format that is transmitted in the secondary cell.

Furthermore, in a case where the parameter (schedulingCellInfo-r10) indicates that the PDCCH/EPDCCH which corresponds to the associated secondary cell is transmitted in a different serving cell, the parameter (schedulingCellInfo-r10) may include a parameter (schedulingCellId) indicating in which serving cell the downlink assignment or the uplink grant for the associated secondary cell is sent.

A method of setting the second DL reference UL-DL configuration will be described below.

For example, in a case where multiple cells are configured for the terminal device 1 and the first DL reference UL-DL configurations for at least two cells are different from each other, the terminal device 1 and the base station apparatus 3 sets the second DL reference UL-DL configuration.

Furthermore, in cases other than the case where multiple cells are configured for the terminal device 1 and the first DL reference UL-DL configurations for at least two cells are different from each other, the terminal device 1 and the base station apparatus 3 may not set the second DL reference UL-DL configuration. At this point, the cases other than the case where the first DL reference UL-DL configurations for at least two cells are different from each other may include a case where the first DL reference UL-DL configurations for all the serving cells (for example, two cells) are the same.

Furthermore, in the case where (only) one cell is configured for the terminal device 1, the base station apparatus 3 and the terminal device 1 may not set the second DL reference UL-DL configuration.

Figure 11:
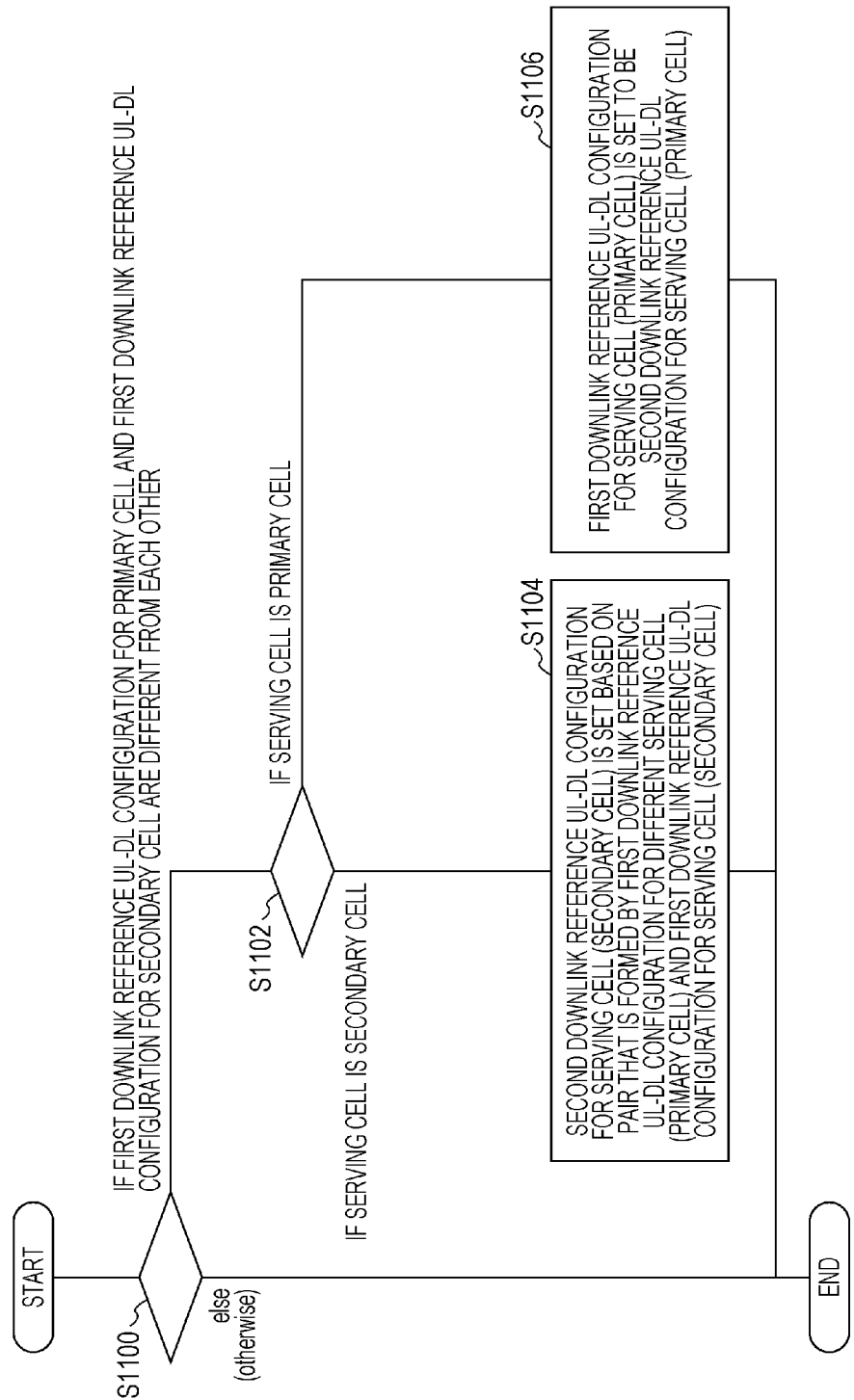
FIG. 11 is a flowchart illustrating a method of setting a second DL reference UL-DL configuration.

FIG. 11 is a flowchart illustrating the method of setting the second DL reference UL-DL configuration according to the present embodiment. FIG. 11 illustrates that one primary cell and one secondary cell are configured for the terminal device 1. The terminal device 1 may execute the setting method in FIG. 11 on each of the primary cell and the secondary cell.

The terminal device 1 determines whether or not the first DL reference UL-DL configuration for the primary cell and the first DL reference UL-DL configuration for the secondary cell are different from each other (S1100). At this point, in a case where the first DL reference UL-DL configuration for the primary cell and the first DL reference UL-DL configuration for the secondary cell are the same, the terminal device 1 ends setting processing on the second DL reference UL-DL configuration, without setting the second DL reference UL-DL configuration.

Furthermore, in a case where the first DL reference UL-DL configuration for the primary cell and the first DL reference UL-DL configuration for the second cell are different from each other, the terminal device 1 determines whether or not the serving cell is a primary cell or a secondary cell (S1102).

At this point, in a case where the serving cell is a secondary cell, the second UL reference UL-DL configuration for the serving cell (the secondary cell) is set based on a pair that is formed by the first DL reference UL-DL configuration for a different serving cell (that is, the primary cell) and the first DL reference UL-DL configuration for the serving cell (the secondary cell) (S1104).

For example, in S1104, the terminal device 1 sets the second DL reference UL-DL configuration for the serving cell (the secondary cell) based on a table in FIG. 12. FIG. 12 is a diagram illustrating a correspondence between a pair that is formed by the first DL reference UL-DL configuration for the primary cell and the first DL reference UL-DL configuration for the secondary cell, and the second DL reference UL-DL configuration for the secondary cell.

In FIG. 12, the UL-DL configuration for the primary cell refers to the first DL reference UL-DL configuration for the primary cell. Furthermore, the UL-DL configuration for the secondary cell refers to the first DL reference UL-DL configuration for the secondary cell.

For example, in a case where the pair that is formed by the first DL reference UL-DL configuration for the primary cell and the first DL reference UL-DL configuration for the secondary cell belongs to set 1 in FIG. 12, the second DL reference UL-DL configuration for the secondary cell is defined in set 1.

Furthermore, for example, in a case where, in the primary cell, the terminal device 1 is not configured in such a manner as to the PDCCH/EPDCCH that is accompanied by the CIF that corresponds to the secondary cell, and where the pair that is formed by the first DL reference UL-DL configuration for the primary cell and the first DL reference UL-DL configuration for the secondary cell belongs to set 2 in FIG. 12, the second DL reference UL-DL configuration for the secondary cell is defined in set 2.

Furthermore, in a case where first DL reference UL-DL configuration 1 is set for the primary cell and first DL reference UL-DL configuration 0 is set for the secondary cell, second DL reference UL-DL configuration 1 is set for the secondary cell.

Furthermore, in a case where the serving cell is a primary cell, the first DL reference UL-DL configuration for the serving cell (the primary cell) is set to the second DL reference UL-DL configuration for the serving cell (the primary cell) (S1106).

In the same manner, the base station apparatus 3 sets the second DL reference UL-DL configuration based on the setting method that is illustrated in FIG. 11.

The first UL reference UL-DL configuration will be described below.

The first UL reference UL-DL configuration is used at least for specifying a subframe that is available or is not available for the uplink transmission in the cell. At this point, as described below, the term "specify" includes at least the following meanings: "determine", "select", and "indicate".

For example, the terminal device 1 does not perform the uplink transmission in the subframe that is indicated as the downlink subframe using the first UL reference UL-DL configuration. Furthermore, the terminal device 1 does not perform the uplink transmission in the DwPTS and the GP of the subframe that is indicated as the special subframe using the first UL reference UL-DL configuration.

The first DL reference UL-DL configuration will be described below.

The first DL reference UL-DL configuration is used at least for specifying a subframe that is available or is not available for downlink transmission in the cell.

For example, the terminal device 1 does not perform the downlink transmission in the subframe that is indicated as the uplink subframe using the first DL reference UL-DL configuration. Furthermore, the terminal device 1 does not perform the downlink transmission in the UpPTS and the GP of the subframe that is indicated as the special subframe using the first DL reference UL-DL configuration.

Furthermore, the terminal device 1 that sets the first DL reference UL-DL configuration based on the first information may perform measurement (for example, measurement relating to the channel state information) that uses a downlink signal, in the DwPTS of the downlink subframe or the special subframe that is indicated using the first UL reference UL-DL configuration or the first DL reference UL-DL configuration.

At this point, the subframe that is indicated as the uplink subframe using the first UL reference UL-DL configuration and that is indicated as the downlink subframe using the first DL reference UL-DL configuration is also referred to as a first flexible subframe. The first flexible subframe may be a subframe that is reserved for the uplink transmission and the downlink transmission. n.

Furthermore, the subframe that is indicated as the special subframe using the first UL reference UL-DL configuration and that is indicated as the downlink subframe using the first DL reference UL-DL configuration is also referred to as a second flexible subframe. The second flexible subframe may be a subframe that is reserved only for the downlink transmission. Furthermore, the second flexible subframe may be a subframe that is reserved for the downlink transmission in the DwPTS and that is reserved for the uplink transmission in the UpPTS.

Furthermore, the subframe that is indicated as the uplink subframe using the first UL reference UL-DL configuration and that is indicated as the uplink subframe using the first DL reference UL-DL configuration is also a fixed uplink subframe. The fixed uplink subframe is reserved for the uplink transmission.

The third UL-DL configuration will be described below.

The base station apparatus 3 and the terminal device 1 set the third UL-DL configuration relating to a transmission direction (uplink/downlink) in the subframe. For example, the third UL-DL configuration may be used for specifying the transmission direction in the subframe. Furthermore, the third UL-DL configuration may be used for specifying the transmission direction, in the subframe that is indicated as a different subframe using the first UL reference UL-DL configuration and the first DL reference UL-DL configuration.

That is, the terminal device 1 controls transmission in the first flexible subframe and the second flexible subframe based on the scheduling information (the DCI format and/or the HARQ-ACK) and the third UL-DL configuration.

For example, the third information indicating the third UL-DL configuration may be information for indicating the subframe that is available for the uplink transmission. Furthermore, the third information indicating the third UL-DL configuration may be information for indicating the subframe that is available for the downlink transmission. Furthermore, the third information indicating the third UL-DL configuration may be information for indicating the subframe that is available for the uplink transmission in the UpPTS and the downlink transmission in the DwPTS.

The base station apparatus 3 may perform scheduling for the downlink transmission in the subframe that is indicated as the downlink subframe using the third UL-DL configuration. Furthermore, the terminal device 1 may perform processing for downlink reception in the subframe that is indicated as the downlink subframe using the third UL-DL configuration.

Furthermore, the base station apparatus 3 may perform the scheduling for the uplink transmission in the subframe that is indicated as the uplink subframe using the third UL-DL configuration. Furthermore, the terminal device 1 may perform processing for the uplink transmission in the subframe that is indicated as the uplink subframe using the third UL-DL configuration.

Furthermore, the base station apparatus 3 may perform the scheduling for the downlink transmission in the DwPTS of the subframe that is indicated as the special subframe using the third UL-DL configuration. Furthermore, the terminal device 1 may perform the processing for the downlink reception in the DwPTS of the subframe that is indicated as the special subframe using the third UL-DL configuration.

At this point, the third UL-DL configuration may be used by the terminal device to indicate (notify) the downlink subframe, the PDCCH and/or the EPDCCH in which is monitored. Furthermore, the third UL-DL configuration (the third information) may be used by the terminal device to indicate (notify) the downlink subframe for measuring the channel state information (the downlink subframe that is available for measuring the channel state information).

The first UL reference UL-DL configuration and the second UL reference UL-DL configuration will be described below.

The first UL reference UL-DL configuration and the second UL reference UL-DL configuration may be used for specifying a correspondence between subframe n to which the PDCCH/EPDCCH/PHICH is allocated and subframe n+k to which the PUSCH to which the PDCCH/EPDCCH/PHICH described above corresponds is allocated.

For example, in a case where one primary cell is configured, or in a case where one primary cell and one secondary cell are configured and the first UL reference UL-DL configuration for the primary cell and where the first UL reference UL-DL configuration for the secondary cell are the same, in each of the two serving cells, the corresponding first UL reference UL-DL configuration is used for specifying a correspondence between a subframe to which the PDCCH/EPDCCH/PHICH is allocated and a subframe to which the PUSCH to which the PDCCH/EPDCCH/PHICH described above corresponds is allocated.

Furthermore, in a case where one primary cell and one secondary cell are configured, and the first UL reference UL-DL configuration for the primary cell and the first UL reference UL-DL configuration for the secondary cell are different from each other, in each of the two serving cells, the corresponding second UL reference UL-DL configuration is used for specifying the correspondence between the subframe to which the PDCCH/EPDCCH/PHICH is allocated and the subframe to which the PUSCH to which the PDCCH/EPDCCH/PHICH described above corresponds is allocated.

FIG. 13 is a diagram illustrating the correspondence between subframe n to which the PDCCH/EPDCCH/PHICH is allocated and subframe n+k to which the PUSCH to which the PDCCH/EPDCCH/PHICH described above corresponds is allocated, according to the present embodiment. The terminal device 1 specifies a value k in accordance with a table in FIG. 13.

In FIG. 13, in the case where one primary cell is configured, or in the case where one primary cell and one secondary cell are configured and where the first UL reference UL-DL configuration for the primary cell and the first UL reference UL-DL configuration for the secondary cell are the same, the first UL reference UL-DL configuration is referred to as the UL reference UL-DL configuration.

Furthermore, in a case where one primary cell and one secondary cell are configured and where the first UL reference UL-DL configuration for the primary cell and the first UL reference UL-DL configuration for the secondary cell are different from each other, the second UL reference UL-DL configuration is referred to as the UL reference UL-DL configuration.

The first UL reference UL-DL configuration and the second UL reference UL-DL configuration will be hereinafter briefly referred to as the UL-DL configuration when descriptions thereof are provided referring to FIG. 13.

For example, in a case where, in subframe n, the PDCCH/EPDCCH that corresponds to a cell for which UL-DL configurations 1 to 6 are set and that is accompanied by the uplink grant that is destined for the terminal device 1 is detected, the terminal device 1 performs transmission on the PUSCH in accordance with the uplink grant, in subframe n+k that is specified based on the table in FIG. 13.

Furthermore, in a case where, in subframe n, the terminal device 1 corresponds to the cell for which UL-DL configurations 1 to 6 are set, and detects the PHICH that is accompanied by the NACK that is destined for the terminal device 1, the terminal device 1 performs the transmission on the PUSCH in subframe n+k that is specified based on the table in FIG. 13.

Furthermore, a two-bit uplink index (UL index) is included in the uplink grant that corresponds to the cell for which UL-DL configuration 0 is configured, and that is destined for the terminal device 1. The uplink index (UL index) is not included in the uplink grant that corresponds to the cell for which UL-DL configurations 1 to 6 is configured, and that is destined for the terminal device 1.

In a case where, in subframe n, a Most Significant Bit (MSB) of the uplink index that is included in the uplink grant which corresponds to the cell for which UL-DL configuration 0 is set is set to 1, the terminal device 1 performs the transmission on the PUSCH in accordance with the uplink grant in subframe n+k that is specified based on the table in FIG. 13 (adjusts the transmission on the PUSCH).

Furthermore, in a case where, in a first resource set where subframe n=0, or n=5, the PHICH that is accompanied by the NACK that corresponds to the cell for which UL-DL configuration 0 is set is received, the terminal device 1 performs the transmission on the PUSCH in accordance with the PHICH, in the subframe n+k that is specified based on the table in FIG. 13.

Furthermore, in a case where, in subframe n, a Least Significant Bit (LSB) of the uplink index that is included in the uplink grant which corresponds to the cell where UL-DL configuration 0 is set is set to 1, the terminal device 1 performs the transmission on the PUSCH in accordance with the uplink grant in subframe n+7.

Furthermore, in a case where, in a second resource set where subframe n=0, or n=5, the PHICH that is accompanied by the NACK that corresponds to the cell where UL-DL configuration 0 is set is received, the terminal device 1 performs the transmission on the PUSCH in accordance with the uplink grant in subframe n+7.

Furthermore, when subframe n=1, or n=6, the PHICH that is accompanied by the NACK that corresponds to the cell for which UL-DL configuration 0 is set is received, the terminal device 1 performs the transmission on the PUSCH in accordance with the uplink grant in subframe n+7.

For example, in a case where, in [SFN=m, subframe 1], the PDCCH/EPDCCH/PHICH that corresponding to the cell for which UL-DL configuration 0 is set is detected, the terminal device 1 performs the transmission on the PUSCH in a subframe [subframe SFN=m, subframe 7] that comes six subframes later.

Furthermore, the first UL reference UL-DL configuration and the second UL reference UL-DL configuration may be used for specifying a correspondence between subframe n to which the PUSCH is allocated and subframe n+k to which the PHICH to which the PUSCH described above corresponds is allocated.

That is, for example, in the case where one primary cell is configured, or in the case where one primary cell and one secondary cell are configured and where the first UL reference UL-DL configuration for the primary cell and the first UL reference UL-DL configuration for the secondary cell are the same, in each of the two serving cells, the corresponding first UL reference UL-DL configuration is used for specifying a correspondence between subframe n to which the PUSCH is allocated and subframe n+k to which the PHICH to which the PUSCH described above corresponds is allocated.

Furthermore, in the case where one primary cell and one secondary cell are configured, and where the first UL reference UL-DL configuration for the primary cell and the first UL reference UL-DL configuration for the secondary cell are different from each other, in each of the two serving cells, the corresponding second UL reference UL-DL configuration is used for specifying the correspondence between subframe n to which the PUSCH is allocated and subframe n+k to which the PHICH to which the PUSCH described above corresponds is allocated.

FIG. 14 is a diagram illustrating an example of the correspondence between subframe n to which the PUSCH is allocated, and subframe n+k to which the PHICH to which the PUSCH described above corresponds is allocated, according to the present embodiment. The terminal device 1 specifies a value k in accordance with a table in FIG. 14.

In FIG. 14, in the case where one primary cell is configured, or in the case where one primary cell and one secondary cell are configured and where the first UL reference UL-DL configuration for the primary cell and the first UL reference UL-DL configuration for the secondary cell are the same, the first UL reference UL-DL configuration is referred to as the UL reference UL-DL configuration.

Furthermore, in the case where one primary cell and one secondary cell are configured and where the first UL reference UL-DL configuration for the primary cell and the first UL reference UL-DL configuration for the secondary cell are different from each other, the second UL reference UL-DL configuration is referred to as the UL reference UL-DL configuration.

The first UL reference UL-DL configuration and the second UL reference UL-DL configuration will be hereinafter briefly referred to as the UL-DL configuration when descriptions thereof are provided referring to FIG. 14.

In a case where in subframe n, the transmission on the PUSCH is scheduled, the terminal device 1 specifies a PHICH resource in subframe n+k that is specified in the table in FIG. 14.

For example, in a case where, for the cell where UL-DL configuration 0 is set, in [SFN=m, subframe n=2], the transmission on the PUSCH is scheduled, the PHICH resource is determined in [SFN=m, subframe n=6].

The first DL reference UL-DL configuration and the second DL reference UL-DL configuration will be described below.

The first DL reference UL-DL configuration and the second DL reference UL-DL configuration are used for specifying a correspondence between subframe n to which the PDSCH is allocated and subframe n+k in which the HARQ-ACK to which the PDSCH described above corresponds is transmitted.

For example, in the case where one primary cell is configured, or in a case where one primary cell and one secondary cell are configured and where the first DL reference UL-DL configuration for the primary cell and the first DL reference UL-DL configuration for the secondary cell are the same, in each of the two serving cells, the corresponding first DL reference UL-DL configuration is used for specifying a correspondence between subframe n to which the PDSCH is allocated and subframe n+k in which the HARQ-ACK to which the PDSCH described above corresponds is transmitted.

Furthermore, in a case where one primary cell and one secondary cell are configured, and where the first DL reference UL-DL configuration for the primary cell and the first DL reference UL-DL configuration for the secondary cell are different from each other, in each of the two serving cells, the corresponding second DL reference UL-DL configuration is used for specifying the correspondence between subframe n to which the PDSCH is allocated and the subframe n+k in which the HARQ-ACK to which the PDSCH described above corresponds is transmitted.

FIG. 15 is a diagram illustrating a correspondence between subframe n–k to which the PDSCH is allocated and subframe n in which the HARQ-ACK to which the PDSCH described above corresponds is transmitted, according to the present embodiment. The terminal device 1 specifies a value k in accordance with a table in FIG. 15.

At this point, a set of $k_i$ in each of the squares in FIG. 15 is also referred to as downlink association set index $K\{k_0, k_1,$ and so forth up to $k_{M-1}\}$. Furthermore, in FIG. 15, each of $k_0$, $k_1$, and so forth up to $k_{M-1}$ is also referred to as an element in the set K. Furthermore, M indicates the number of elements in the set K that is associated with uplink subframe n.

In FIG. 15, in the case where one primary cell is configured, or in the case where one primary cell and one secondary cell are configured and where the first DL reference UL-DL configuration for the primary cell and the first DL reference UL-DL configuration for the secondary cell are the same, the first DL reference UL-DL configuration is referred to as the DL reference UL-DL configuration.

Furthermore, in the case where one primary cell and one secondary cell are configured and where the first DL reference UL-DL configuration for the primary cell and the first DL reference UL-DL configuration for the secondary cell are different from each other, the second DL reference UL-DL configuration is referred to as the DL reference UL-DL configuration.

The first DL reference UL-DL configuration and the second DL reference UL-DL configuration will be hereinafter briefly referred to as the UL-DL configuration when descriptions thereof are provided referring to FIG. 15.

In a case where, in subframe n–k (k is specified in the table in FIG. 15) in the serving cell, the transmission on the PDSCH on which transmission of the corresponding HARQ-ACK that is destined for the terminal device 1 has to be performed is detected, the terminal device 1 transmits the HARQ-ACK in subframe n.

That is, the terminal device 1 transmits the HARQ-ACK in uplink subframe n, based on the detection of the transmission on the PDSCH in subframe (also possibly multiple subframes) n−k. Furthermore, the terminal device 1 may transmit the HARQ-ACK in uplink subframe n based on the detection of the PDCCH/EPDCCH indicating the downlink SPS release in subframe (also possibly multiple subframes) n−k. At this point, k∈K where K is illustrated in FIG. 15 and is stipulated because the HARQ-ACK has to be supplied.

At this point, for example, the terminal device 1 does not make a HARQ-ACK response to the transmission on the PDSCH that is used for transmission of the system information. Furthermore, the terminal device 1 makes the HARQ-ACK response to the transmission on the PDSCH that is scheduled by the DCI format which is accompanied by the CRC that is scrambled by the C-RNTI.

Furthermore, for example, in subframe n=2, the terminal device 1 performs the transmission of the HARQ-ACK in response to the transmission on the PDSCH that is received on subframe n−6 and/or n−7, in the cell for which UL-DL configuration 1 is set. That is, in UL-DL configuration 1, the number M of elements in set K that is associated with subframe n (uplink subframe n) is M=2.

At this point, in a case where the second information is not received, the first DL reference UL-DL configuration may not be configured. In this case, the base station apparatus 3 and the terminal device 1 may perform processing that is performed based on the first DL reference UL-DL configuration described above, based on the first UL reference UL-DL configuration (the UL-DL configuration for the serving cell).

For example, in a case where one primary cell and one secondary cell are configured, where the second information for the primary cell is received without the second information for the secondary cell being received, where the first UL reference UL-DL configuration (the UL-DL configuration for the serving cell) for the secondary cell and the first DL reference UL-DL configuration for the primary cell are different from each other, and where the serving cell is a secondary cell, the second DL reference UL-DL configuration for the serving cell (the secondary cell) may be set based on a pair that is formed by the first DL reference UL-DL configuration for a different serving cell (the primary cell) and the first UL reference UL-DL configuration for the serving cell (the secondary cell).

Furthermore, for example, in a case where one primary cell and one secondary cell are configured, where the second information for the secondary cell is received without the second information for the primary cell being received, where the first UL reference UL-DL configuration (the UL-DL configuration for the serving cell) for the primary cell and the first DL reference UL-DL configuration for the secondary cell are different from each other, and where the serving cell is a secondary cell, the second DL reference UL-DL configuration for the serving cell (the secondary cell) may be set based on a pair that is formed by the first UL reference UL-DL configuration for a different serving cell (the primary cell) and the first DL reference UL-DL configuration for the serving cell (the secondary cell).

Furthermore, for example, in the case where one primary cell and one secondary cell are configured, where the second information for the secondary cell is received without the second information for the primary cell being received, and where the first UL reference UL-DL configuration (the UL-DL configuration for the serving cell) for the primary cell and the first DL reference UL-DL configuration for the secondary cell are different from each other, in each of the two serving second cell, the corresponding second DL reference UL-DL configuration may be used for specifying the correspondence between subframe n to which the PDSCH is allocated and subframe n+k in which the HARQ-ACK corresponding to the PDSCH described above is transmitted.

Furthermore, for example, in a case where one primary cell and one secondary cell are configured, where the second information for the secondary cell is received without the second information for the primary cell being received, and where the first UL reference UL-DL configuration (the UL-DL configuration for the serving cell) for the primary cell and the first DL reference UL-DL configuration for the secondary cell are the same, in the primary cell, the corresponding first UL reference UL-DL configuration (the UL-DL configuration for the serving cell) may be used for specifying the correspondence between subframe n to which the PDSCH is allocated and subframe n+k in which the HARQ-ACK corresponding to the PDSCH described above is transmitted, and, in the secondary cell, the corresponding first DL reference UL-DL configuration may be used for specifying the correspondence between subframe n to which the PDSCH is allocated and subframe n+k in which the HARQ-ACK corresponding to the PDSCH described above is transmitted.

Furthermore, for example, in the case where one primary cell and one secondary cell are configured, where the second information for the secondary cell is received without the second information for the primary cell being received, and where the first UL reference UL-DL configuration (the UL-DL configuration for the serving cell) for the primary cell and the first DL reference UL-DL configuration for the secondary cell are different from each other, in FIGS. 10 and 12, the UL-DL configuration for the primary cell may refer to the first UL reference UL-DL configuration for the primary cell.

At this point, for the serving cell for which the first DL reference UL-DL configuration is set, the second UL reference UL-DL configuration and the second DL reference UL-DL configuration may not be set.

FIG. 16 is a diagram illustrating a special subframe configuration according to the present embodiment. According to the present embodiment, in the downlink, a normal Cyclic Prefix (CP) may be applied (supported). Furthermore, in the downlink, extended Cyclic Prefix (CP) may be applied. Furthermore, in the uplink, the normal CP may be applied. Furthermore, in the uplink, the extended CP may be applied.

At this point, a sum of lengths of the DwPTS, the GP, and the UpPTS 30720·Ts=1 ms. Furthermore, the DwPTS may be a field that is reserved for the downlink transmission. Furthermore, the UpPTS may be a field that is reserved for the uplink transmission. Furthermore, the GP may be a field, the downlink transmission and the uplink transmission in which are not performed.

That is, based on the special subframe configuration, the length of the DwPTS may be set. Furthermore, based on the special subframe configuration, the length of the UpPTS may be set. Furthermore, based on the special subframe configuration, the length of the GP may be set.

The base station apparatus 3 may transmit a parameter (specialSubframe Patterns) indicating the special subframe configuration to the terminal device 1. For example, the base station apparatus 3 may transmit the parameter indicating the special subframe configuration to the terminal device 1, with the parameter being included in at least one of the MIB, the system information block type 1 message, the system information message, the RRC message, the MAC Control Element (CE) and the physical layer control information (for example, the DCI format).

Setting of configuration i as the special subframe configuration is hereinafter described as setting of special subframe configuration i.

At this point, for the transmission of the HARQ-ACK (also possibly the transmission of the uplink control information), multiple PUCCH formats are defined (supported).

For example, PUCCH format 1b for an up-to 4-bit HARQ-ACK with channel selection is used. Furthermore, PUCCH format 3 for an up-to 20-bit HARQ-ACK is used. At this point, PUCCH format 3 may be used for the up-to 20-bit HARQ-ACK and a 1-bit positive/negative scheduling request (SR).

At this point, PUCCH format 3 may be used for the up-to 20-bit spacially-bundled HARQ-ACK and a 1-bit scheduling request. Furthermore, PUCCH format 3 may be used for an up-to 22-bit HARQ-ACK, the scheduling request, and the CSI. Furthermore, PUCCH format 3 may be used for the up-to 22-bit spacially-bundled HARQ-ACK, the scheduling request and the CSI.

At this point, in one serving cell, spacial HARQ-ACK bundling in multiple codewords within one subframe may be performed by logical AND operation of all the corresponding individual HARQ-ACKs.

The base station apparatus 3 may configure a PUCCH format that is used for the transmission of the HARQ-ACK, for the terminal device 1. For example, for the transmission of the HARQ-ACK, the base station apparatus 3 may a parameter (pucch-Format) indicating one of the multiple PUCCH formats to the terminal device 1, with the parameter being included in the RRC message. Furthermore, for the transmission of the HARQ-ACK, the base station apparatus 3 may perform configuration in such a manner that any one of PUCCH format 1b with channel selection and the PUCCH format 3 is used.

At this point, for TDD, in a case where PUCCH format 1b with channel selection is configured for the transmission of the HARQ-ACK, the following description may be applied. Furthermore, for TDD, in a case where PUCCH format 3 is configured for the transmission of the HARQ-ACK, the following description may be applied.

Furthermore, operation of the terminal device 1 will be basically described below, and, of course, in response to the operation of the terminal device 1, the base station apparatus 3 performs the same operation as the terminal device.

The terminal device 1 may determine the number of HARQ-ACK bits that is associated with uplink subframe n, based on Math. 1.

$$O = \sum_{c=1}^{N_{cells}^{DL}} O_c^{ACK}$$ [Math. 1]

At this point, in Math. 1, O indicates the number of HARQ-ACK bits. Furthermore, $N_{cells}^{DL}$ indicates the number of cells that are configured. Furthermore, $O_c^{ACK}$ indicates the number of HARQ-ACK bits for a c-th cell (c≥0). At this point, the c-th cell may mean a certain cell.

Furthermore, HARQ-ACK bit, $o_{c,0}^{ACK}$, $o_{c,1}^{ACK}$, ..., $o_{c,j}^{ACK}$ (j=$O_c^{ACK}$−1) is constituted as follows. For example, in a case where a communication mode that is configured in the c-th cell supports one transport block (transmission of one downlink transport block), $O_c^{ACK}=B_c^{DL}$ may be applied. Furthermore, for example, in a case where the spacial bundling is applied in the c-th cell, $O_c^{ACK}=B_c^{DL}$ may be applied. Furthermore, for example, in a case where the communication mode that is configured in the c-th cell supports up to two transport blocks (transmission of up to two downlink transport blocks) and where the spacial bundling is not applied, $O_c^{ACK}=2B_c^{DL}$ may be applied.

At this point, in a case where the communication mode that is configured in the c-th cell for DL reference UL-DL configurations 1 to 6 supports one transport block, in subframe n−k, the transmission on the PDSCH that is indicated by the corresponding PDCCH/EPDCCH, or the HARQ-ACK for the PDCCH/EPDCCH that indicates downlink SPS release is associated with $o_{c,DAI(k)-1}^{ACK}$.

Furthermore, in a case where the communication mode that is configured in the c-th cell for DL reference UL-DL configurations 1 to 6 supports up to two transport blocks, in subframe n−k, the transmission on the PDSCH that is indicated by the corresponding PDCCH/EPDCCH, or the HARQ-ACK for the PDCCH/EPDCCH that indicates the downlink SPS release is associated with $o_{c,DAI(k)-2}^{ACK}$, and $o_{c,DAI(k)-1}^{ACK}$.

At this point, DAI (k) indicates a value of DAI in the DCI format for the downlink that is detected in subframe n−k. Furthermore, $o_{c,DAI(k)-2}^{ACK}$, and $o_{c,DAI(k)-1}^{ACK}$ indicate the HARQ-ACKs for cordword 0 and cordword 1, respectively.

Furthermore, in a case where the communication mode that is configured in the c-th cell for DL reference UL-DL configurations 0 supports one transport block, in subframe n−k, the transmission on the PDSCH that is indicated by the corresponding PDCCH/EPDCCH, or the HARQ-ACK for the PDCCH/EPDCCH that indicates the downlink SPS release is associated with $o_{c,0}^{ACK}$.

Furthermore, in a case where the communication mode that is configured in the c-th cell for DL reference UL-DL configurations 0 supports up to two transport blocks, in subframe n−k, the transmission on the PDSCH that is indicated by the corresponding PDCCH/EPDCCH, or the HARQ-ACK for the PDCCH/EPDCCH that indicates the downlink SPS release is associated with $o_{c,0}^{ACK}$, and $o_{c,1}^{ACK}$. At this point, $o_{c,0}^{ACK}$ and $o_{c,1}^{ACK}$ indicate the HARQ-ACKs for cordword 0 and cordword 1, respectively.

At this point, the base station apparatus 3 may perform configuration for the terminal device 1 in such a manner that transmission on the PDSCH is received based on one of the multiple transmission modes. For example, the base station apparatus 3 may configure a downlink transmission mode for the terminal device 1 using the RRC message.

Furthermore, $B_c^{DL}$ indicates the number of downlink subframes in which the terminal device 1 needs to transmit the HARQ-ACK for the c-th cell. At this point, $B_c^{DL}$ may a indicate the number of downlink subframes and special subframes in which the terminal device 1 needs to transmit the HARQ-ACK for the c-th cell. That is, $B_c^{DL}$ may indicate the number of the transmissions on the PDSCH on which the terminal device 1 needs to transmit the HARQ-ACK for the c-th cell. Furthermore, $B_c^{DL}$ may indicate the number of the transmissions of the transmissions of the PDSCH on which the terminal device 1 needs to transmit the HARQ-ACK for the c-th cell, and the number of the transmissions of the PDCCH/EPDCCH that indicates the downlink SPS release.

At this point, even in a case where it is assumed that the terminal device 1 performs the transmission on the PUCCH, $B_c^{DL}=M$ may be established. As described above, M indicates the number of elements in the set K that is associated with uplink subframe n. At this point, in this case, set K does not include a special subframe of special subframe configurations 0 and 5 with normal downlink CP or of special subframe configurations 0 and 4 with extended downlink CP.

That is, in a case where, for the c-th cell, a configuration other than special subframe configurations 0 and 5 with normal downlink CP or configurations 0 and 4 with extended downlink CP is set, the terminal device 1 may determine the HARQ-ACK bits for the c-th cell as $B_c^{DL}=M$.

Furthermore, even in a case where it is assumed that the terminal device 1 performs the transmission on the PUCCH, $B_c^{DL}=M-1$ may be established. At this point, in this case, set K includes a special subframe of special subframe configurations 0 and 5 with normal downlink CP or of special subframe configurations 0 and 4 with extended downlink CP.

That is, in a case where, for the c-th cell, special subframe configurations 0 and 5 with normal downlink CP or special subframe configurations 0 and 4 with extended downlink CP is set, the terminal device 1 may determine the HARQ-ACK bits for the c-th cell as $B_c^{DL}=M-1$.

That is, in the case where, for the c-th cell, special subframe configurations 0 and 5 with normal downlink CP or special subframe configurations 0 and 4 with extended downlink CP is set, the terminal device 1 may exclude a special subframe in the c-th cell from the subframes that are used for determining the HARQ-ACK bits.

That is, the terminal device 1 may not expect the transmission on the PDSCH in the DwPTS of the special subframe, with respect to special subframe configurations 0 and 5 with normal downlink CP or special subframe configurations 0 and 4 with extended downlink CP. Furthermore, based on the length of the CP and the special subframe configuration, the terminal device 1 may determine whether or not to expect the transmission on the PDSCH in the DwPTS of the special subframe.

That is, the transmission on the PDSCH may not be performed in the DwPTS of the special subframe, with respect to special subframe configurations 0 and 5 with normal downlink CP or special subframe configurations 0 and 4 with extended downlink CP.

Furthermore, the terminal device 1 may not monitor the EPDCCH in the DwPTS of the special subframe, with respect to special subframe configurations 0 and 5 with normal downlink CP or special subframe configurations 0 and 4 with extended downlink CP. Furthermore, based on the length of the CP and the special subframe configuration, the terminal device 1 may determine whether or not to monitor the EPDCCH in the DwPTS of the special subframe.

That is, the transmission on the EPDCCH may not be performed in the DwPTS of the special subframe, with respect to special subframe configurations 0 and 5 with normal downlink CP or special subframe configurations 0 and 4 with extended downlink CP.

At this point, determination of the HARQ-ACK bit (determination of the number of HARQ-ACK bits, determination of a payload size of the HARQ-ACK, or determination of a reserved HARQ-ACK field) as described above is also referred to as HARQ-ACK code block size determination.

That is, for special subframe configurations 0 and 5 with normal downlink CP or special subframe configurations 0 and 4 with extended downlink CP in a cell, the special subframe of the cell is excluded from the HARQ-ACK codebook size determination.

Based on the method of determining the HARQ-ACK code block size determination described so far, a communication method according to the present embodiment will be described in detail below.

At this point, as will be described below, the first UL reference UL-DL configuration and the second UL reference UL-DL configuration are also collectively referred to as the UL reference UL-DL configuration. Furthermore, the first DL reference UL-DL configuration and the second DL reference UL-DL configuration is also collectively referred to as the DL reference UL-DL configuration.

Furthermore, in a case where the first UL reference UL-DL configuration is set and the second UL reference UL-DL configuration is not set, the UL reference UL-DL configuration may be the first UL reference UL-DL configuration. Furthermore, in a case where the first UL reference UL-DL configuration is set and the second UL reference UL-DL configuration is set, the UL reference UL-DL configuration may be the first UL reference UL-DL configuration. Furthermore, in a case where the first UL reference UL-DL configuration is set and the second UL reference UL-DL configuration is set, the UL reference UL-DL configuration may be the second UL reference UL-DL configuration.

Furthermore, in a case where the first DL reference UL-DL configuration is set and the second DL reference UL-DL configuration is not set, the DL reference UL-DL configuration may be the first DL reference UL-DL configuration. Furthermore, in a case where the first DL reference UL-DL configuration is set and the second DL reference UL-DL configuration is set, the DL reference UL-DL configuration may be the first DL reference UL-DL configuration. Furthermore, in a case where the first DL reference UL-DL configuration is set and the second DL reference UL-DL configuration is set, the DL reference UL-DL configuration may be the second DL reference UL-DL configuration.

FIG. 17 is a diagram for describing a communication method according to the present embodiment. At this point, as one example, FIG. 17 illustrates a case where, for a certain cell, UL reference UL-DL configuration 0, DL reference UL-DL configuration 2, and third UL-DL configuration 4 are set. The terminal device 1 determines the HARQ-ACK code block size for the cell.

That is, subframe 6 in FIG. 17 is a subframe that is indicated as the special subframe based on the UL reference UL-DL configuration. Furthermore, subframe 6 in FIG. 17 is a subframe that is indicated as the special subframe based on the DL reference UL-DL configuration. Furthermore, subframe 6 in FIG. 17 is a subframe that is indicated as the downlink subframe based on the third UL-DL configuration.

That is, according to the present embodiment, a configuration (also possibly a reconfiguration) between a downlink-to-uplink switch-point periodicity of 5 ms and a downlink-to-uplink switch-point periodicity of 10 ms is supported.

For example, the downlink-to-uplink switch-point periodicity of 5 ms may be set based on the UL reference UL-DL configuration, and the downlink-to-uplink switch-point periodicity of 10 ms may be set based on the third UL-DL configuration. Furthermore, the downlink-to-uplink switch-point periodicity of 10 ms may be set based on the UL reference UL-DL configuration, and the downlink-to-uplink switch-point periodicity of 5 ms may be set based on the third UL-DL configuration.

At this point, the terminal device 1 may determine the special subframe that is used for the HARQ-ACK code block size determination, based on the DL reference UL-DL configuration. That is, the terminal device 1 may determine whether or not the subframe (that is, subframe 6 in FIG. 17) that is indicated as the special subframe based on the DL reference UL-DL configuration is used for the HARQ-ACK code block size determination, based on whether or not special subframe configurations 0 and 5 with normal downlink CP or special subframe configurations 0 and 4 with extended downlink CP is set.

For example, in the case where the configuration other than special subframe configurations 0 and 5 with normal downlink CP or special subframe configurations 0 and 4 with extended downlink CP is set, the terminal device 1 may use the subframe (that is, subframe 6 in FIG. 17) that is indicated as the special subframe based on the DL reference UL-DL configuration, for the HARQ-ACK code block size determination. That is, in this case, the terminal device 1 may HARQ-ACK code block size as $B_c^{DL}=M$.

Furthermore, in a case where special subframe configurations 0 and 5 with normal downlink CP or special subframe configurations 0 and 4 with extended downlink CP is set, the terminal device 1 may exclude the subframe (that is, subframe 6 in FIG. 17) that is indicated as the special subframe based on the DL reference UL-DL configuration, from the HARQ-ACK code block size determination. That is, in this case, the terminal device 1 may HARQ-ACK code block size as $B_c^{DL}=M-1$.

That is, the terminal device 1 may not expect the transmission on the PDSCH in the DwPTS of the subframe (that is, subframe 6 in FIG. 17) that is indicated as the special subframe based on the DL reference UL-DL configuration, with respect to special subframe configurations 0 and 5 with normal downlink CP or special subframe configurations 0 and 4 with extended downlink CP.

Furthermore, the terminal device 1 may expect the transmission on the PDSCH in the DwPTS of the subframe (that is, subframe 6 in FIG. 17) that is indicated as the special subframe based on the DL reference UL-DL configuration, with respect to the configuration other than special subframe configurations 0 and 5 with normal downlink CP or special subframe configurations 0 and 4 with extended downlink CP.

That is, based on the length of the CP and the special subframe configuration, the terminal device 1 may determine whether or not to expect the transmission on the PDSCH in the DwPTS of the subframe that is indicated as the special subframe (that is, subframe 6 in FIG. 17) based on the DL reference UL-DL configuration.

Furthermore, the transmission on the PDSCH may not be performed in the DwPTS of the subframe (that is, subframe 6 in FIG. 17) that is indicated as the special subframe based on the DL reference UL-DL configuration, with respect to special subframe configurations 0 and 5 with normal downlink CP or special subframe configurations 0 and 4 with extended downlink CP.

Furthermore, the transmission on the PDSCH may be performed in the DwPTS of the subframe (that is, subframe 6 in FIG. 17) that is indicated as the special subframe based on the DL reference UL-DL configuration, with respect to the configuration other than special subframe configurations 0 and 5 with normal downlink CP or special subframe configurations 0 and 4 with extended downlink CP.

Furthermore, the terminal device 1 may not monitor the EPDCCH in the DwPTS of the subframe (that is, subframe 6 in FIG. 17) that is indicated as the special subframe based on the DL reference UL-DL configuration, with respect to special subframe configurations 0 and 5 with normal downlink CP or special subframe configurations 0 and 4 with extended downlink CP.

Furthermore, the terminal device 1 may monitor the EPDCCH in the DwPTS of the subframe (that is, subframe 6 in FIG. 17) that is indicated as the special subframe based on the DL reference UL-DL configuration, with respect to the configuration other than special subframe configurations 0 and 5 with normal downlink CP or special subframe configurations 0 and 4 with extended downlink CP.

That is, based on the length of the CP and the special subframe configuration, the terminal device 1 may determine whether or not to monitor the EPDCCH in the DwPTS of the subframe that is indicated as the special subframe (that is, subframe 6 in FIG. 17) based on the DL reference UL-DL configuration.

Furthermore, the transmission on the EPDCCH may not be performed in the DwPTS of the subframe (that is, subframe 6 in FIG. 17) that is indicated as the special subframe based on the DL reference UL-DL configuration, with respect to special subframe configurations 0 and 5 with normal downlink CP or special subframe configurations 0 and 4 with extended downlink CP.

Furthermore, the transmission on the EPDCCH may be performed in the DwPTS of the subframe (that is, subframe 6 in FIG. 17) that is indicated as the special subframe based on the DL reference UL-DL configuration, with respect to the configuration other than special subframe configurations 0 and 5 with normal downlink CP or special subframe configurations 0 and 4 with extended downlink CP.

That is, in a certain cell, the special subframe in the cell, which is indicated based on the DL reference UL-DL configuration, may be excluded from the HARQ-ACK code block size determination, with respect to special subframe configurations 0 and 5 with normal downlink CP or special subframe configurations 0 and 4 with extended downlink CP. Based on the DL reference UL-DL configuration, the length of the CP, and the special subframe configuration, the terminal device 1 may determine the HARQ-ACK code block size.

FIG. 18 is another diagram for describing the communication method according to the present embodiment. At this point, as one example, FIG. 18 illustrates a case where, for a certain cell, UL reference UL-DL configuration 0, DL reference UL-DL configuration 3, and third UL-DL configuration 4 are set. The terminal device 1 determines the HARQ-ACK code block size for the cell.

That is, subframe 6 in FIG. 18 is a subframe that is indicated as the special subframe based on the UL reference UL-DL configuration. Furthermore, subframe 6 in FIG. 18 is a subframe that is indicated as the downlink subframe based on the DL reference UL-DL configuration. Furthermore, subframe 6 in FIG. 18 is a subframe that is indicated as the downlink subframe based on the third UL-DL configuration.

At this point, the terminal device 1 may use the subframe (that is, subframe 6 in FIG. 18) that is indicated as the downlink subframe based on the DL reference UL-DL configuration, for the HARQ-ACK code block size determination. That is, in this case, the terminal device 1 may HARQ-ACK code block size as $B_c^{DL}=M$.

That is, the terminal device 1 may expect the transmission on the PDSCH in the subframe (that is, subframe 6 in FIG. 18) that is indicated as the downlink subframe based on the DL reference UL-DL configuration. That is, the downlink subframe (that is, subframe 6 in FIG. 18) in a certain cell, which is indicated based on the DL reference UL-DL configuration, may be used for the HARQ-ACK code block size determination.

Furthermore, the terminal device 1 may monitor the EPDCCH in the subframe (that is, subframe 6 in FIG. 18) that is indicated as the downlink subframe based on the DL reference UL-DL configuration.

FIG. 19 is another diagram for describing the communication method according to the present embodiment. At this point, as one example, FIG. 19 illustrates a case where, for a certain cell, UL reference UL-DL configuration 0, DL reference UL-DL configuration 4, and third UL-DL configuration 2 are set. The terminal device 1 determines the HARQ-ACK code block size for the cell.

That is, subframe 6 in FIG. 19 is a subframe that is indicated as the special subframe based on the UL reference UL-DL configuration. Furthermore, subframe 6 in FIG. 19 is a subframe that is indicated as the downlink subframe based on the DL reference UL-DL configuration. Furthermore, subframe 6 in FIG. 19 is a subframe that is indicated as the special subframe based on the third UL-DL configuration.

At this point, the terminal device 1 may determine the special subframe that is used for the HARQ-ACK code block size determination, based on the third UL-DL configuration. That is, the terminal device 1 may determine whether or not the subframe (that is, subframe 6 in FIG. 19) that is indicated as the special subframe based on the third UL-DL configuration is used for the HARQ-ACK code block size determination, based on whether or not special subframe configurations 0 and 5 with normal downlink CP or special subframe configurations 0 and 4 with extended downlink CP is set.

For example, in the case where the configuration other than special subframe configurations 0 and 5 with normal downlink CP or special subframe configurations 0 and 4 with extended downlink CP is set, the terminal device 1 may use the subframe (that is, subframe 6 in FIG. 19) that is indicated as the special subframe based on the third UL-DL configuration, for the HARQ-ACK code block size determination. That is, in this case, the terminal device 1 may HARQ-ACK code block size as $B_c^{DL}=M$.

Furthermore, in a case where special subframe configurations 0 and 5 with normal downlink CP or special subframe configurations 0 and 4 with extended downlink CP is set, the terminal device 1 may exclude the subframe (that is, subframe 6 in FIG. 19) that is indicated as the special subframe based on the third UL-DL configuration, from the HARQ-ACK code block size determination. That is, in this case, the terminal device 1 may HARQ-ACK code block size as $B_c^{DL}=M-1$.

That is, the terminal device 1 may not expect the transmission on the PDSCH in the DwPTS of the subframe (that is, subframe 6 in FIG. 19) that is indicated as the special subframe based on the third UL-DL configuration, with respect to special subframe configurations 0 and 5 with normal downlink CP or special subframe configurations 0 and 4 with extended downlink CP.

Furthermore, the terminal device 1 may expect the transmission on the PDSCH in the DwPTS of the subframe (that is, subframe 6 in FIG. 19) that is indicated as the special subframe based on the third UL-DL configuration, with respect to the configuration other than special subframe configurations 0 and 5 with normal downlink CP or special subframe configurations 0 and 4 with extended downlink CP.

That is, based on the length of the CP and the special subframe configuration, the terminal device 1 may determine whether or not to expect the transmission on the PDSCH in the DwPTS of the subframe that is indicated as the special subframe (that is, subframe 6 in FIG. 19) based on the third UL-DL configuration.

That is, the transmission on the PDSCH may not be performed in the DwPTS of the subframe (that is, subframe 6 in FIG. 19) that is indicated as the special subframe based on the third UL-DL configuration, with respect to special subframe configurations 0 and 5 with normal downlink CP or special subframe configurations 0 and 4 with extended downlink CP.

Furthermore, the transmission on the PDSCH may be performed in the DwPTS of the subframe (that is, subframe 6 in FIG. 19) that is indicated as the special subframe based on the third UL-DL configuration, with respect to the configuration other than special subframe configurations 0 and 5 with normal downlink CP or special subframe configurations 0 and 4 with extended downlink CP.

Furthermore, the terminal device 1 may not monitor the EPDCCH in the DwPTS of the subframe (that is, subframe 6 in FIG. 19) that is indicated as the special subframe based on the third UL-DL configuration, with respect to special subframe configurations 0 and 5 with normal downlink CP or special subframe configurations 0 and 4 with extended downlink CP.

Furthermore, the terminal device 1 may monitor the EPDCCH in the DwPTS of the subframe (that is, subframe 6 in FIG. 19) that is indicated as the special subframe based on the third UL-DL configuration, with respect to the configuration other than special subframe configurations 0 and 5 with normal downlink CP or special subframe configurations 0 and 4 with extended downlink CP.

That is, based on the length of the CP and the special subframe configuration, the terminal device 1 may determine whether or not to monitor the EPDCCH in the DwPTS of the subframe that is indicated as the special subframe (that is, subframe 6 in FIG. 19) based on the third UL-DL configuration.

Furthermore, the transmission on the EPDCCH may not be performed in the DwPTS of the subframe (that is, subframe 6 in FIG. 19) that is indicated as the special subframe based on the third UL-DL configuration, with respect to special subframe configurations 0 and 5 with normal downlink CP or special subframe configurations 0 and 4 with extended downlink CP.

Furthermore, the transmission on the EPDCCH may be performed in the DwPTS of the subframe (that is, subframe 6 in FIG. 19) that is indicated as the special subframe based on the third UL-DL configuration, with respect to the configuration other than special subframe configurations 0 and 5 with normal downlink CP or special subframe configurations 0 and 4 with extended downlink CP.

That is, in a certain cell, the special subframe in the cell, which is indicated based on the third UL-DL configuration, may be excluded from the HARQ-ACK code block size determination, with respect to special subframe configurations 0 and 5 with normal downlink CP or special subframe configurations 0 and 4 with extended downlink CP. Based on the third UL-DL configuration, the length of the CP, and the special subframe configuration, the terminal device 1 may determine the HARQ-ACK code block size.

FIG. 20 is another diagram for describing the communication method according to the present embodiment. At this point, as one example, FIG. 20 illustrates a case where, for a certain cell, UL reference UL-DL configuration 0, DL reference UL-DL configuration 4, and third UL-DL configuration 3 are set. The terminal device 1 determines the HARQ-ACK code block size for the cell.

That is, subframe 6 in FIG. 20 is a subframe that is indicated as the special subframe based on the UL reference UL-DL configuration. Furthermore, subframe 6 in FIG. 20 is a subframe that is indicated as the downlink subframe based on the DL reference UL-DL configuration. Furthermore, subframe 6 in FIG. 20 is a subframe that is indicated as the downlink subframe based on the third UL-DL configuration.

At this point, the terminal device 1 may use the subframe (that is, subframe 6 in FIG. 20) that is indicated as the downlink subframe based on the third UL-DL configuration, for the HARQ-ACK code block size determination. That is, in this case, the terminal device 1 may HARQ-ACK code block size as $B_c^{DL}=M$.

That is, the terminal device 1 may expect the transmission on the PDSCH in the subframe (that is, subframe 6 in FIG. 20) that is indicated as the downlink subframe based on the third UL-DL configuration. That is, the downlink subframe (that is, subframe 6 in FIG. 20) in a certain cell, which is indicated based on the DL reference UL-DL configuration, may be used for the HARQ-ACK code block size determination.

Furthermore, the terminal device 1 may monitor the EPDCCH in the subframe (that is, subframe 6 in FIG. 20) that is indicated as the downlink subframe based on the third UL-DL configuration.

At this point, the method of transmitting HARQ-ACK (the method of determining a codeword size of the HARQ-ACK), which is described above referring to FIGS. 17 to 20, involves operations in a case where at least the DL reference UL-DL configuration is set for the terminal device 1. That is, the operations in FIGS. 17 to 20 are operations in the terminal device 1 for which dynamic TDD (also possibly eIMTA).

A method of determining the HARQ-ACK codebook size in a case where at least the DL reference UL-DL configuration is not set for the terminal device 1 will be described below. That is, the operations in the terminal device 1 for which the dynamic TDD (also possibly eIMTA) is not configured will be described.

At this point, the terminal device 1 for which the DL reference UL-DL configuration is not set may determine the special subframe that is used for the HARQ-ACK code block size determination, based on the UL reference UL-DL configuration. That is, the terminal device 1 may determine whether or not the subframe that is indicated as the special subframe based on the UL reference UL-DL configuration is used for the HARQ-ACK code block size determination, based on whether or not special subframe configurations 0 and 5 with normal downlink CP or special subframe configurations 0 and 4 with extended downlink CP is set.

For example, in the case where the configuration other than special subframe configurations 0 and 5 with normal downlink CP or special subframe configurations 0 and 4 with extended downlink CP is set, the terminal device 1 may use the subframe that is indicated as the special subframe based on the UL reference UL-DL configuration, for the HARQ-ACK code block size determination. That is, in this case, the terminal device 1 may HARQ-ACK code block size as $B_c^{DL}=M$.

Furthermore, in the case where special subframe configurations 0 and 5 with normal downlink CP or special subframe configurations 0 and 4 with extended downlink CP is set, the terminal device 1 may exclude the subframe that is indicated as the special subframe based on the UL reference UL-DL configuration, from the HARQ-ACK code block size determination. That is, in this case, the terminal device 1 may HARQ-ACK code block size as $B_c^{DL}=M-1$.

That is, the terminal device 1 may not expect the transmission on the PDSCH in the DwPTS of the subframe that is indicated as the special subframe based on the UL reference UL-DL configuration, with respect to special subframe configurations 0 and 5 with normal downlink CP or special subframe configurations 0 and 4 with extended downlink CP.

Furthermore, the terminal device 1 may expect the transmission on the PDSCH in the DwPTS of the subframe that is indicated as the special subframe based on the UL reference UL-DL configuration, with respect to the configuration other than special subframe configurations 0 and 5 with normal downlink CP or special subframe configurations 0 and 4 with extended downlink CP.

That is, based on the length of the CP and the special subframe configuration, the terminal device 1 may determine whether or not to expect the transmission on the PDSCH in the DwPTS of the subframe that is indicated as the special subframe based on the UL reference UL-DL configuration.

Furthermore, the transmission on the PDSCH may not be performed in the DwPTS of the subframe that is indicated as the special subframe based on the UL reference UL-DL configuration, with respect to special subframe configurations 0 and 5 with normal downlink CP or special subframe configurations 0 and 4 with extended downlink CP.

Furthermore, the transmission on the PDSCH may be performed in the DwPTS of the subframe that is indicated as the special subframe based on the UL reference UL-DL configuration, with respect to the configuration other than special subframe configurations 0 and 5 with normal downlink CP or special subframe configurations 0 and 4 with extended downlink CP.

Furthermore, the terminal device 1 may not monitor the EPDCCH in the DwPTS of the subframe that is indicated as the special subframe based on the UL reference UL-DL configuration, with respect to special subframe configurations 0 and 5 with normal downlink CP or special subframe configurations 0 and 4 with extended downlink CP.

Furthermore, the terminal device 1 may monitor the EPDCCH in the DwPTS of the subframe that is indicated as the special subframe based on the UL reference UL-DL configuration, with respect to the configuration other than special subframe configurations 0 and 5 with normal downlink CP or special subframe configurations 0 and 4 with extended downlink CP.

That is, based on the length of the CP and the special subframe configuration, the terminal device 1 may determine whether or not to monitor the EPDCCH in the DwPTS of the subframe that is indicated as the special subframe based on the UL reference UL-DL configuration.

Furthermore, the transmission on the EPDCCH may not be performed in the DwPTS of the subframe that is indicated as the special subframe based on the UL reference UL-DL configuration, with respect to special subframe configurations 0 and 5 with normal downlink CP or special subframe configurations 0 and 4 with extended downlink CP.

Furthermore, the transmission on the EPDCCH may be performed in the DwPTS of the subframe that is indicated as the special subframe based on the UL reference UL-DL configuration, with respect to the configuration other than special subframe configurations 0 and 5 with normal downlink CP or special subframe configurations 0 and 4 with extended downlink CP.

That is, in a certain cell, the special subframe in the cell, which is indicated based on the UL reference UL-DL configuration, may be excluded from the HARQ-ACK code block size determination, with respect to special subframe configurations 0 and 5 with normal downlink CP or special subframe configurations 0 and 4 with extended downlink CP. Based on the UL reference UL-DL configuration, the length of the CP, and the special subframe configuration, the terminal device 1 may determine the HARQ-ACK code block size.

Furthermore, the terminal device 1 may use the subframe that is indicated as the downlink subframe based on the UL reference UL-DL configuration, for the HARQ-ACK code block size determination. That is, in this case, the terminal device 1 may HARQ-ACK code block size as $B_c^{DL}=M$.

That is, the terminal device 1 may expect the transmission on the PDSCH in the subframe that is indicated as the downlink subframe based on the UL reference UL-DL configuration. That is, the downlink subframe in a certain cell, which is indicated based on the UL reference UL-DL configuration, may be used for the HARQ-ACK code block size determination.

Furthermore, the terminal device 1 may monitor the EPDCCH in the subframe that is indicated as the downlink subframe based on the UL reference UL-DL configuration.

The terminal device 1 that, as described above, determines the HARQ-ACK codebook size transmits the HARQ-ACK using the determined HARQ-ACK codebook size. That is, the terminal device 1 set the ACK or the NACK to be in the corresponding HARQ-ACK field, based on the detection of the transmission on the PDSCH in subframe (also possibly multiple subframes) n−k (at this point, k∈K and K are expressed in FIG. 15), and transmits the HARQ-ACK or the spacially bundled HARQ-ACK in uplink subframe n.

Furthermore, the terminal device 1 may set the ACK or the NACK to be in the corresponding HARQ-ACK field, based on the detection of the PDCCH/EPDCCH that indicates the downlink SPS release in subframe (also possibly multiple subframes) n−k (at this point, k∈K and K are expressed in FIG. 15), and may transmit the HARQ-ACK in uplink subframe n.

At this point, in a case where, for a certain cell, in a certain subframe, neither the PDSCH nor the PDCCH/EPDCCH that indicates the downlink SPS is detected, the terminal device 1 may generate the NACK. That is, in the case where, for a certain cell, in a certain subframe, neither the PDSCH nor the PDCCH/EPDCCH that indicates the downlink SPS is detected, the terminal device 1 may set the NACK to be in the corresponding HARQ-ACK field.

At this point, in a case where the downlink transmission mode that is configured in the cell supports up to two transport blocks and spacial bundling is not applied, the terminal device 1 may generate two NACKs. Furthermore, in a case where the downlink transmission mode that is configured in the cell supports one transport block, the terminal device 1 may generate one NACK. Furthermore, in a case where, in the cell, the spacial bundling is applied, the terminal device 1 may generate one NACK.

At this point, in a case where, for a certain cell, in a certain subframe, the downlink transmission mode that is configured in the cell supports up to two transport blocks, one transport block is received in the subframe in the cell, and the spacial HARQ ACK bundling is not applied to the cell, the terminal device 1 may generate one NACK for the transport block that is different from the received one transport block.

Furthermore, in a case where, for a certain cell, in a certain subframe, the downlink transmission mode that is configured in the cell supports up to two transport blocks, the PDCCH/EPDCCH that indicates the downlink SPS release is received (detected) in the subframe in the cell, and the spacial HARQ-ACK bundling is not applied to the cell, the terminal device 1 may generate one NACK, as the HARQ-ACK that corresponds to codeword 1. At this point, the one ACK for the received PDCCH/EPDCCH that indicates the downlink SPS release may be generated as the HARQ-ACK that corresponds to cordword 0.

Furthermore, in the case where, for a certain cell, in a certain subframe, the downlink transmission mode that is configured in the cell supports up to two transport blocks, the PDCCH/EPDCCH that indicates the downlink SPS release is received (detected) in the subframe in the cell, and the spacial HARQ-ACK bundling is not applied to the cell, the terminal device 1 may generate one NACK, as the HARQ-ACK-that corresponds to codeword 0. At this point, the one ACK for the received PDCCH/EPDCCH that indicates the downlink SPS release may be generated as the HARQ-ACK that corresponds to cordword 1.

Furthermore, in the case where, for a certain cell, in a certain subframe, the downlink transmission mode that is configured in the cell supports up to two transport blocks, the PDCCH/EPDCCH that indicates the downlink SPS release is received (detected) in the subframe in the cell, and the spacial HARQ-ACK bundling is not applied to the cell, the terminal device 1 may generate two ACKs. That is, in this case, in response to the PDCCH/EPDCCH that indicates the downlink SPS release, two ACKs (the same HARQ-ACK responses) of both of the transport blocks may be generated.

Furthermore, in a case where, for a certain cell, in a certain subframe, the downlink transmission mode that is configured in the cell supports up to two transport blocks, the PDCCH/EPDCCH that indicates the downlink SPS release is received in the subframe in the cell, and the spacial HARQ-ACK bundling is not applied to the cell, if at least one of HARQ-ACKs for both of the transport blocks is the ACK, the base station apparatus 3 may determine that the terminal device 1 succeeds in receiving (detecting) the PDCCH/EPDCCH that indicates the downlink SPS release).

At this point, as described above, based on the length of the CP and the subframe configuration, the terminal device 1 may determine whether or not to expect the transmission on the PDSCH in a certain subframe (also possibly the DwPTS of a certain subframe).

One example of operation of the terminal device 1 that is based on the length of the CP, the subframe configuration, and the third UL-DL configuration will be described below.

For example, in the case where special subframe configurations 0 and 5 with normal downlink CP or special subframe configurations 0 and 4 with extended downlink CP is set, the terminal device 1 may not expect the transmission on the PDSCH in the subframe (also possibly the DwPTS of the subframe) that is indicated as the special subframe based on the third UL-DL configuration.

Furthermore, in the case where special subframe configurations 0 and 5 with normal downlink CP or special subframe configurations 0 and 4 with extended downlink CP is set, the terminal device 1 may not expect the transmission on the PDSCH in the subframe that is indicated as the downlink subframe based on the third UL-DL configuration.

At this point, in the case where special subframe configurations 0 and 5 with normal downlink CP or special subframe configurations 0 and 4 with extended downlink CP is set, the terminal device 1 may monitor the EPDCCH (also possibly the uplink grant that is transmitted on the EPDCCH) in the subframe that is indicated as the downlink subframe based on the third UL-DL configuration.

Furthermore, in the case where special subframe configurations 0 and 5 with normal downlink CP or special subframe configurations 0 and 4 with extended downlink CP is set, the terminal device 1 may not monitor the EPDCCH (also possibly the uplink grant that is transmitted on the EPDCCH) in the subframe that is indicated as the downlink subframe based on the third UL-DL configuration.

Furthermore, in the case where the configuration other than special subframe configurations 0 and 5 with normal downlink CP or special subframe configurations 0 and 4 with extended downlink CP is set, the terminal device 1 may expect the transmission on the PDSCH in the subframe (also possibly the DwPTS of the subframe) that is indicated as the special subframe based on the third UL-DL configuration.

Furthermore, in the case where the configuration other than special subframe configurations 0 and 5 with normal downlink CP or special subframe configurations 0 and 4 with extended downlink CP is set, the terminal device 1 may expect the transmission on the PDSCH in the subframe that is indicated as the downlink subframe based on the third UL-DL configuration.

That is, the terminal device 1 may determine whether or not to expect the transmission on the PDSCH in the subframe (also possibly the DwPTS of the subframe) that is indicated as the special subframe based on the third UL-DL configuration, based on whether or not special subframe configurations 0 and 5 with normal downlink CP or special subframe configurations 0 and 4 with extended downlink CP is set.

Furthermore, the terminal device 1 may determine whether or not to expect the transmission on the PDSCH in the subframe that is indicated as the downlink subframe based on the third UL-DL configuration, based on whether or not special subframe configurations 0 and 5 with normal downlink CP or special subframe configurations 0 and 4 with extended downlink CP is set.

One example of the operation of the terminal device 1 that is based on the length of the CP, the subframe configuration, the UL reference UL-DL configuration, the DL reference UL-DL configuration and the third UL-DL configuration will be described below.

As described above, the terminal device 1 may expect the transmission on the PDSCH in the subframe (which is hereinafter also described as a DL-S subframe for clear description) that is indicated as the downlink subframe and the special subframe based on the third UL-DL configuration. At this point, in this case, in a case where the DL-S subframe is indicated as the special subframe based on a first UL-DL configuration and is indicated as the special subframe based on a second UL-DL configuration, the terminal device 1 may determine whether or not to expect the transmission on the PDSCH in the DL-S subframe, based on the length of the CP and the special subframe configuration.

That is, the terminal device 1 may determine whether or not to expect the transmission on the PDSCH in the DL-S subframe, based on whether or not special subframe configurations 0 and 5 with normal downlink CP or special subframe configurations 0 and 4 with extended downlink CP is set.

That is, in the case where special subframe configurations 0 and 5 with normal downlink CP or special subframe configurations 0 and 4 with extended downlink CP is set, the terminal device 1 may not expect the transmission on the PDSCH in the DL-S subframe. Furthermore, in the case where the configuration other than special subframe configurations 0 and 5 with normal downlink CP or special subframe configurations 0 and 4 with extended downlink CP is set, the terminal device 1 may expect the transmission on the PDSCH in the DL-S subframe.

Furthermore, in a case where the DL-S subframe is indicated as the special subframe based on the first UL-DL configuration and is indicated as the downlink subframe based on the second UL-DL configuration, the terminal device 1 may expect the transmission on the PDSCH in the DL-S subframe. That is, in this case, regardless of the length of the CP and the special subframe configuration, the terminal device 1 may expect the transmission on the PDSCH in the DL-S subframe.

As described above, the terminal device 1 may monitor the EPDCCH in the subframe (which is hereinafter also referred to as an EPDCCH monitoring DL-S subframe for clear description) that is indicated as the downlink subframe and the special subframe based on the third UL-DL configuration, among the subframes (each of which is hereinafter also referred to as an EPDCCH monitoring subframe for clear description), the EPDCCH in which is monitored. At this point, as described above, the subframe, the EPDCCH in which is monitored, is configured as the subframe, the EPDCCH in which has to be monitored by the terminal device 1.

At this point, in this case, in a case where the DL-S subframe, the EPDCCH in which is monitored, is indicated as the special subframe based on the first UL-DL configuration and is indicated as the special subframe based on the second UL-DL configuration (this case is also described as a first case), the terminal device 1 may determine whether or not to monitor the EPDCCH in the EPDCCH monitoring DL-S subframe, based on the length of the CP and the special subframe configuration.

That is, the terminal device 1 may determine whether or not to monitor the EPDCCH in the EPDCCH monitoring DL-S subframe, based on whether or not special subframe configurations 0 and 5 with normal downlink CP or special subframe configurations 0 and 4 with extended downlink CP is set.

That is, in the case where special subframe configurations 0 and 5 with normal downlink CP or special subframe configurations 0 and 4 with extended downlink CP is set, the terminal device 1 may not monitor the EPDCCH in the EPDCCH monitoring DL-S subframe. Furthermore, in the case where the configuration other than special subframe configurations 0 and 5 with normal downlink CP or special subframe configurations 0 and 4 with extended downlink CP is set, the terminal device 1 may monitor the EPDCCH in the EPDCCH monitoring DL-S subframe.

Furthermore, in a case where the EPDCCH monitoring DL-S subframe is indicated as the special subframe based on the first UL-DL configuration and is indicated as the downlink subframe based on the second UL-DL configuration (this case is also described as a second case), the terminal device 1 may monitor the EPDCCH in the EPDCCH monitoring DL-S subframe. That is, in this case, regardless of the length of the CP and the special subframe configuration, the terminal device 1 may monitor the EPDCCH in the EPDCCH monitoring DL-S subframe.

At this point, the communication method as described above may be applied to a case where (only) one cell is configured for the terminal device 1. Furthermore, the communication method may be applied to a case where multiple cells (for example, two cells) are configured for the terminal device 1 and the first UL reference UL-DL configurations for all of the multiple cells (for example, the two cells) are the same.

Furthermore, the communication method may be applied to a case where multiple cells are configured for the terminal device 1 and the first UL reference UL-DL configurations for at least two of the multiple cells are not the same (are different).

At this point, in the case where multiple cells are configured for the terminal device 1 and the first UL reference UL-DL configurations for at least two of the multiple cells are not the same, and in a case where it is assumed that the terminal device 1 performs the transmission on the PUCCH in subframe n, the HARQ-ACK codebook size may be at all times determined as $B_c^{DL=M}{}_c$.

At this point, $M_c$ indicates the number of elements in set $K_c$ that is associated with subframe n for a certain cell. That is, the terminal device 1 transmits the HARQ-ACK in uplink subframe n, based on the detection of the transmission on the PDSCH in subframe n–k in the cell. At this point, $k \in K_c$, and $K_c$ is expressed in FIG. 15. At this point, in this case, the UL-DL configuration in FIG. 15 refers to the DL reference UL-DL configuration. That is, in this case, the DL reference UL-DL configuration is used as the UL-DL configuration in FIG. 15.

A constitution of a device according to the present embodiment will be described below.

Figure 21:
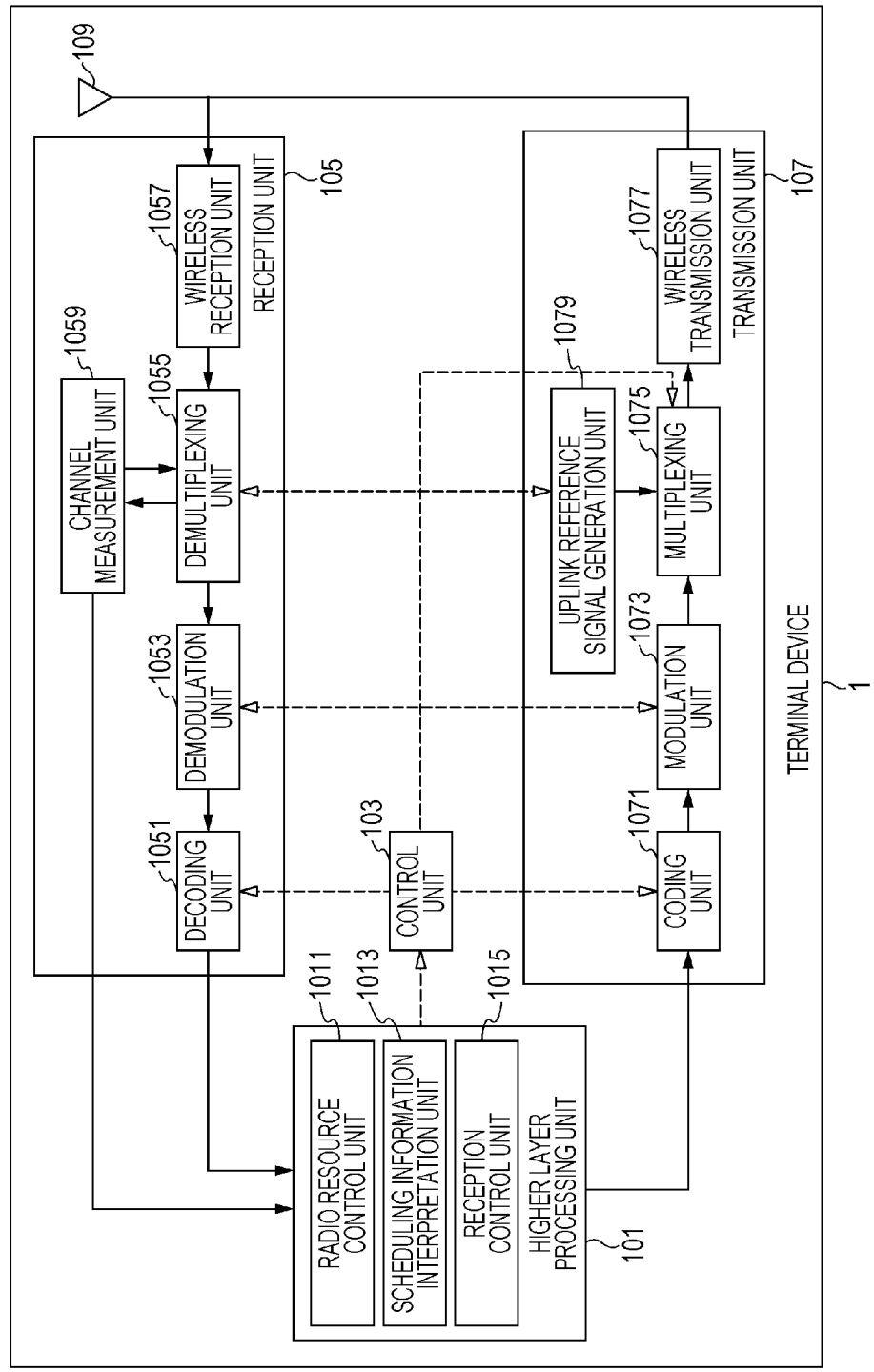
FIG. 21 is a schematic block diagram illustrating a constitution of a terminal device 1.

FIG. 21 is a schematic block diagram illustrating a constitution of the terminal device 1 according to the present embodiment. As illustrated, the terminal device 1 is constituted to include a higher layer processing unit 101, a control unit 103, a reception unit 105, a transmission unit 107, a transmit and receive antenna unit 109. Furthermore, the higher layer processing unit 101 is constituted to include a radio resource control unit 1011, a scheduling information interpretation unit 1013, and a reception control unit 1015. Furthermore, the reception unit 105 is constituted to include a decoding unit 1051, a demodulation unit 1053, a demultiplexing unit 1055, a wireless reception unit 1057, and a channel measurement unit 1059. Furthermore, the transmission unit 107 is configured to include a coding unit 1071, a modulation unit 1073, a multiplexing unit 1075, a wireless transmission unit 1077, and an uplink reference signal generation unit 1079.

The higher layer processing unit 101 outputs the uplink data (the transport block) that is generated by a user operation and the like, to the transmission unit 107. Furthermore, the higher layer processing unit 101 performs processing of a Medium Access Control (MAC) layer, a Packet Data Convergence Protocol (PDCP) layer, a Radio Link Control (RLC) layer, and a Radio Resource Control (RRC) layer.

The radio resource control unit 1011 that is included in the higher layer processing unit 101 manages various pieces of configuration information of the terminal device 1 itself or various parameters for the terminal device 1. The radio resource control unit 1011 sets various pieces of configuration information/parameters based on the higher layer signaling that is received from the base station apparatus 3. That is, the radio resource control unit 1011 sets various pieces of configuration information/parameters based on pieces of information indicating various pieces of configuration information/parameters that are received from the base station apparatus 3. Furthermore, the radio resource control unit 1011 generates information that is arranged in each uplink channel and outputs the generated information to the transmission unit 107. The radio resource control unit 1011 is also referred to as a configuration unit 1011.

That is, the radio resource control unit 1011 sets the first UL reference UL-DL configuration, the second UL reference UL-DL configuration, the first DL reference UL-DL configuration, the second DL reference UL-DL configuration, and the third UL-DL configuration.

The scheduling information interpretation unit 1013 that is included in the higher layer processing unit 101 interprets the DCI format (scheduling information) that is received through the reception unit 105, generates control information for performing control of the reception unit 105 and the transmission unit 107 based on a result of interpreting the DCI format, and outputs the generated control information to the control unit 103.

The reception control unit 1015 that is included in the higher layer processing unit 101 identifies a subframe based on the RNTI which is used for scheduling the CRC parity bit that is attached to the DCI format, and perform control in such a manner that the reception unit 105 decodes the PDSCH based on the identified subframe. At this point, a function of the reception control unit 1015 may be included in the reception unit 105.

The control unit 103 generates a control signal for performing the control of the reception unit 105 and the transmission unit 107, based on the control information from the higher layer processing unit 101. The control unit 103 outputs the generated control signal to the reception unit 105 and the transmission unit 107 and performs the control of the reception unit 105 and the transmission unit 107.

In accordance with the control signal that is input from the control unit 103, the reception unit 105 demultiplexes, demodulates, and decodes a reception signal that is received from the base station apparatus 3 through the transmit and receive antenna unit 109, and outputs the resulting information to the higher layer processing unit 101.

The wireless reception unit 1057 converts (down-converts) a downlink signal that is received through the transmit and receive antenna unit 109 into a signal in a baseband by performing orthogonal demodulation, removes a unnecessary frequency component, controls an amplification level in such a manner that a signal level is suitably maintained, performs orthogonal demodulation based on an in-phase component and an orthogonal component of the received signal, and converts the analog signal that results from the orthogonal demodulation, into a digital signal. The wireless reception unit 1057 removes a portion that is equivalent to a cyclic prefix (CP) from the digital signal that results from the conversion, performs Fast Fourier Transform (FFT) on the signal from which the CP is removed, and extracts a signal in the frequency domain.

The demultiplexing unit 1055 demultiplexes the extracted signal that result from the extraction, into the PHICH, the PDCCH, the EPDCCH, the PDSCH, and the downlink reference signal. Furthermore, the demultiplexing unit 1055 performs compensation on channels, that is, the PHICH, the PDCCH, the EPDCCH, and the PDSCH, using a channel estimate that is input from the channel measurement unit 1059. Furthermore, the demultiplexing unit 1055 outputs a downlink reference signal that results from the multiplexing to the channel measurement unit 1059.

The demodulation unit 1053 multiplies the PHICH by a corresponding code for composition, performs demodulation in compliance with a Binary Phase Shift Keying (BPSK) modulation scheme on the resulting composite signal, and outputs a result of the demodulation to the decoding unit 1051. The decoding unit 1051 decodes the PHICH that is destined for the terminal device 1 itself, and outputs an HARQ indicator that results from the decoding to the higher layer processing unit 101. The demodulation unit 1053 performs demodulation in compliance with a QPSK modulation scheme on the PDCCH and/or the EPDCCH, and outputs a result of the demodulation to the decoding unit 1051. The decoding unit 1051 makes an attempt to perform the decoding of the PDCCH and/or the EPDCCH. In a case where the decoding unit 1051 succeeds in the decoding, the decoding unit 1051 outputs downlink control information that results from the decoding and the RNTI to which the downlink control information corresponds, to the higher layer processing unit 101.

The demodulation unit 1053 performs the demodulation on the PDSCH in compliance with the modulation scheme that is notified with the downlink grant, such as Quadrature Phase Shift Keying (QPSK), 16 Quadrature Amplitude Modulation (QAM), or 64 QAM, and outputs a result of the demodulation to the decoding unit 1051. The decoding unit 1051 performs decoding based on information relating to a coding rate that is notified with the downlink control information, and outputs downlink data (a transport block) that results from the decoding, to the higher layer processing unit 101.

The channel measurement unit 1059 measures a downlink path loss or a channel state from the downlink reference signal that is input from the demultiplexing unit 1055, and outputs the measured path loss or channel state to the higher layer processing unit 101. Furthermore, the channel measurement unit 1059 calculates a downlink channel estimate from the downlink reference signal and outputs the calculated downlink channel estimate to the demultiplexing unit 1055. The channel measurement unit 1059 performs channel measurement and/or interference measurement in order to calculate a CQI.

The transmission unit 107 generates the uplink reference signal in accordance with the control signal, which is input from the control unit 103, performs the coding and the modulation on the uplink data (the transport block), which is input from the higher layer processing unit 101, multiplexes the PUCCH, the PUSCH, and the generated uplink reference signal, and transmits a result of the multiplexing to the base station apparatus 3 through the transmit and receive antenna unit 109.

The coding unit 1071 performs the coding, such as convolutional coding and block coding, on the uplink control information that is input from the higher layer processing unit 101. Furthermore, the coding unit 1071 performs turbo coding, based on information that is used for scheduling the PUSCH.

The modulation unit 1073 performs the modulation on coded bits, which are input from the coding unit 1071, in compliance with the modulation scheme that is notified with the downlink control information, such as the BPSK, the QPSK, the 16 QAM, or the 64 QAM, or in compliance with a modulation scheme that is prescribed in advance for every channel Based on the information that is used for the scheduling the PUSCH, the modulation unit 1073 determines the number of sequences of pieces of data that are space-multiplexed, maps multiple pieces of uplink data that are transmitted on the same PUSCH, to multiple sequences, by using Multiple Input Multiple Output (MIMO) Spatial Multiplexing (SM), and performs precoding on the sequences.

The uplink reference signal generation unit 1079 generates a sequence that is acquired according to a rule (an expression) that is prescribed in advance, based on a physical layer cell identifier (which is also referred to as a physical layer cell identity (PCI), a Cell ID, or the like) for identifying the base station apparatus 3, a bandwidth to which the uplink reference signal is mapped, a cyclic shift that is notified with the uplink grant, a value of a parameter for generation of a DMRS sequence, and the like. In accordance with the control signal that is input from the control unit 103, the multiplexing unit 1075 rearranges modulation symbols of the PUSCH in parallel and then performs Discrete Fourier Transform (DFT) on the resulting modulation symbols. Furthermore, the multiplexing unit 1075 multiplexes PUCCH and PUSCH signals and the generated uplink reference signal for every transmit antenna port. More precisely, the multiplexing unit 1075 maps the PUCCH and PUSCH signals and the generated uplink reference signal to the resource elements for every transmit antenna port.

The wireless transmission unit 1077 performs Inverse Fast Fourier Transform (IFFT) on a signal that results from the multiplexing, generates an SC-FDMA symbol, attaches a CP to the generated SC-FDMA symbol, generates a digital signal in a baseband, converts the digital signal in the baseband into an analog signal, removes a superfluous frequency component using a low pass filter, performs up-converting into a carrier frequency, performs power amplification, and outputs a final result to the transmit and receive antenna unit 109 for transmission.

Figure 22:
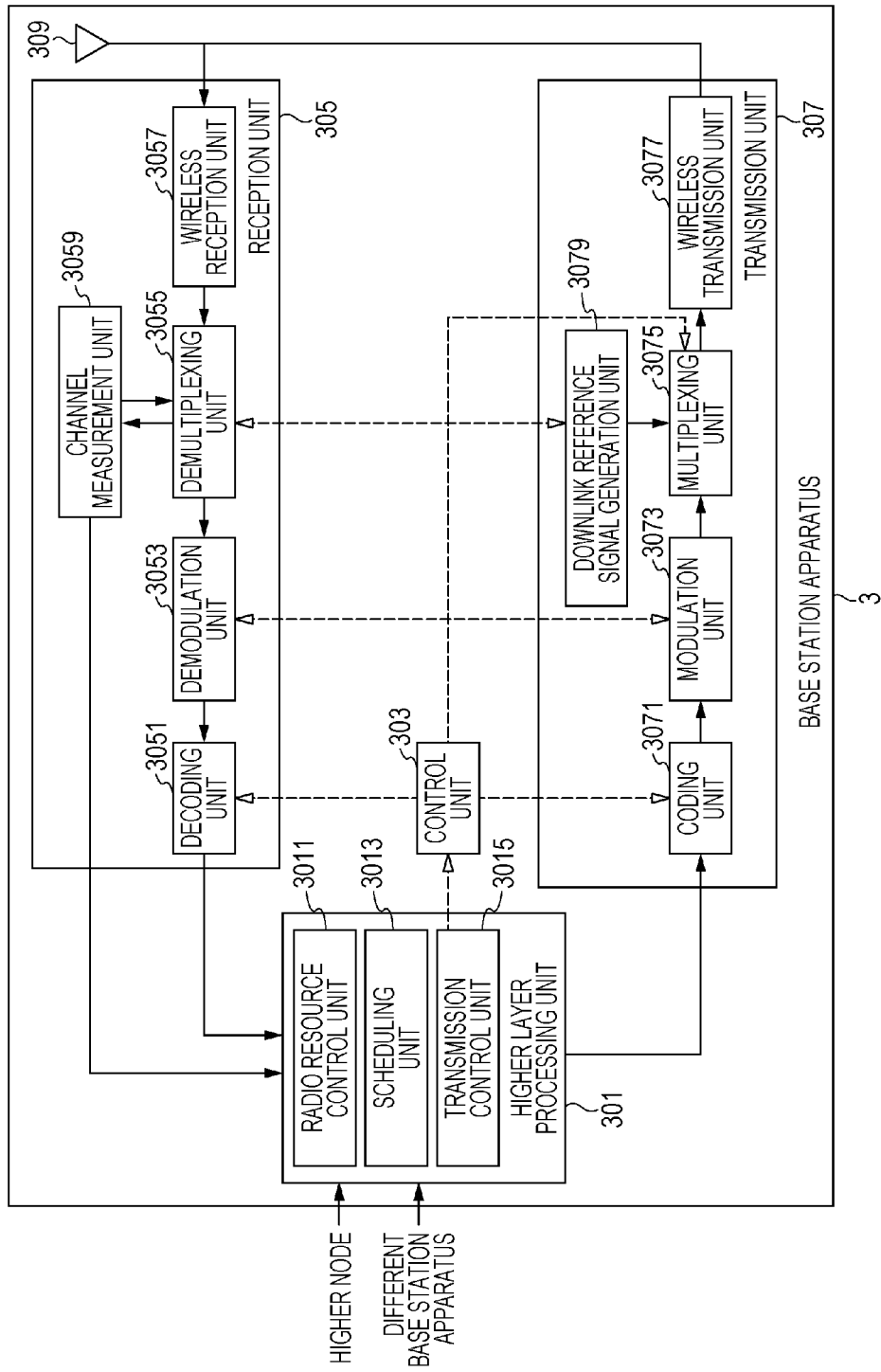
FIG. 22 is a schematic block illustrating a constitution of a base station apparatus 3.

FIG. 22 is a schematic block diagram illustrating a constitution of the base station apparatus 3 according to the present embodiment. As illustrated, the base station apparatus 3 is constituted to include a higher layer processing unit 301, a control unit 303, a reception unit 305, a transmission unit 307, and a transmit and receive antenna unit 309. Furthermore, the higher layer processing unit 301 is constituted to include a radio resource control unit 3011, a scheduling unit 3013, and a transmission control unit 3015. Furthermore, the reception unit 305 is constituted to include a decoding unit 3051, a demodulation unit 3053, a demultiplexing unit 3055, a wireless reception unit 3057, and a channel measurement unit 3059. Furthermore, the transmission unit 307 is constituted to include a coding unit 3071, a modulation unit 3073, a multiplexing unit 3075, a radio transmission unit 3077, and a downlink reference signal generation unit 3079.

The higher layer processing unit 301 performs the processing of the Medium Access Control (MAC) layer, the Packet Data Convergence Protocol (PDCP) layer, the Radio Link Control (RLC) layer, and the radio resource control (RRC) layer. Furthermore, the higher layer processing unit 301 generates a control signal in order to perform control of the reception unit 305 and the transmission unit 307, and outputs the generated control information to the control unit 303.

The radio resource control unit 3011 that is included in the higher layer processing unit 301 generates, or acquires from a higher level node, the downlink data (the transport block) that is arranged in the downlink PDSCH, the system information, the RRC message, the MAC Control Element (CE), and the like, and outputs a result of the generation or of the acquirement to the transmission unit 307. Furthermore, the radio resource control unit 3011 manages various pieces of configuration information of each of the terminal devices 1 or various parameters for each of the terminal devices 1. The radio resource control unit 3011 may set various pieces of configuration information/parameters for each of the terminal devices 1 through the higher layer signaling. That is, the radio resource control unit 1011 transmits/broadcasts pieces of information indicating various pieces of configuration information/parameters. The radio resource control unit 3011 is also referred to as a configuration unit 3011.

That is, the radio resource control unit 3011 configures the first UL reference UL-DL configuration, the second UL reference UL-DL configuration, the first DL reference UL-DL configuration, the second DL reference UL-DL configuration, and the third UL-DL configuration, for each of the terminal devices 1.

The scheduling unit 3013 that is included in the higher layer processing unit 301 determines a frequency and a subframe to which the physical channel (the PDSCH and the PUSCH) is allocated, the coding rate and modulation scheme for the physical channel (the PDSCH and the PUSCH), transmission power, and the like, from the received channel estimate information and from the channel estimate, channel quality, or the like that is input from the channel measurement unit 3059. The scheduling unit 3013 generates the control information (for example, the DCI format) in order to perform the control of the reception unit 305 and the transmission unit 307 based on a result of the scheduling, and outputs the generated information to the control unit 303. Furthermore, the scheduling unit 3013 determines a timing when transmission processing and reception processing are performed.

The transmission control unit 3015 that is included in the higher layer processing unit 301 performs control in such a manner that the transmission unit 307 maps the PDSCH to the resource element based on the RNTI that is used for scheduling the CRC parity bit which is attached to the DCI format and in such a manner that the transmission unit 307 performs the transmission on the PDSCH. At this point, a function of the transmission control unit 3015 may be included in the transmission unit 307.

Based on the control information from the higher layer processing unit 301, the control unit 303 generates a control signal for performing the control of the reception unit 305 and the transmission unit 307. The control unit 303 outputs the generated control signal to the reception unit 305 and the transmission unit 307 and performs the control of the reception unit 305 and the transmission unit 307.

In accordance with the control signal that is input from the control unit 303, the reception unit 305 demultiplexes, demodulates, and decodes a reception signal that is received from the terminal device 1 through the transmit and receive antenna unit 309, and outputs the resulting information to the higher layer processing unit 301. The wireless reception unit 3057 converts (down-converts) an uplink signal that is received through the transmit and receive antenna unit 309 into a signal in a baseband by performing orthogonal demodulation, removes an unnecessary frequency component, controls an amplification level in such a manner that a signal level is suitably maintained, performs orthogonal demodulation based on an in-phase component and an orthogonal component of the received signal, and converts the analog signal that results from the orthogonal demodulation, into a digital signal.

The wireless reception unit 3057 removes a portion that is equivalent to a Cyclic Prefix (CP) from a digital signal that results from the conversion. The wireless reception unit 3057 performs the Fast Fourier Transform (FFT) on the signal from which the CP is removed, and outputs the resulting signal to the demultiplexing unit 3055 that extracts the signal in the frequency domain.

The demultiplexing unit 1055 demultiplexes the signal that is input from the wireless reception unit 3057, into the PUCCH, the PUSCH, the uplink reference signal, and the like. Moreover, the demultiplexing is performed based on radio resource allocation information that is determined in advance by the base station apparatus 3, using the radio resource control unit 3011, and that is included in the uplink grant that is notified to each of the terminal devices 1. Furthermore, the demultiplexing unit 3055 performs the configuration on the channels, that is, the PUCCH and the PUSCH, using the channel estimate that is input from the channel measurement unit 3059. Furthermore, the demultiplexing unit 3055 outputs an uplink reference signal that results from the demultiplexing, to the channel measurement unit 3059.

The demodulation unit 3053 performs Inverse Discrete Fourier Transform (IDFT) on the PUSCH, acquires the modulation symbol, and performs reception signal demodulation on each of the modulation symbols of the PUCCH and the PUSCH, using the modulation scheme that is prescribed in advance, such as the Binary Phase Shift Keying (BPSK), the QPSK, the 16 QAM, or the 64 QAM, or using the modulation scheme that is notified, in advance with the uplink grant, to each of the terminal devices 1 by the base station apparatus 3 itself. The demodulation unit 3053 demultiplexes the modulation symbols of the multiple pieces of uplink data that are transmitted on the same PUSCH by using the MIMO SM, based on the number of space-multiplexed sequences that is notified in advance with the uplink grant to each of the terminal devices 1 and on information indicating precoding that is performed on the sequences.

The decoding unit 3051 performs the decoding on coded bits of the PUCCH and the PUSCH that result from the demodulation, at a coding rate in compliance with the coding scheme that is prescribed in advance, which is prescribed in advance, or at a coding rate which is notified in advance with the uplink grant to the terminal device 1 by the base station apparatus 3 itself, and outputs uplink data and uplink control information that result from the decoding, to the higher layer processing unit 101. In a case where the PUSCH is re-transmitted, the decoding unit 3051 performs the decoding using the coded bits that are input from the higher layer processing unit 301 and that are retained in an HARQ buffer, and the coded bits that results from the demodulation. The channel measurement unit 309 measures the channel estimate, the channel quality, and the like, from the uplink reference signal that is input from the demultiplexing unit 3055, and outputs a result of the measurement to the demultiplexing unit 3055 and the higher layer processing unit 301.

The transmission unit 307 generates the downlink reference signal in accordance with the control signal that is input from the control unit 303, codes and modulates the HARQ indicator, the downlink control information, and the downlink data that are input from the higher layer processing unit 301, multiplexes the PHICH, the PDCCH, the EPDCCH, the PDSCH, and the downlink reference signal, and transmits the resulting signal to the terminal device 1 through the transmit and receive antenna unit 309.

The coding unit 3071 performs coding on the HARQ indicator, the downlink control information, and the downlink data that are input from the higher layer processing unit 301. When performing the coding, the coding unit 3071 uses a coding scheme that is prescribed in advance, such as block coding, convolutional coding, or turbo coding, or uses a coding scheme that is determined by the radio resource control unit 3011. The modulation unit 3073 performs the modulation on the coded bits that are input from the coding unit 3071, using the modulation scheme that is prescribed in advance, such as the BPSK, the QPSK, the 16 QAM, or the 64 QAM, or using the modulation scheme that is determined by the radio resource control unit 3011.

The downlink reference signal generation unit 3079 generates as the downlink reference signal a sequence that is already known to the terminal device 1 and that is acquired according to a rule that is prescribed in advance based on the physical layer cell identifier (PCI) for identifying the base station apparatus 3, and the like. The multiplexing unit 3075 multiplexes a modulation symbol of each channel, which results from the modulation, and the generated downlink reference signal. More precisely, the multiplexing unit 3075 maps a modulation symbol of each channel, which results from the modulation, and the generated downlink reference signal, to resource elements.

The radio transmission unit 3077 performs the Inverse Fast Fourier Transform (IFFT) on a modulation symbol and the like that result from the multiplexing, generates an OFDM symbol, attaches a CP to the generated OFDM symbol, generates a digital signal in a baseband, converts the digital signal in the baseband into an analog signal, removes a superfluous frequency component using a low pass filter, performs up-converting into a carrier frequency, performs power amplification, and outputs a final result to the transmit and receive antenna unit 309 for transmission.

More specifically, the terminal device 1 according to the present embodiment includes a control unit (the radio resource control unit 1011) that sets the first UL-DL configuration (the UL reference UL-DL configuration), sets the second UL-DL configuration (the DL reference UL-DL configuration), and sets the third UL-DL configuration.

Furthermore, the terminal device 1 according to the present embodiment includes a control unit (the control unit 103) that determines whether or to exclude the subframe that is indicated as the special subframe based on the first UL-DL configuration (the UL reference UL-DL configuration), from the HARQ-ACK codebook size determination, at least based on whether the subframe is indicated as the special subframe based on the second UL-DL configuration (the DL reference UL-DL configuration) or the subframe is indicated as the downlink subframe based on the second UL-DL configuration (the DL reference UL-DL configuration).

Furthermore, in a case where the subframe is indicated as the special subframe based on the second UL-DL configuration (the DL reference UL-DL configuration), the control unit (the control unit 103) determines whether or not the subframe is excluded from the HARQ-ACK codebook size determination, based on the length of the CP and the special subframe configuration.

Furthermore, in a case where the subframe is indicated as the downlink subframe based on the second UL-DL configuration (the DL reference UL-DL configuration), regardless of the length of the CP and the special subframe configuration, the control unit (the control unit 103) does not exclude the subframe from the HARQ-ACK codebook size determination. That is, in this case, the control unit (the control unit 103) uses the subframe for determining the HARQ-ACK codebook size.

Furthermore, the terminal device 1 according to the present embodiment includes the reception unit (the reception unit 105) that expects the transmission on the PDSCH in the subframe that is indicated as the downlink subframe and the special subframe based on the third UL-DL configuration, determines whether or not to expect the transmission on the PDSCH in the subframe, based on the length of the CP and the special subframe configuration, in a case where the subframe is indicated as the special subframe based on the first UL-DL configuration (the UL reference UL-DL configuration) and is indicated as the special subframe based on the second UL-DL configuration (the DL reference UL-DL configuration), and expects the transmission on the PDSCH in the subframe, regardless of the length of the CP and the special subframe configuration, in a case where the subframe is indicated as the special subframe based on the first UL-DL configuration (the UL reference UL-DL configuration) and is indicated as the downlink subframe based on the second UL-DL configuration (the DL reference UL-DL configuration).

Furthermore, the terminal device 1 according to the present embodiment includes the control unit (the radio resource control unit 1011) that configures the subframe, the EPDCCH in which is monitored, and the reception unit (the reception unit 105) that monitors the EPDCCH in the subframe which is indicated as the downlink subframe and the special subframe based on the third UL-DL configuration, among the subframes that are configured, determines whether or not to monitor the EPDCCH in the subframe that is configured and indicated, based on the length of the CP and the special subframe configuration, in a case where the subframe that is configured and indicated is indicated as the special subframe based on the first UL-DL configuration (the UL reference UL-DL configuration) and is indicated as the special subframe based on the second UL-DL configuration (the DL reference UL-DL configuration) (the first case), and monitors the EPDCCH in the subframe that is configured and indicated, regardless of the length of the CP and the special subframe configuration, in a case where the subframe that is configured and indicated is indicated as the special subframe based on the first UL-DL configuration (the UL reference UL-DL configuration) and is indicated as the downlink subframe based on the second UL-DL configuration (the DL reference UL-DL configuration) (the second case).

Furthermore, the base station apparatus 3 according to the present embodiment includes a control unit (the radio resource control unit 3011) that sets the first UL-DL configuration (the UL reference UL-DL configuration), sets the second UL-DL configuration (the DL reference UL-DL configuration), and sets the third UL-DL configuration.

Furthermore, the base station apparatus 3 according to the present embodiment includes a control unit (the control unit 303) that determines whether or to exclude the subframe that is indicated as the special subframe based on the first UL-DL configuration (the UL reference UL-DL configuration), from the HARQ-ACK codebook size determination, at least based on whether the subframe is indicated as the special subframe based on the second UL-DL configuration (the DL reference UL-DL configuration) or the subframe is indicated as the downlink subframe based on the second UL-DL configuration (the DL reference UL-DL configuration).

Furthermore, in the case where the subframe is indicated as the special subframe based on the second UL-DL configuration (the DL reference UL-DL configuration), the control unit (the control unit 303) determines whether or not the subframe is excluded from the HARQ-ACK codebook size determination, based on the length of the CP and the special subframe configuration.

Furthermore, in the case where the subframe is indicated as the downlink subframe based on the second UL-DL configuration (the DL reference UL-DL configuration), regardless of the length of the CP and the special subframe configuration, the control unit (the control unit 303) does not exclude the subframe from the HARQ-ACK codebook size determination. That is, in this case, the control unit (the control unit 303) uses the subframe for determining the HARQ-ACK codebook size.

Furthermore, the base station apparatus 3 according to the present embodiment includes the transmission unit (the transmission unit 307) that performs the transmission on the PDSCH in the subframe that is indicated as the downlink subframe and the special subframe based on the third UL-DL configuration, determines whether or not to perform the transmission on the PDSCH in the subframe, based on the length of the CP and the special subframe configuration, in a case where the subframe is indicated as the special subframe based on the first UL-DL configuration (the UL reference UL-DL configuration) and is indicated as the special subframe based on the second UL-DL configuration (the DL reference UL-DL configuration), and performs the transmission on the PDSCH in the subframe, regardless of the length of the CP and the special subframe configuration, in a case where the subframe is indicated as the special subframe based on the first UL-DL configuration (the UL reference UL-DL configuration) and is indicated as the downlink subframe based on the second UL-DL configuration (the DL reference UL-DL configuration).

Furthermore, the base station apparatus 3 according to the present embodiment includes the control unit (the radio resource control unit 3011) that configures the subframe, the EPDCCH in which is monitored by the terminal device 1, and the transmission unit (the transmission unit 307) that performs the transmission on the EPDCCH in the subframe which is indicated as the downlink subframe and the special subframe based on the third UL-DL configuration, among the subframes that are configured, determines whether or not to perform the transmission on the EPDCCH in the subframe that is configured and indicated, based on the length of the CP and the special subframe configuration, in a case where the subframe that is configured and indicated is indicated as the special subframe based on the first UL-DL configuration (the UL reference UL-DL configuration) and is indicated as the special subframe based on the second UL-DL configuration (the DL reference UL-DL configuration) (the first case), and performs the transmission on the EPDCCH in the subframe that is configured and indicated, regardless of the length of the CP and the special subframe configuration, in a case where the subframe that is configured and indicated is indicated as the special subframe based on the first UL-DL configuration (the UL reference UL-DL configuration) and is indicated as the downlink subframe based on the second UL-DL configuration (the DL reference UL-DL configuration) (the second case).

As described above, the communication that uses the PDSCH, the EPDCCH or the PUCCH is performed based on the UL reference UL-DL configuration, the DL reference UL-DL configuration, the third configuration, the length of the CP, and/or the subframe configuration, and thus the radio resource can be efficiently used.

For example, the communication that uses the PDSCH, the EPDCCH, or the PUCCH is performed based on only the parameter that is configured using the higher layer signaling, and thus it is possible to perform more robust communication. As a result, the radio resource can be efficiently used.

Furthermore, for example, the communication that uses the PDSCH, the EPDCCH, or the PUCCH is performed based on the parameter that is configured using the higher layer signaling and on a parameter that is configured using physical layer signaling, and thus it is possible to perform more dynamic communication. As a result, the radio resource can be efficiently used.

As described above, as described above, the transmission on the EPDCCH (the monitoring of the EPDCCH) is controlled based on the UL reference UL-DL configuration, the DL reference UL-DL configuration, the third configuration, the length of the CP, and/or the subframe configuration, and thus the operation in the terminal device 1 can be streamlined.

A program running on the base station apparatus 3 and the terminal device 1 according to the present invention may be a program (a program for causing a computer to operate) that controls a Central Processing Unit (CPU) and the like in such a manner as to realize the function according to the embodiments of the present invention, which are described above. Then, pieces of information that are handled in these apparatus are temporarily stored in a Random Access Memory (RAM) while being processed. Thereafter, the pieces of information are stored in various types of ROMs such as a Flash Read Only Memory (ROM), or a hard disk drive (HDD) and, if need arises, are read by the CPU to be modified or rewritten.

Moreover, one portion of each of the terminal device 1 and the base station apparatus 3 according to the embodiments, which are described above, may be realized by the computer. In that case, this one portion may be realized by recording a program for realizing such control functions on a computer-readable medium and causing a computer system to read the program stored on the recording medium for execution.

Moreover, the "computer system" here is defined as a computer system that is built into the terminal device 1 or the base station apparatus 3 and as including an OS or hardware components such as a peripheral device. Furthermore, the "computer-readable recording medium" refers to a portable medium such as a flexible disk, a magneto-optical disk, a ROM, and a CD-ROM, and a storage device such as a hard disk that is built into the computer system.

Moreover, the "computer-readable recording media" may include a medium that dynamically retains the program for a short period of time, such as a communication line that is available when transmitting the program over a network such as the Internet or over a communication network such as a telephone network, and a medium that retains the program for a fixed period of time, such as a volatile memory within the computer system, which functions as a server or a client in a case where the program is retained dynamically for a short period of time. Furthermore, the program described above may be one for realizing some of the functions described above and additionally may be one that can realize the functions described above in combination with a program that is already recorded in the computer system.

Furthermore, the base station apparatus 3 according to the embodiment, which is described above, can be realized as an aggregation (an apparatus group) that is constituted from multiple apparatuses. Each of the apparatuses that constitute the apparatus group may be equipped with some portions or all portions of each function of, or some portions or all portions of each functional block of the base station apparatus 3 according to the embodiment, which is described. The apparatus group itself may have each general function of or each general functional block of the base station apparatus 3. Furthermore, the terminal device 1 according to the embodiment, which is described, is also capable of communicating with the base station apparatus as an aggregation.

Furthermore, the base station apparatus 3 according to the embodiment, which is described, may also be referred to as an Evolved Universal Terrestrial Radio Access Network (EUTRAN). Furthermore, the base station apparatus 3 according to the embodiment, which is described, may have some portions or all portions of a function of a node that is at a higher level than an eNodeB.

Furthermore, some portions or all portions of each of the terminal device 1 and the base station apparatus 3 according to the embodiment, which is described, may be realized as an LSI that is a typical integrated circuit and may be realized as a chip set. Each functional block of the terminal device 1 and the base station apparatus 3 may be individually realized into a chip, and some, or all of the functional blocks may be integrated into a chip. Furthermore, a circuit integration technique is not limited to the LSI, and an integrated circuit for the functional block may be realized as a dedicated circuit or a general-purpose processor. Furthermore, if with advances in semiconductor technology, a circuit integration technology with which an LSI is replaced will appear, it is also possible to use an integrated circuit to which such a technology is applied.

Furthermore, according to the embodiments, which are described above, the terminal device is described as one example of a communication device, but the present invention is not limited to this, and can also be applied to a terminal device or a communication apparatus, such as a fixed-type electronic apparatus that is installed indoors or outdoors, or a stationary-type electronic apparatus, for example, an AV apparatus, a kitchen apparatus, a cleaning or washing machine, an air conditioner, office equipment, a vending machine, and other household apparatuses.

The embodiment of the invention is described in detail above referring to the drawings, but the specific configuration is not limited to the embodiment and also includes an amendment to a design and the like that fall within the scope that does not depart from the gist of the present invention. Furthermore, various modifications are possible within the scope of the present invention defined by claims, and embodiments that are implemented by suitably combining technical means that are disclosed according to different embodiments are also included in the technical scope of the present invention. Furthermore, a configuration in which a constituent element that achieves the same effect is substituted for the one that is described according to each of the embodiments described above is also included in the technical scope of the present invention.

INDUSTRIAL APPLICABILITY

The present invention can be applied to a mobile phone, a personal computer, a tablet-type computer, and the like.

DESCRIPTION OF REFERENCE NUMERALS

1 (1A, 1B, 1C) TERMINAL DEVICE
3 BASE STATION APPARATUS
101 HIGHER LAYER PROCESSING UNIT
103 CONTROL UNIT
105 RECEPTION UNIT
107 TRANSMISSION UNIT
301 HIGHER LAYER PROCESSING UNIT
303 CONTROL UNIT
305 RECEPTION UNIT
307 TRANSMISSION UNIT
1011 RADIO RESOURCE CONTROL UNIT
1013 SCHEDULING INFORMATION INTERPRETATION UNIT
1015 RECEPTION CONTROL UNIT
3011 RADIO RESOURCE CONTROL UNIT
3013 SCHEDULING UNIT
3015 TRANSMISSION CONTROL UNIT

The invention claimed is:

1. A terminal apparatus that communicates with a base station apparatus, the terminal apparatus comprising:
reception circuitry configured to receive:
first information indicating a first uplink-downlink configuration,
second information indicating a second uplink-downlink configuration,
third information indicating a third uplink-downlink configuration, and
fourth information indicating a special subframe configuration; and
transmission circuitry configured to:
perform, based on the first uplink-downlink configuration indicated by the first information, a transmission on a physical uplink shared channel, the transmission on the physical uplink shared channel being based on a detection of a transmission on a physical downlink control channel,
perform, based on the second uplink-downlink configuration indicated by the second information, a transmission of hybrid automatic repeat request (HARQ) information on a physical uplink control channel, the transmission of the HARQ information on the physical uplink control channel being based on a detection of a transmission on a physical downlink shared channel, wherein
in a case that the second information indicating the second uplink-downlink configuration is not received, a downlink pilot time slot (DwPTS) of a special subframe is given based on the first uplink-downlink configuration indicated by the first information, and whether the transmission on the physical downlink shared channel in the DwPTS of the special subframe is performed or not is defined based on the special subframe configuration indicated by the fourth information and a cyclic prefix in a downlink, and
in a case that the second information indicating the second uplink-downlink configuration is received, the DwPTS of the special subframe is given based on the third uplink-downlink configuration indicated by the third information, and whether the transmission on the physical downlink shared channel in the DwPTS of the special subframe is performed or not is defined based on the special subframe configuration indicated by the fourth information and the cyclic prefix in the downlink.

2. The terminal apparatus according to claim 1, wherein the HARQ information indicates a positive acknowledgment (ACK) or a negative acknowledgment (NACK).

3. A base station apparatus that communicates with a terminal apparatus, the base station apparatus comprising:
transmission circuitry configured to transmit:
first information indicating a first uplink-downlink configuration,
second information indicating a second uplink-downlink configuration,
third information indicating a third uplink-downlink configuration, and
fourth information indicating a special subframe configuration; and
reception circuitry configured to:
perform, based on the first uplink-downlink configuration indicated by the first information, a reception on a physical uplink shared channel, the reception on the physical uplink shared channel being based on a transmission on a physical downlink control channel, perform, based on the second uplink-downlink configuration indicated by the second information, a reception of hybrid automatic repeat request (HARQ) information on a physical uplink control channel, the reception of the HARQ information on the physical uplink control channel being based on a transmission on a physical downlink shared channel, wherein in a case that the second information indicating the second uplink-downlink configuration is not transmitted, a downlink pilot time slot (DwPTS) of a special subframe is given based on the first uplink-downlink configuration indicated by the first information, and whether the transmission on the physical downlink shared channel in the DwPTS of the special subframe is performed or not is defined based on the special subframe configuration indicated by the fourth information and a cyclic prefix in a downlink, and in a case that the second information indicating the second uplink-downlink configuration is transmitted, the DwPTS of the special subframe is given based on the third uplink-downlink configuration indicated by the third information, and whether the transmission on the physical downlink shared channel in the DwPTS of the special subframe is performed or not is defined based on the special subframe configuration indicated by the fourth information and the cyclic prefix in the downlink.

4. The base station apparatus according to claim 3, wherein the HARQ information indicates a positive acknowledgment (ACK) or a negative acknowledgment (NACK).

5. A communication method of a terminal apparatus that communicates with a base station apparatus, the communication method comprising:

receiving first information indicating a first uplink-downlink configuration, receiving second information indicating a second uplink-downlink configuration, receiving third information indicating a third uplink-downlink configuration, receiving fourth information indicating a special subframe configuration, performing, based on the first uplink-downlink configuration indicated by the first information, a transmission on a physical uplink shared channel, the transmission on the physical uplink shared channel being based on a detection of a transmission on a physical downlink control channel, and performing, based on the second uplink-downlink configuration indicated by the second information, a transmission of hybrid automatic repeat request (HARQ) information on a physical uplink control channel, the transmission of the HARQ information on the physical uplink control channel being based on a detection of a transmission on a physical downlink shared channel, wherein in a case that the second information indicating the second uplink-downlink configuration is not received, a downlink pilot time slot (DwPTS) of a special subframe is given based on the first uplink-downlink configuration indicated by the first information, and whether the transmission on the physical downlink shared channel in the DwPTS of the special subframe is performed or not is defined based on the special subframe configuration indicated by the fourth information and a cyclic prefix in a downlink, and in a case that the second information indicating the second uplink-downlink configuration is received, the DwPTS of the special subframe is given based on the third uplink-downlink configuration indicated by the third information, and whether the transmission on the physical downlink shared channel in the DwPTS of the special subframe is performed or not is defined based on the special subframe configuration indicated by the fourth information and the cyclic prefix in the downlink.

6. The communication method according to claim 5, wherein the HARQ information indicates a positive acknowledgment (ACK) or a negative acknowledgment (NACK).

7. A communication method of a base station apparatus that communicates with a terminal apparatus, the communication method comprising:

transmitting first information indicating a first uplink-downlink configuration, transmitting second information indicating a second uplink-downlink configuration, transmitting third information indicating a third uplink-downlink configuration, transmitting fourth information indicating a special subframe configuration, performing, based on the first uplink-downlink configuration indicated by the first information, a reception on a physical uplink shared channel, the reception on the physical uplink shared channel being based on a transmission on a physical downlink control channel, and performing, based on the second uplink-downlink configuration indicated by the second information, a reception of hybrid automatic repeat request (HARQ) information on a physical uplink control channel, the reception of the HARQ information on the physical uplink control channel being based on a transmission on a physical downlink shared channel, wherein in a case that the second information indicating the second uplink-downlink configuration is not transmitted, a downlink pilot time slot (DwPTS) of a special subframe is given based on the first uplink-downlink configuration indicated by the first information, and whether the transmission on the physical downlink shared channel in the DwPTS of the special subframe is performed or not is defined based on the special subframe configuration indicated by the fourth information and a cyclic prefix in a downlink, and in a case that the second information indicating the second uplink-downlink configuration is transmitted, the DwPTS of the special subframe is given based on the third uplink-downlink configuration indicated by the third information, and whether the transmission on the physical downlink shared channel in the DwPTS of the special subframe is performed or not is defined based on the special subframe configuration indicated by the fourth information and the cyclic prefix in the downlink.

8. The communication method according to claim 7, wherein the HARQ information indicates a positive acknowledgment (ACK) or a negative acknowledgment (NACK).

* * * * *